(12) United States Patent
Darr et al.

(10) Patent No.: US 7,855,873 B2
(45) Date of Patent: Dec. 21, 2010

(54) PANELBOARD FOR FUSIBLE SWITCHING DISCONNECT DEVICES

(75) Inventors: Matthew Rain Darr, Godfrey, IL (US); Jaime Alberto Torrez, O'Fallon, MO (US)

(73) Assignee: Cooper Technologies Company, Houston, TX (US)

(*) Notice: Subject to any disclaimer, the term of this patent is extended or adjusted under 35 U.S.C. 154(b) by 93 days.

(21) Appl. No.: 11/941,212

(22) Filed: Nov. 16, 2007

(65) Prior Publication Data

US 2008/0158788 A1    Jul. 3, 2008

Related U.S. Application Data

(63) Continuation-in-part of application No. 11/674,880, filed on Feb. 14, 2007, which is a continuation-in-part of application No. 11/603,454, filed on Nov. 22, 2006, which is a continuation-in-part of application No. 11/274,003, filed on Nov. 15, 2005, now Pat. No. 7,474,194, which is a continuation-in-part of application No. 11/222,628, filed on Sep. 9, 2005, now Pat. No. 7,495,540.

(60) Provisional application No. 60/609,431, filed on Sep. 13, 2004.

(51) Int. Cl.
*H02B 1/26* (2006.01)
*H01H 9/10* (2006.01)

(52) U.S. Cl. .............. 361/642; 361/622; 361/626; 361/628; 361/630; 361/631; 361/641; 361/643; 361/644; 361/646; 337/62

(58) Field of Classification Search ......... 361/626–628, 361/630–634, 636, 641–644, 646–647, 652, 361/655–658; 200/306, 572; 337/8, 59, 337/61–62, 70, 72, 143
See application file for complete search history.

(56) References Cited

U.S. PATENT DOCUMENTS 1,974,154 A * 9/1934 Harrison et al. ............. 361/629

(Continued)

FOREIGN PATENT DOCUMENTS

DE    2334595 B  *  4/1974

(Continued)

OTHER PUBLICATIONS

International Search Report and Written Opinion of PCT/US2008/083212; Feb. 20, 2009; 13 pages.

*Primary Examiner*—Robert J Hoffberg
(74) *Attorney, Agent, or Firm*—Armstrong Teasdale LLP

(57) ABSTRACT

A panelboard for fusible switching disconnect devices. The panelboard includes a chassis coupled to a mounting enclosure. The mounting enclosure can be used indoors or outdoors. The chassis is configured to receive one or more fusible switching disconnect devices. Each of the fusible switching disconnect devices includes both a fuse and a circuit breaker-like disconnect in a single, relatively compact housing. The compactness of the housing allows the panelboard to provide a higher level of overcurrent interruption in a smaller sized mounting enclosure than conventional panelboards. For example, the panelboard can have an interruption per volume rating of at least about 33 amps per cubic inch, as compared to about 2 amps per cubic inch for most conventional panelboards.

25 Claims, 42 Drawing Sheets

U.S. PATENT DOCUMENTS

| | | | | |
|---|---|---|---|---|
| 2,636,958 A | * | 4/1953 | Dorfman et al. | 337/76 |
| 2,923,796 A | * | 2/1960 | Davis | 337/17 |
| 3,009,035 A | * | 11/1961 | Reichert et al. | 337/7 |
| 3,032,629 A | * | 5/1962 | Uecker | 335/23 |
| 3,077,525 A | * | 2/1963 | Dyer | 337/7 |
| 3,614,697 A | * | 10/1971 | Dunham et al. | 337/6 |
| 3,688,237 A | * | 8/1972 | Orosz et al. | 337/7 |
| 3,958,197 A | * | 5/1976 | Gryctko | 335/18 |
| 5,272,592 A | * | 12/1993 | Harris et al. | 361/637 |
| 5,322,982 A | * | 6/1994 | Leger et al. | 200/401 |
| 5,355,274 A | * | 10/1994 | Marach et al. | 361/104 |
| 5,473,495 A | * | 12/1995 | Bauer | 361/11 |
| 5,594,404 A | * | 1/1997 | Happ et al. | 337/210 |
| 5,831,507 A | * | 11/1998 | Kasamatsu et al. | 337/4 |
| 5,841,337 A | * | 11/1998 | Douglass | 337/198 |
| 6,034,586 A | * | 3/2000 | Runyan et al. | 335/172 |
| D427,569 S | * | 7/2000 | Douglass et al. | D13/160 |
| D427,976 S | * | 7/2000 | Douglass et al. | D13/160 |
| D429,223 S | * | 8/2000 | Douglass et al. | D13/178 |
| 6,157,287 A | * | 12/2000 | Douglass et al. | 337/198 |
| 6,160,699 A | | 12/2000 | Gibson et al. | |
| 6,420,948 B1 | * | 7/2002 | Runyan | 335/6 |
| 6,696,969 B2 | * | 2/2004 | Torrez et al. | 340/638 |
| 6,717,505 B1 | * | 4/2004 | Bruchmann | 337/194 |
| 6,771,477 B2 | * | 8/2004 | Milanczak | 361/104 |
| 6,781,809 B2 | * | 8/2004 | Milanczak | 361/104 |
| 6,784,783 B2 | * | 8/2004 | Scoggin et al. | 337/194 |
| 6,853,289 B2 | * | 2/2005 | Scoggin | 337/194 |
| 6,864,443 B1 | * | 3/2005 | Bruchmann | 200/50.01 |
| 6,897,760 B2 | * | 5/2005 | Kawata et al. | 337/328 |
| 6,998,954 B2 | * | 2/2006 | Milanczak | 337/194 |
| 7,049,973 B2 | * | 5/2006 | Torrez et al. | 340/638 |
| 7,115,829 B2 | * | 10/2006 | Schmid | 200/400 |
| 7,385,518 B2 | * | 6/2008 | Torrez et al. | 340/638 |
| 7,474,194 B2 | * | 1/2009 | Darr et al. | 337/72 |
| 7,495,540 B2 | * | 2/2009 | Darr et al. | 337/72 |
| 7,561,017 B2 | * | 7/2009 | Darr et al. | 337/79 |
| 7,576,630 B2 | * | 8/2009 | Darr | 337/72 |
| 2007/0252670 A1 | | 11/2007 | Darr | |

FOREIGN PATENT DOCUMENTS

| | | | |
|---|---|---|---|
| DE | 2952132 B | * | 6/1981 |
| EP | 184652 A2 | * | 6/1986 |
| EP | 584587 A1 | * | 3/1994 |
| FR | 2807576 | | 10/2001 |
| GB | 2370432 A | | 6/2002 |
| WO | WO 2006105861 A1 | * | 10/2006 |

\* cited by examiner

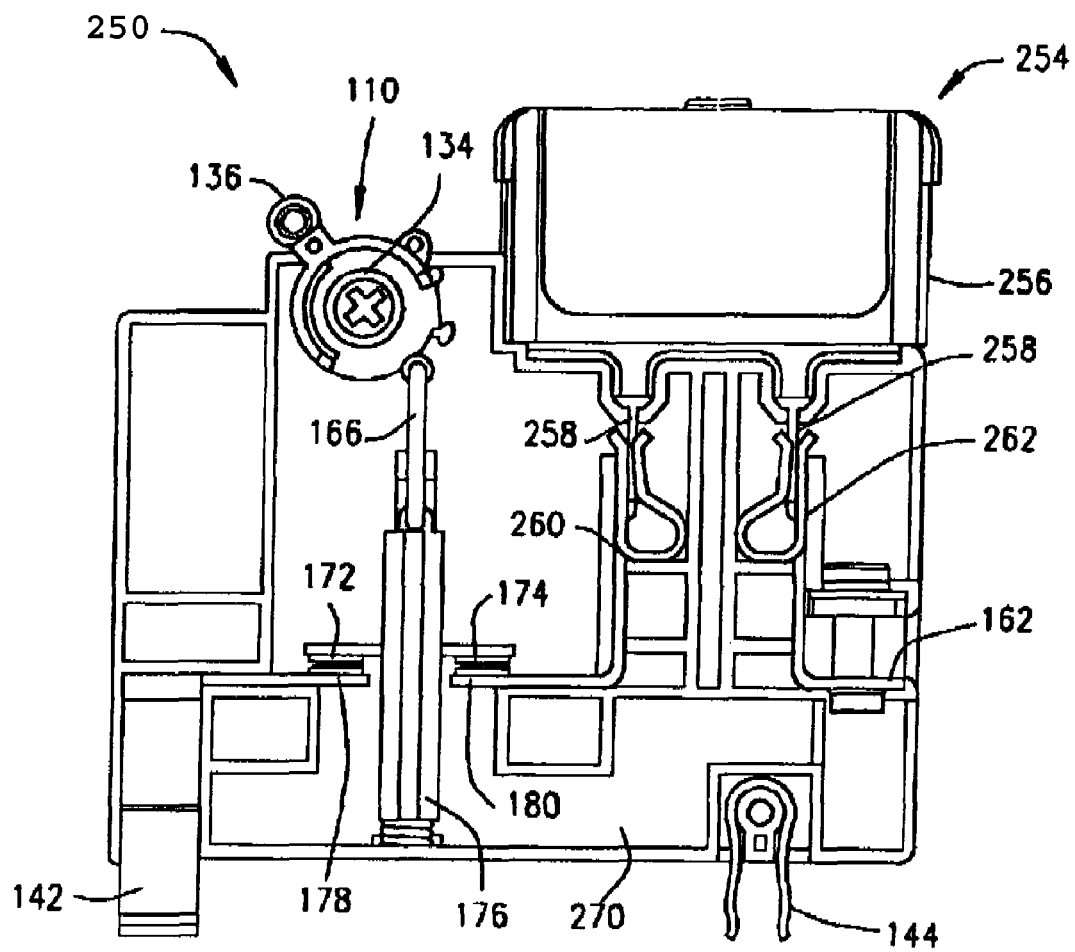
F I G. 7

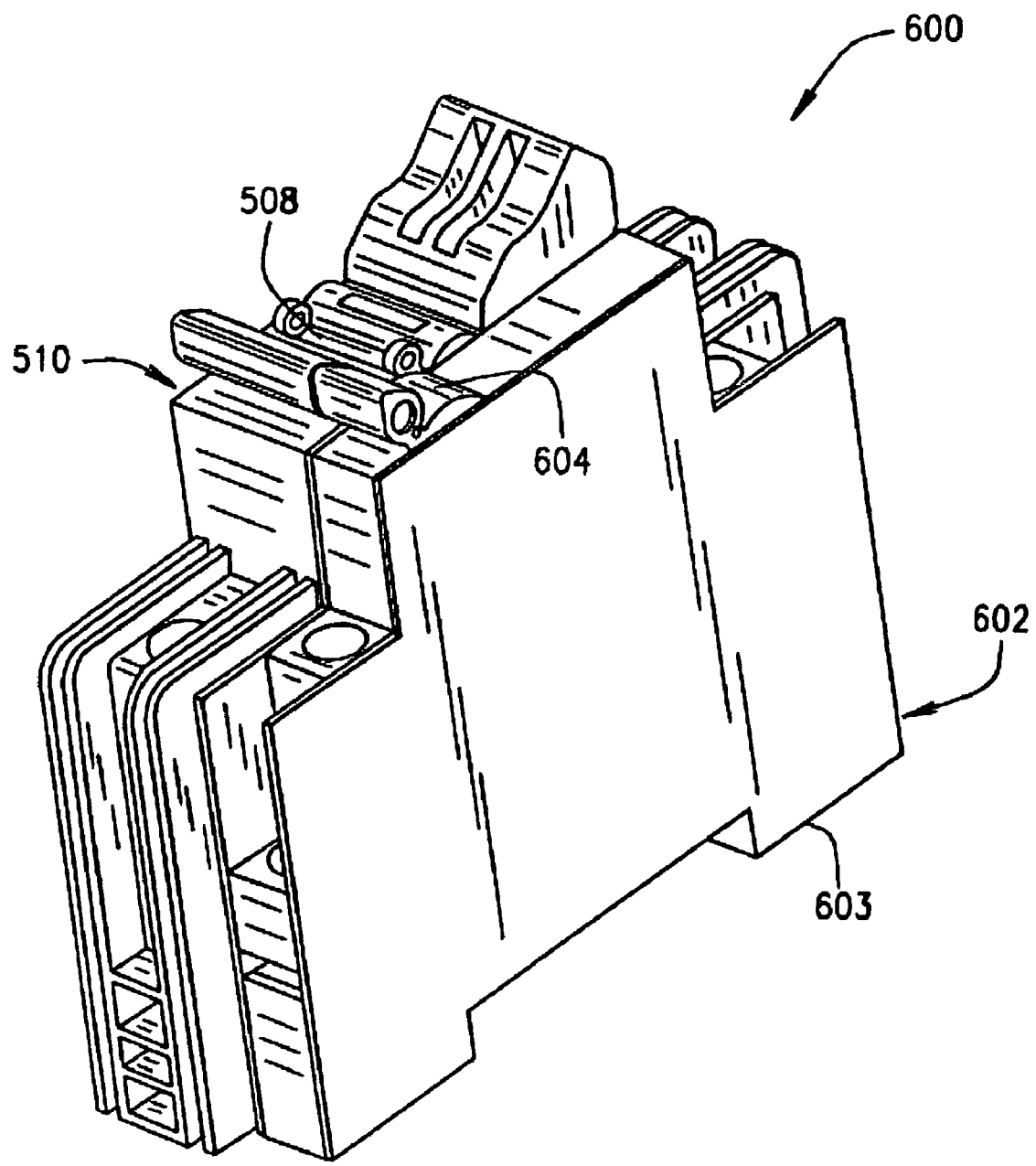
F I G. 23

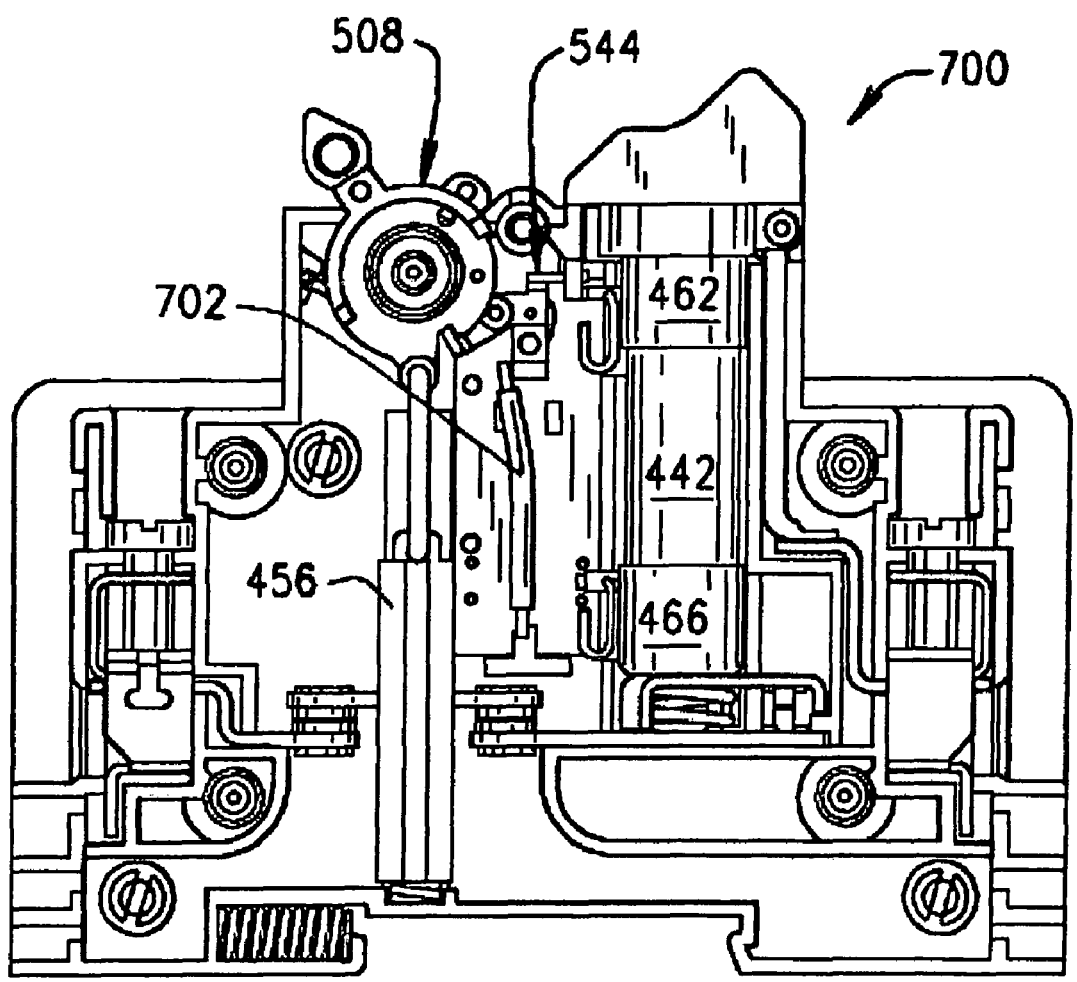
F I G. 28

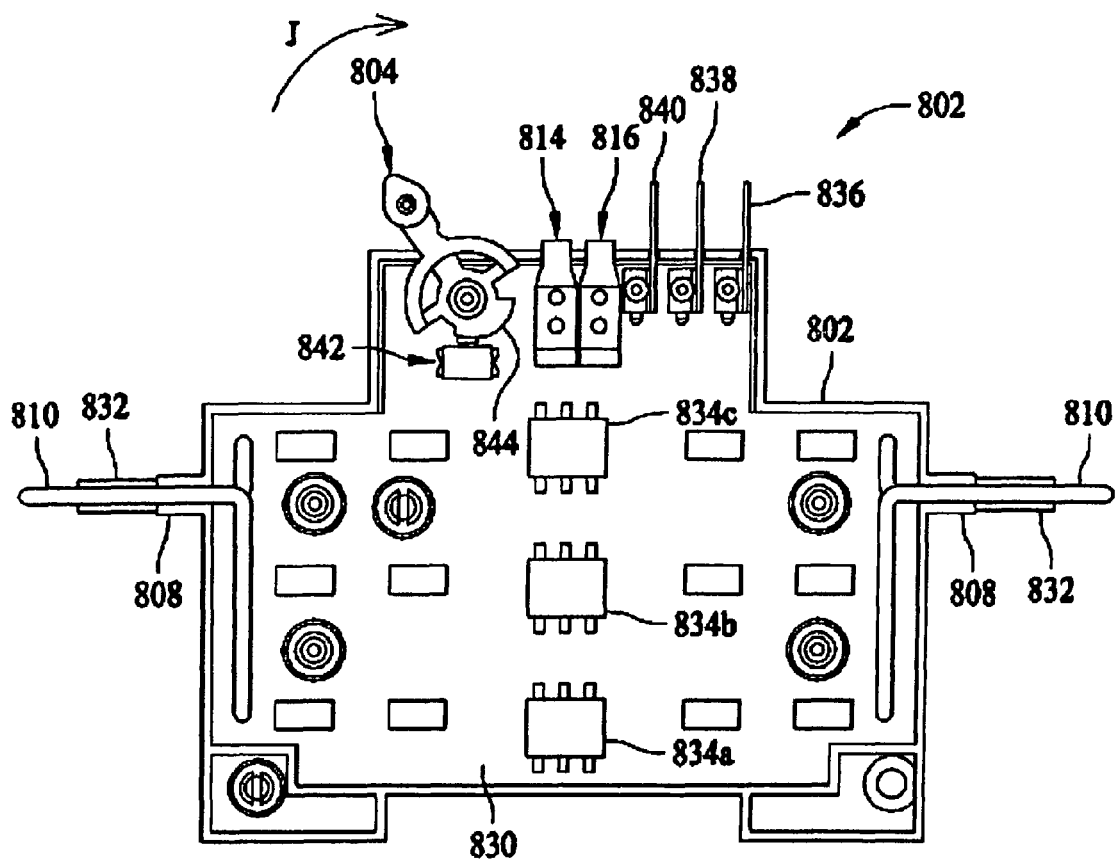
F I G. 31

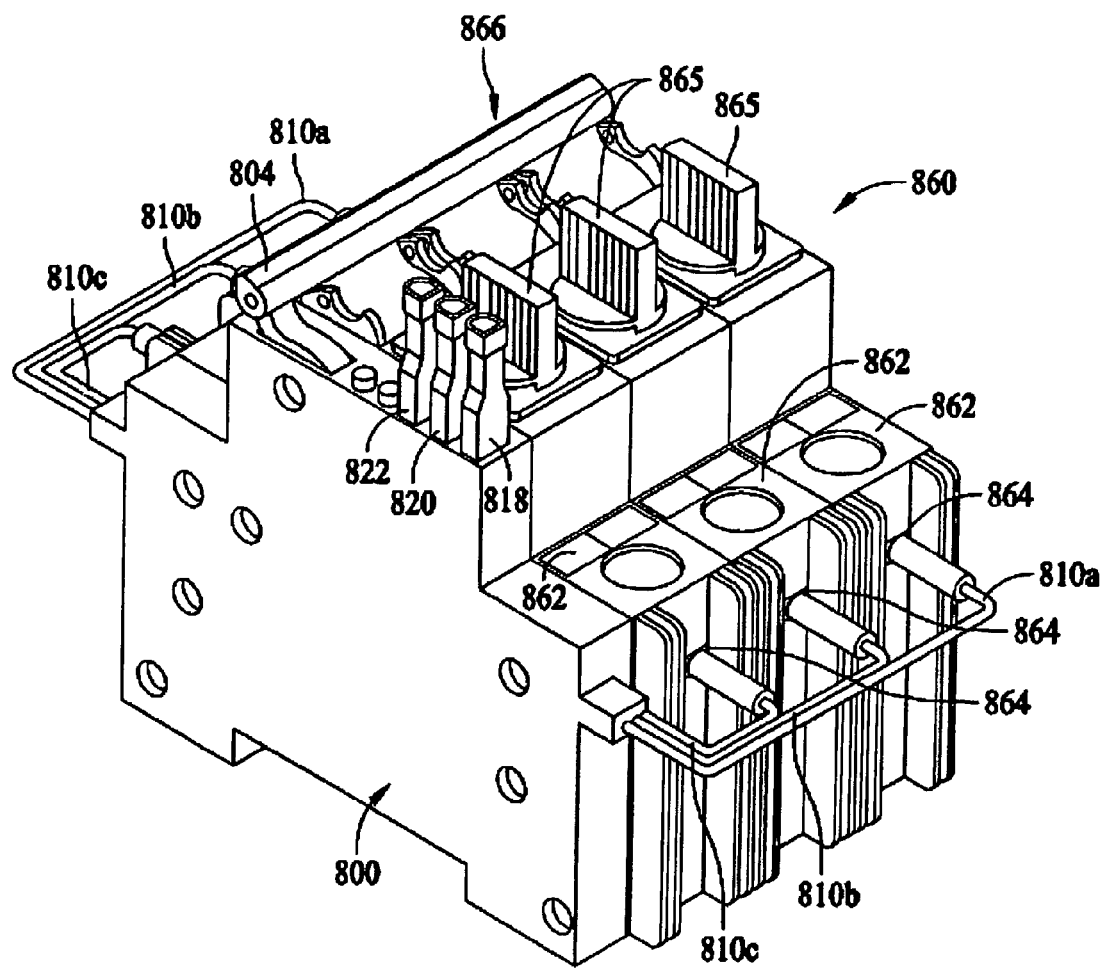
F I G. 33

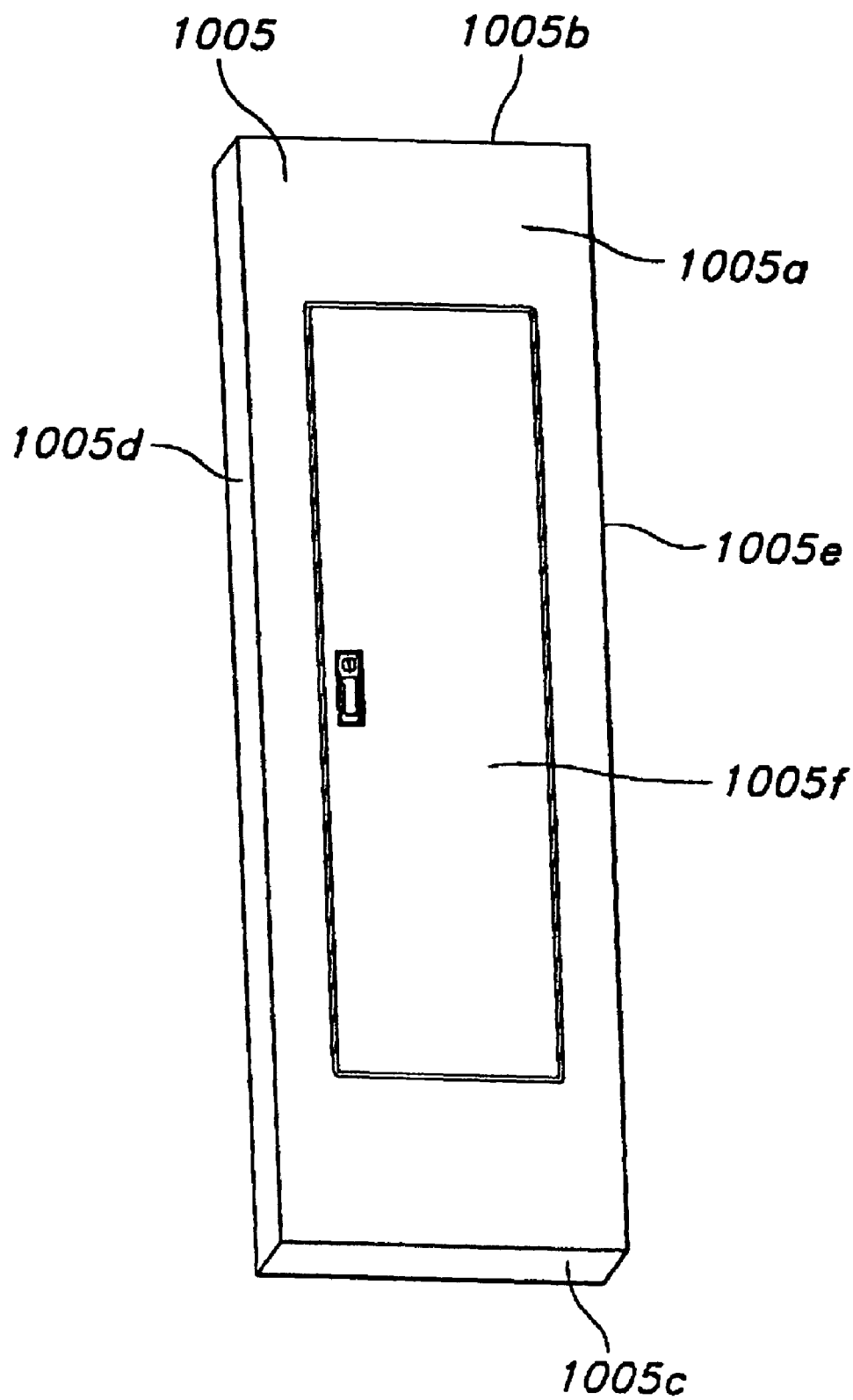
F I G. 37

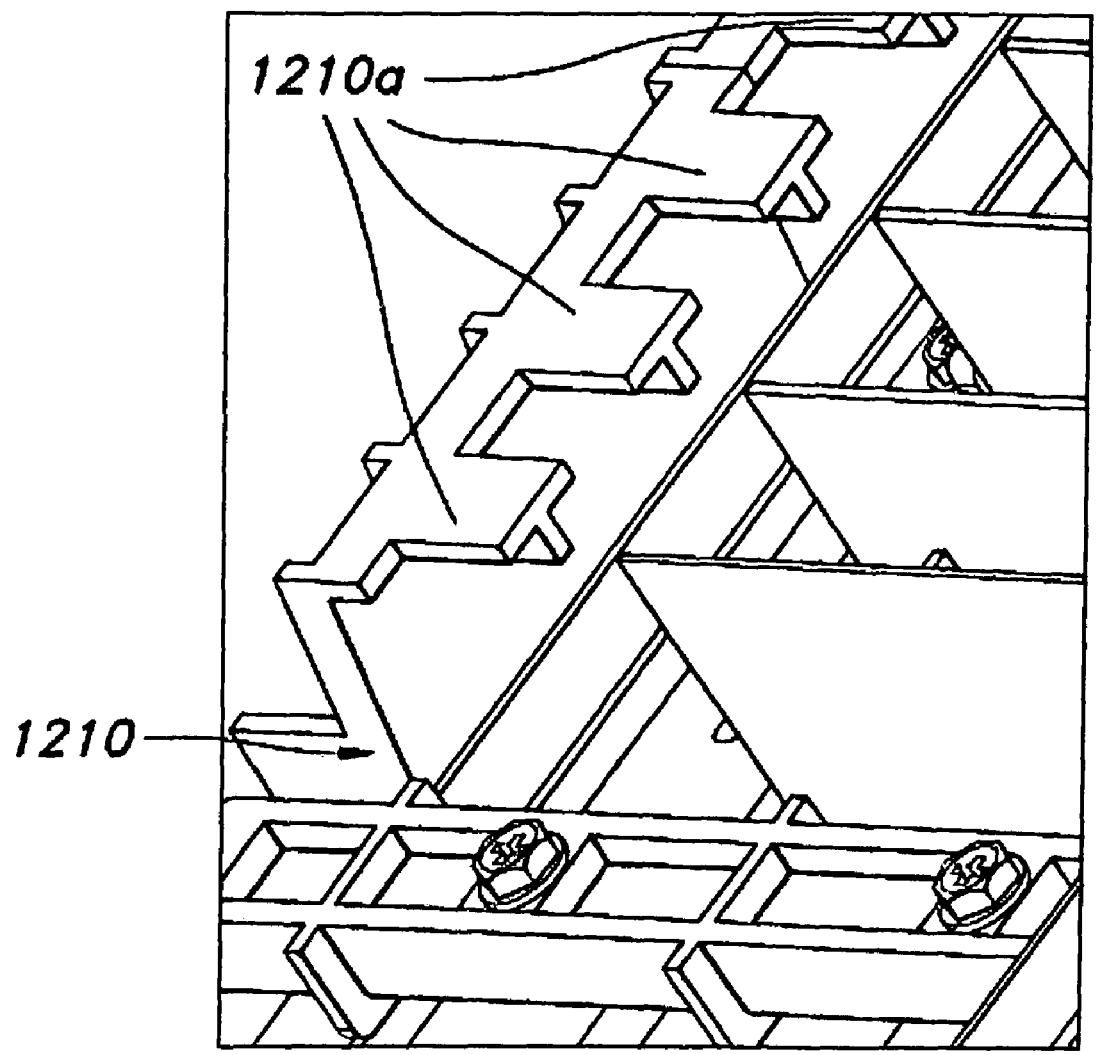
F I G. 39

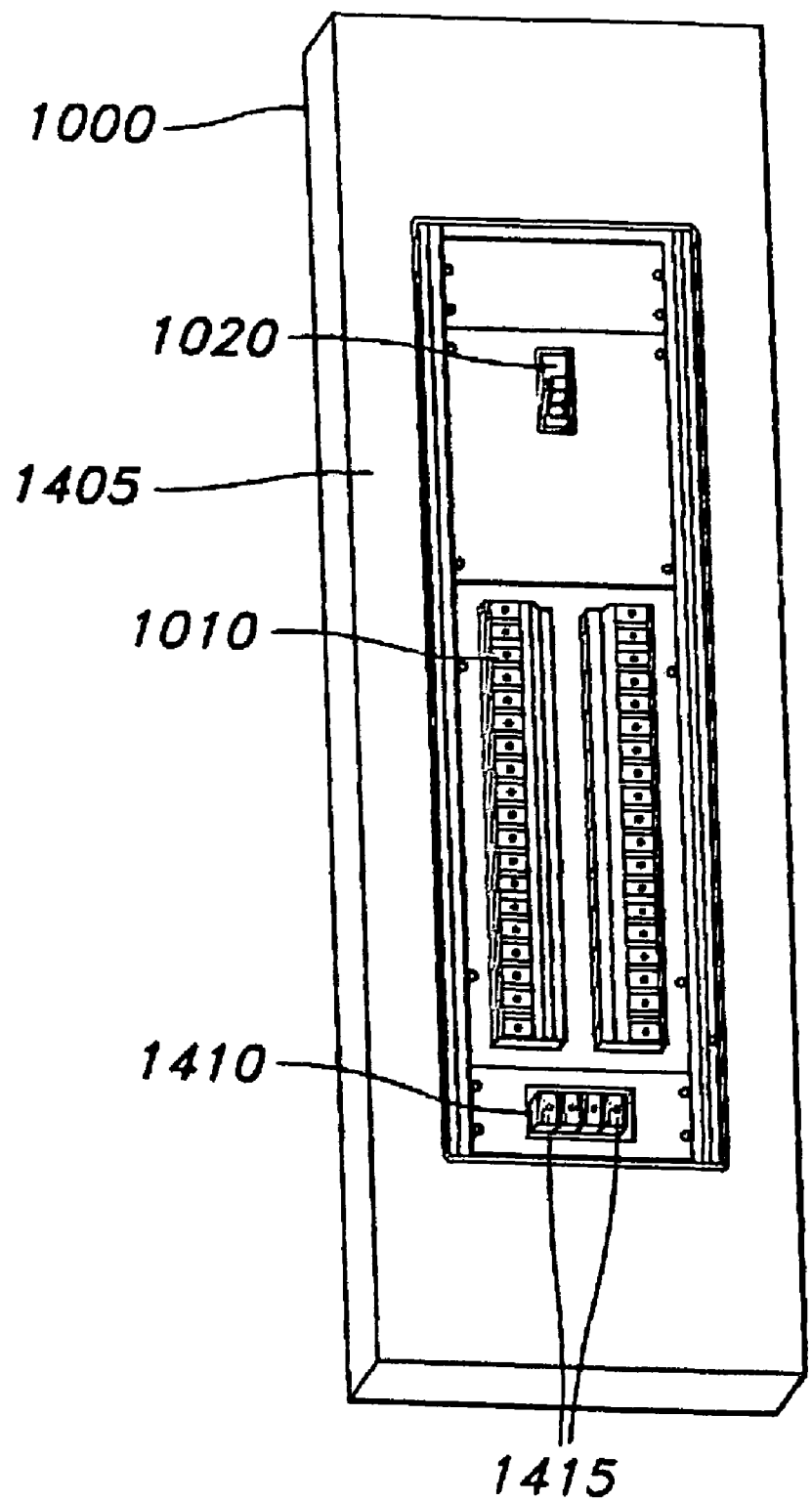
F I G. 42

US 7,855,873 B2

PANELBOARD FOR FUSIBLE SWITCHING DISCONNECT DEVICES

RELATED APPLICATIONS

This application is a continuation-in-part application of U.S. patent application Ser. No. 11/674,880 entitled "Fusible Switching Disconnect Modules and Devices" and filed Feb. 14, 2007, which is a continuation-in-part application of U.S. patent application Ser. No. 11/603,454 entitled "Fusible Switching Disconnect Modules and Devices" and filed Nov. 22, 2006, which is a continuation-in-part application of U.S. patent application Ser. No. 11/274,003 entitled "Fusible Switching Disconnect Modules and Devices" and filed Nov. 15, 2005, now U.S. Pat. No. 7,474,194 which is a continuation-in-part application of U.S. patent application Ser. No. 11/222,628 entitled "Fusible Switching Disconnect Modules and Devices" and filed Sep. 9, 2005, now U.S. Pat. No. 7,495,540 which claims the benefit of U.S. Provisional Patent Application No. 60/609,431, entitled "Fusible Switching Disconnect Modules and Devices" and filed Sep. 13, 2004. The complete disclosure of each of the above-identified applications is hereby fully incorporated herein by reference.

TECHNICAL FIELD

The invention relates generally to a fusible panelboard, and more particularly, to a panelboard for fusible switching disconnect devices.

BACKGROUND OF THE INVENTION

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current through the fuse exceeds a predetermined limit, the fusible elements melt and open one or more circuits through the fuse to prevent electrical component damage.

Circuit breakers also are widely used as overcurrent protection devices. A circuit breaker is an automatically-operated electrical switch. Unlike a fuse, which operates once and then has to be replaced, a circuit breaker can be reset (either manually or automatically) to resume normal operations. A circuit breaker panel is a mounting enclosure for multiple electrical circuit breakers connected to electrical circuits via one or more hot bus bars. Similarly, a fuse box is a mounting enclosure for multiple fuses. For simplicity, the term "panelboard" is used herein to refer to any mounting enclosure for multiple circuit breakers and/or fuses, including any circuit breaker panel and/or fuse box.

In 2005, the National Electrical Code ("NEC") was revised to include requirements for selective coordination in emergency and legally required standby systems. The NEC defines "selective coordination" as the "localization of an overcurrent condition to restrict outages to the circuit or equipment affected, accomplished by the choice of overcurrent protective devices and their ratings." In other words, selective coordination involves isolating an overloaded or faulted circuit from the remainder of the electrical system by having only the nearest upstream overcurrent protective device open. The objective of the new selective coordination requirements is to ensure system uptime with the goal of safety of human life during emergencies or for essential health care functions. Selectively coordinating overcurrent protective devices is achieved by reviewing the operating characteristics of the upstream overcurrent protective devices in relation to the downstream overcurrent protective devices.

A traditional approach to selective coordination is providing a "fusible panelboard" with both circuit breakers and fuses having different overcurrent voltage ratings. Each branch circuit coupled to the fusible panelboard is associated with a different circuit breaker-fuse pair. Each circuit breaker provides on/off switching functionality to its respective branch circuit. The fuses associated with each branch circuit may be selected based on the selective coordination ratios provided by the fuse manufacturers Fusible panelboards generally have higher overcurrent interrupter ratings than conventional circuit breaker panelboards and fuse boxes.

However, fusible panelboards have had commercial difficulty due, at least in part, to the fact that existing fusible panelboards are significantly wider in size than ordinary circuit breaker panels and fuse boxes. The larger width is mostly due to the combination of a fuse holder and circuit breaker for each branch circuit. For example, an existing fusible panelboard is generally about 28 inches wide, as compared to a 20 inch width of a typical circuit breaker panelboard.

Therefore, a need exists in the art for a fusible panelboard having a decreased width.

BRIEF DESCRIPTION OF THE DRAWINGS

FIG. 7 is a side elevational view of the fusible switching disconnect device shown in FIG. 7.

FIG. 23 is a perspective view of a tenth embodiment of a fusible switching disconnect device.

FIG. 28 is a side elevational view of a portion of a twelfth embodiment of a fusible switching disconnect device.

FIG. 31 is a side elevational view of a portion of the module shown in FIG. 30.

FIG. 33 is a perspective view of the fuse status indicator module shown in FIGS. 30 and 31 connected to a fusible disconnect device.

FIG. 37 is a perspective view of an exemplary panelboard cover configured to mate with the mounting enclosure of FIG. 36.

FIG. 39 is a perspective view of an exemplary mounting support configured for mounting a fusible disconnect device to a support rail.

FIG. 42 is a perspective view of an exemplary mounting enclosure, main service disconnect, fusible disconnect devices, and dead front panel of an exemplary fusible panelboard.

DETAILED DESCRIPTION OF EXEMPLARY EMBODIMENTS

The following description of exemplary embodiments refers to the attached drawings, in which like numerals indicate like elements throughout the several figures.

Figure 1:
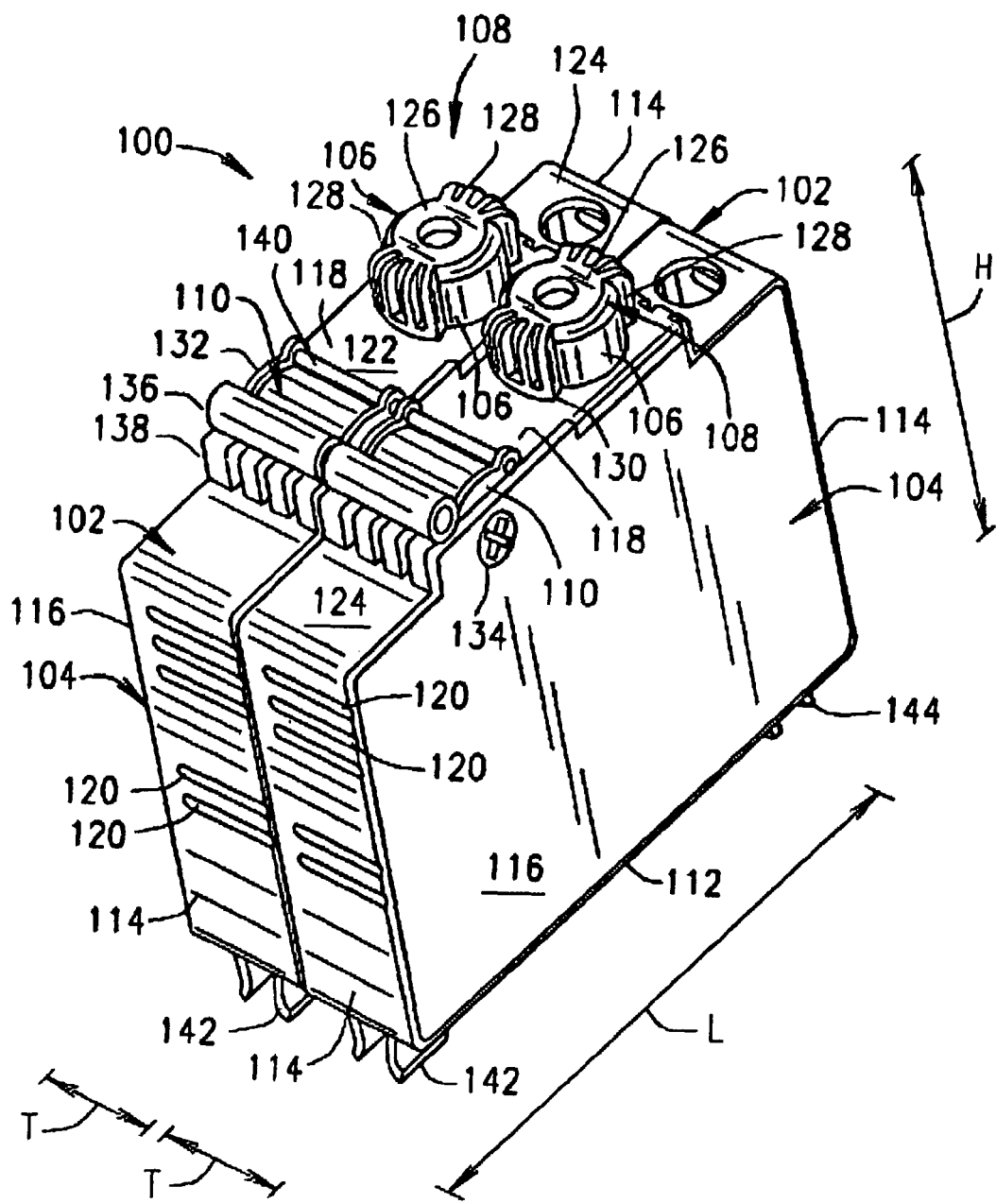
FIG. 1 is a perspective view of an exemplary fusible switching disconnect device.

FIG. 1 is a perspective view of an exemplary fusible switching disconnect device 100 that overcomes the aforementioned difficulties. The fusible switching disconnect device 100 may be conveniently switched on and off in a convenient and safe manner without interfering with workspace around the device 100. The disconnect device 100 may reliably switch a circuit on and off in a cost effective manner and may be used with standardized equipment in, for example, industrial control applications. Further, the disconnect device 100 may be provided with various mounting and connection options for versatility in the field. Various embodiments will be described below to demonstrate the versatility of the disconnect device, and it is contemplated that the disconnect device 100 may be beneficial in a variety of electrical circuits and applications. The embodiments set forth below are therefore provided for illustrative purposes only, and the invention is not intended to be limited to any specific embodiment or to any specific application.

In the illustrative embodiment of FIG. 1, the disconnect device 100 may be a two pole device formed from two separate disconnect modules 102. Each module 102 may include an insulative housing 104, a fuse 106 loaded into the housing 104, a fuse cover or cap 108 attaching the fuse to the housing 104, and a switch actuator 110. The modules 102 are single pole modules, and the modules 102 may be coupled or ganged together to form the two pole disconnect device 100. It is contemplated, however, that a multi-pole device could be formed in a single housing rather than in the modular fashion of the exemplary embodiment shown in FIG. 1.

The housing 104 may be fabricated from an insulative or nonconductive material, such as plastic, according to known methods and techniques, including but not limited to injection molding techniques. In an exemplary embodiment, the housing 104 is formed into a generally rectangular size and shape which is complementary to and compatible with DIN and IEC standards applicable to standardized electrical equipment. In particular, for example, each housing 104 has lower edge 112, opposite side edges 114, side panels 116 extending between the side edges 114, and an upper surface 118 extending between the side edges 114 and the side panels 116. The lower edge 112 has a length L and the side edges 114 have a thickness T, such as 17.5 mm in one embodiment, and the length L and thickness T define an area or footprint on the lower edge 112 of the housing 104. The footprint allows the lower edge 112 to be inserted into a standardized opening having a complementary shape and dimension. Additionally, the side edges 114 of the housing 104 have a height H in accordance with known standards, and the side edges 114 include slots 120 extending therethrough for ventilating the housing 104. The upper surface 118 of the housing 104 may be contoured to include a raised central portion 122 and recessed end portions 124 extending to the side edges 114 of the housing 104.

The fuse 106 of each module 102 may be loaded vertically in the housing 104 through an opening in the upper surface 118 of the housing 104, and the fuse 106 may extend partly through the raised central portion 122 of the upper surface 118. The fuse cover 108 extends over the exposed portion of the fuse 106 extending from the housing 104, and the cover 108 secures the fuse 106 to the housing 104 in each module 102. In an exemplary embodiment, the cover 108 may be fabricated from a non-conductive material, such as plastic, and may be formed with a generally flat or planar end section 126 and elongated fingers 128 extending between the upper surface 118 of the raised central portion 122 of the housing 104 and the end of the fuse 106. Openings are provided in between adjacent fingers 128 to ventilate the end of the fuse 106.

In an exemplary embodiment, the cover 108 further includes rim sections 130 joining the fingers 128 opposite the end section 126 of the cover 108, and the rim sections 130 secure the cover 108 to the housing 104. In an exemplary embodiment, the rim sections 130 cooperate with grooves in the housing 104 such that the cover 108 may rotate a predetermined amount, such as 25 degrees, between a locked position and a release position. That is, once the fuse 106 is inserted into the housing 104, the fuse cover 108 may be installed over the end of the fuse 106 into the groove of the housing 104, and the cover 108 may be rotated 25 degrees to the locked position wherein the cover 108 will frustrate removal of the fuse 106 from the housing 104. The groove may also be ramped or inclined such that the cover 108 applies a slight downward force on the fuse 106 as the cover 108 is installed. To remove the fuse 106, the cover 108 may be rotated from the locked position to the open position wherein both the cover 108 and the fuse 106 may be removed from the housing 104.

The switch actuator 110 may be located in an aperture 132 of the raised upper surface 122 of the housing 104, and the switch actuator 110 may partly extend through the raised upper surface 122 of the housing 104. The switch actuator 110 may be rotatably mounted to the housing 104 on a shaft or axle 134 within the housing 104, and the switch actuator 110 may include a lever, handle, or bar 136 extending radially from the switch actuator 110. By moving the lever 136 from a first edge 138 to a second edge 140 of the aperture 132, the shaft 134 rotates to an open or switch position and electrically disconnects the fuse 106 in each module 102 as explained below. When the lever 136 is moved from the second edge 140 to the first edge 138, the shaft 134 rotates back to the closed position illustrated in FIG. 1 and electrically connects the fuse 106.

A line side terminal element may 142 extend from the lower edge 112 of the housing 104 in each module 102 for establishing line and load connections to circuitry. As shown in FIG. 1, the line side terminal element 142 is a bus bar clip configured or adapted to connect to a line input bus, although it is contemplated that other line side terminal elements could be employed in alternative embodiments. A panel mount clip 144 also extends from the lower edge 112 of the housing 104 to facilitate mounting of the disconnect device 100 on a panel.

Figure 2:
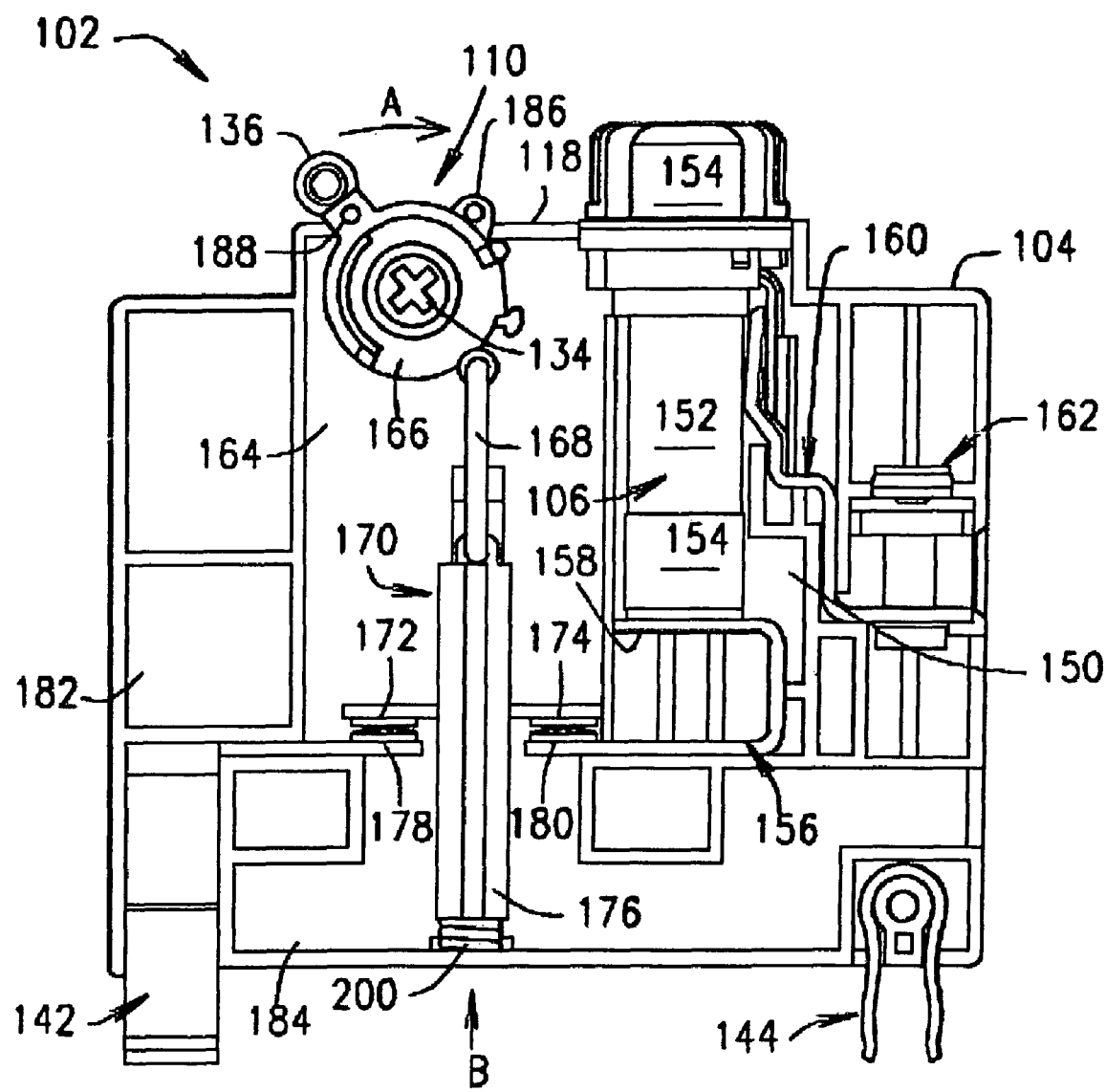
FIG. 2 is a side elevational view of a portion of the fusible switching disconnect device shown in FIG. 1 in a closed position.

FIG. 2 is a side elevational view of one of the disconnect modules 102 shown in FIG. 1 with the side panel 116 removed. The fuse 106 may be seen situated in a compartment 150 inside the housing 104. In an exemplary embodiment, the fuse 106 may be a cylindrical cartridge fuse including an insulative cylindrical body 152, conductive ferrules or end caps 154 coupled to each end of the body 152, and a fuse element or fuse element assembly extending within the body 152 and electrically connected to the end caps 154. In exemplary embodiments, the fuse 106 may be a UL Class CC fuse, a UL supplemental fuse, or an IEC 10X38 fuses which are commonly used in industrial control applications. These and other types of cartridge fuses suitable for use in the module 102 are commercially available from Cooper/Bussmann of St. Louis, Mo. It is understood that other types of fuses may also be used in the module 102 as desired.

A lower conductive fuse terminal 156 may be located in a bottom portion of the fuse compartment 150 and may be U-shaped in one embodiment. One of the end caps 154 of the fuse 106 rests upon an upper leg 158 of the lower fuse terminal 156, and the other end cap 154 of the fuse 106 is coupled to an upper terminal 160 located in the housing 104 adjacent the fuse compartment 150. The upper terminal 160 is, in turn, connected to a load side terminal 162 to accept a load side connection to the disconnect module 102 in a known manner. The load side terminal 162 in one embodiment is a known saddle screw terminal, although it is appreciated that other types of terminals could be employed for load side connections to the module 102. Additionally, the lower fuse terminal 156 may include fuse rejection features in a further embodiment which prevent installation of incorrect fuse types into the module 102.

The switch actuator 110 may be located in an actuator compartment 164 within the housing 104 and may include the shaft 134, a rounded body 166 extending generally radially from the shaft 134, the lever 136 extending from the body 166, and an actuator link 168 coupled to the actuator body 166. The actuator link 168 may be connected to a spring loaded contact assembly 170 including first and second movable or switchable contacts 172 and 174 coupled to a sliding bar 176. In the closed position illustrated in FIG. 2, the switchable contacts 172 and 174 are mechanically and electrically engaged to stationary contacts 178 and 180 mounted in the housing 104. One of the stationary contacts 178 may be mounted to an end of the terminal element 142, and the other of the stationary contacts 180 may be mounted to an end of the lower fuse terminal 156. When the switchable contacts 172 and 174 are engaged to the stationary contacts 178 and 180, a circuit is path completed through the fuse 106 from the line terminal 142 and the lower fuse terminal 156 to the upper fuse terminal 160 and the load side terminal 162.

While in an exemplary embodiment the stationary contact 178 is mounted to a terminal 142 having a bus bar clip, another terminal element, such as a known box lug or clamp terminal could be provided in a compartment 182 in the housing 104 in lieu of the bus bar clip. Thus, the module 102 may be used with a hard-wired connection to line-side circuitry instead of a line input bus. Thus, the module 102 is readily convertible to different mounting options in the field.

When the switch actuator 110 is rotated about the shaft 134 in the direction of arrow A, the siding bar 176 may be moved linearly upward in the direction of arrow B to disengage the switchable contacts 172 and 174 from the stationary contacts 178 and 180. The lower fuse terminal 156 is then disconnected from the line-side terminal element while the fuse 106 remains electrically connected to the lower fuse terminal 156 and to the load side terminal 162. An arc chute compartment 184 may be formed in the housing 104 beneath the switchable contacts 172 and 174, and the arc chute may provide a space to contain and dissipate arcing energy as the switchable contacts 172 and 174 are disconnected. Arcing is broken at two locations at each of the contacts 172 and 174, thus reducing arc intensity, and arcing is contained within the lower portions of the housing 104 and away from the upper surface 118 and the hands of a user when manipulating the switch actuator 110 to disconnect the fuse 106 from the line side terminal 142.

Figure 3:
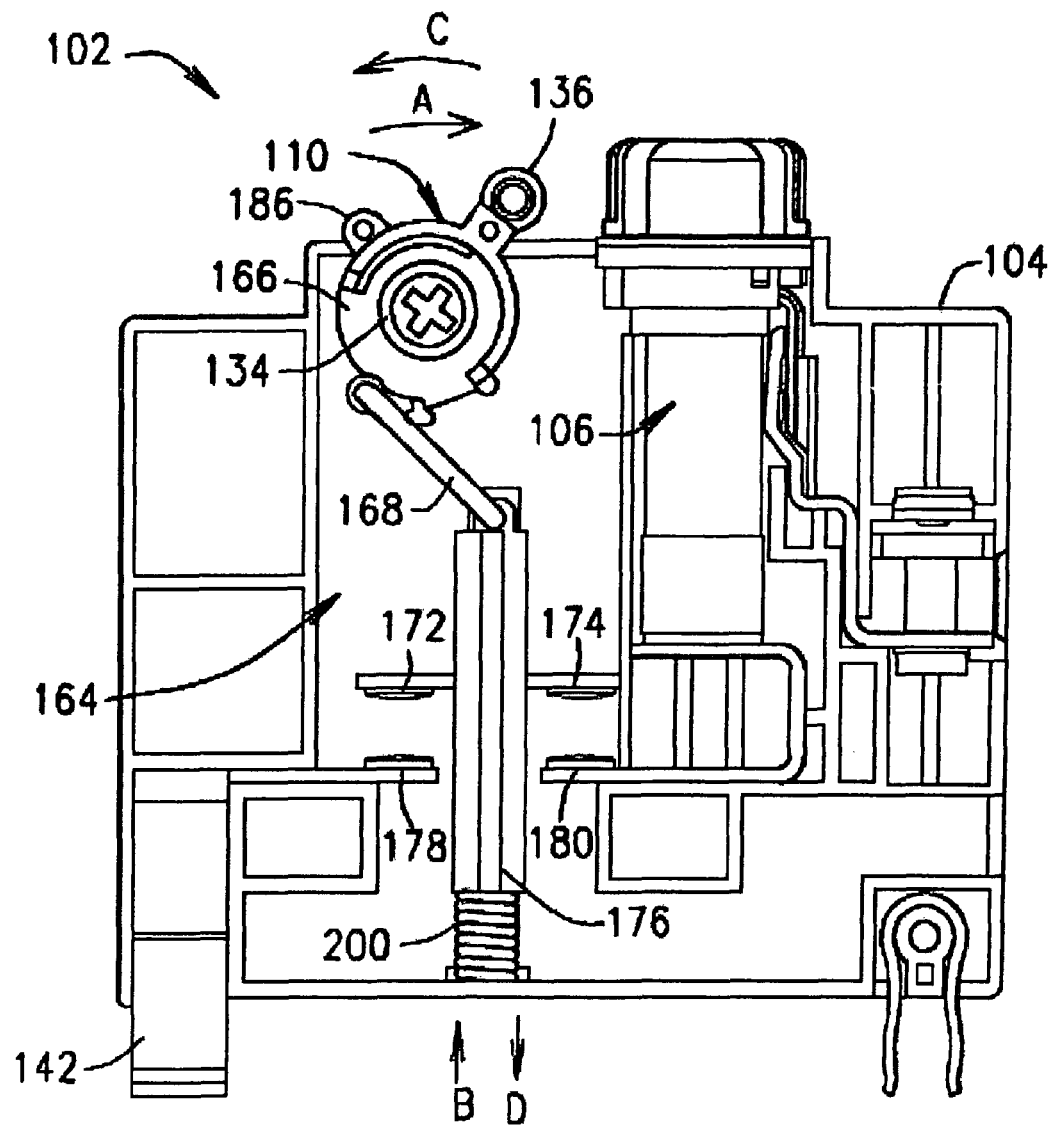
FIG. 3 is a side elevational view of a portion of the fusible switching disconnect device shown in FIG. 1 in an open position.

The housing 104 additionally may include a locking ring 186 which may be used cooperatively with a retention aperture 188 in the switch actuator body 166 to secure the switch actuator 110 in one of the closed position shown in FIG. 2 and the open position shown in FIG. 3. A locking pin for example, may be inserted through the locking ring 186 and the retention aperture 188 to restrain the switch actuator in the corresponding open or closed position. Additionally, a fuse retaining arm could be provided in the switch actuator 110 to prevent removal of the fuses except when the switch actuator 110 is in the open position.

FIG. 3 illustrates the disconnect module 102 after the switch actuator has been moved in the direction of Arrow A to an open or switched position to disconnect the switchable contacts 172 and 174 from the stationary contacts 178 and 180. As the actuator is moved to the open position, the actuator body 166 rotates about the shaft 134 and the actuator link 168 is accordingly moved upward in the actuator compartment 164. As the actuator link 168 moves upward, the actuator link 168 pulls the sliding bar 176 upward in the direction of arrow B to separate the switchable contacts 172 and 174 from the stationary contacts 178 and 180.

A bias element 200 may be provided beneath the sliding bar 176 and may force the sliding bar 176 upward in the direction of arrow B to a fully opened position separating the contacts 172, 174 and 178, 180 from one another. Thus, as the actuator body 166 is rotated in the direction of arrow A, the actuator link 168 is moved past a point of equilibrium and the bias element 200 assists in opening of the contacts 172, 174 and 178, 180. The bias element 200 therefore prevents partial opening of the contacts 172, 174 and 178, 180 and ensures a full separation of the contacts to securely break the circuit through the module 102.

Additionally, when the actuator lever 136 is pulled back in the direction of arrow C to the closed position shown in FIG. 2, the actuator link 168 is moved to position the sliding bar 176 downward in the direction of arrow D to engage and close the contacts 172, 174 and 178, 180 and reconnect the circuit through the fuse 106. The sliding bar 176 is moved downward against the bias of the bias element 200, and once in the closed position, the sliding bar 176, the actuator link 168 and the switch actuator are in static equilibrium so that the switch actuator 110 will remain in the closed position.

In one exemplary embodiment, and as illustrated in FIGS. 2 and 3, the bias element 200 may be a helical spring element which is loaded in compression in the closed position of the switch actuator 110. It is appreciated, however, that in an alternatively embodiment a coil spring could be loaded in tension when the switch actuator 110 is closed. Additionally, other known bias elements could be provided to produce opening and/or closing forces to assist in proper operation of the disconnect module 102. Bias elements may also be utilized for dampening purposes when the contacts are opened.

The lever 136, when moved between the opened and closed positions of the switch actuator, does not interfere with workspace around the disconnect module 102, and the lever 136 is unlikely to be inadvertently returned to the closed position from the open position. In the closed position shown in FIG. 2, the lever 136 is located adjacent to an end of the fuse 106. The fuse 106 therefore partly shelters the lever 136 from inadvertent contact and unintentional actuation to the closed position. The bias element 200 further provides some resistance to movement of the lever 136 and closing of the contact mechanism. Additionally, the stationary contacts 178 and 180 are at all times protected by the housing 104 of the module 102, and any risk of electrical shock due to contact with line side terminal 142 and the stationary contacts 178 and 180 is avoided. The disconnect module 102 is therefore considered to be safer than many known fused disconnect devices.

When the modules 102 are ganged together to form a multi-pole device, such as the device 100, one lever 136 may be extended through and connect to multiple switch actuators 110 for different modules. Thus, all the connected modules 102 may be disconnected and reconnected by manipulating a single lever 136. That is, multiple poles in the device 100 may be switched simultaneously. Alternatively, the switch actuators 110 of each module 102 in the device 100 may be actuated independently with separate levers 136 for each module.

Figure 4:
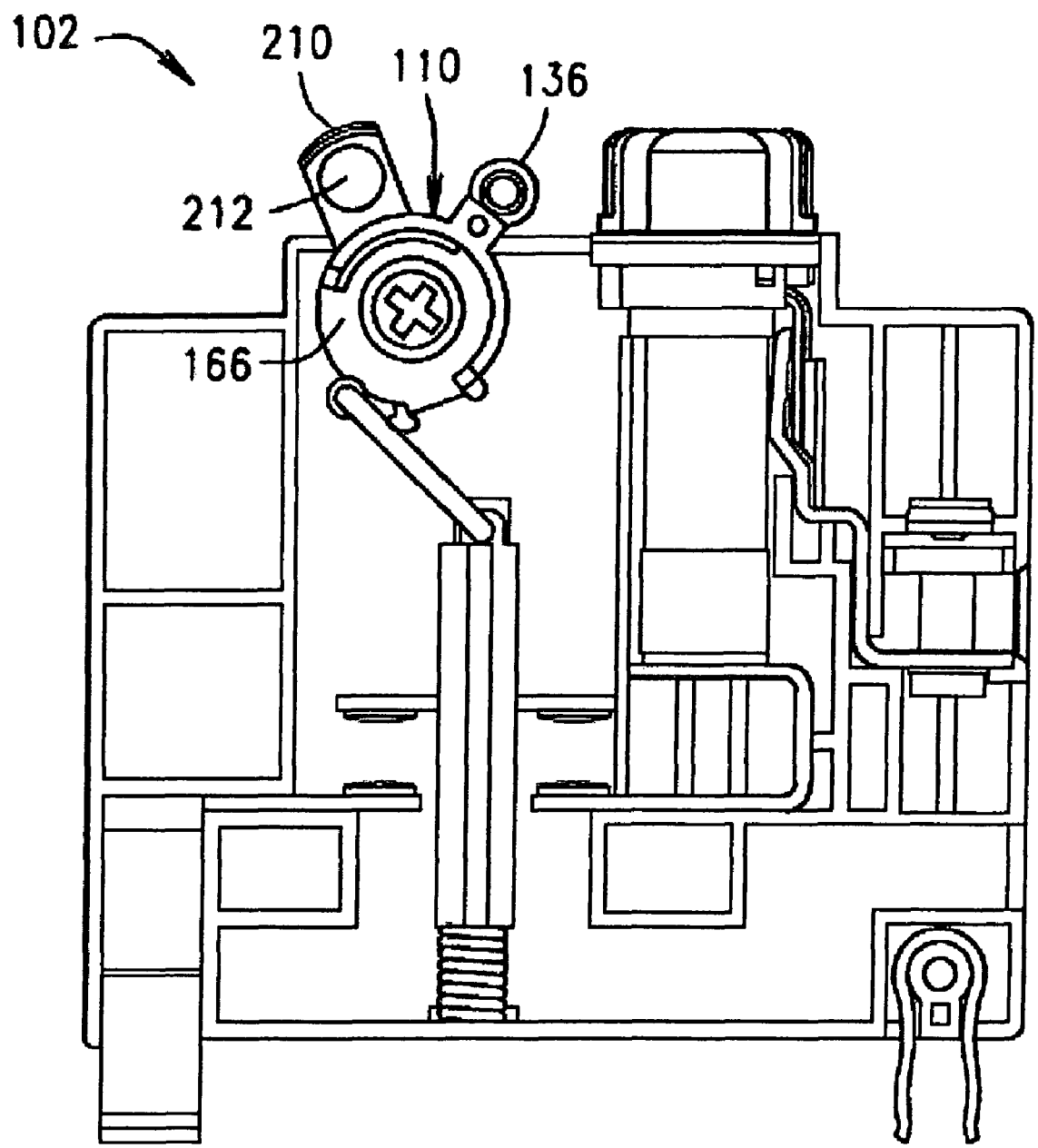
FIG. 4 is a side elevational view of a second embodiment of a fusible switching disconnect device.

FIG. 4 is a side elevational view of a further exemplary embodiment of a fusible switching disconnect module 102 including, for example, a retractable lockout tab 210 which may extend from the switch actuator 110 when the lever 136 is moved to the open position. The lockout tab 210 may be provided with a lock opening 212 therethrough, and a padlock or other element may be inserted through the lock opening 212 to ensure that the lever 136 may not be moved to the closed position. In different embodiments, the lockout tab 210 may be spring loaded and extended automatically, or may be manually extended from the switch actuator body 166. When the lever 136 is moved to closed position, the lockout tab 210 may be automatically or manually returned to refracted position wherein the switch actuator 110 may be rotated back to the closed position shown in FIG. 2.

Figure 5:
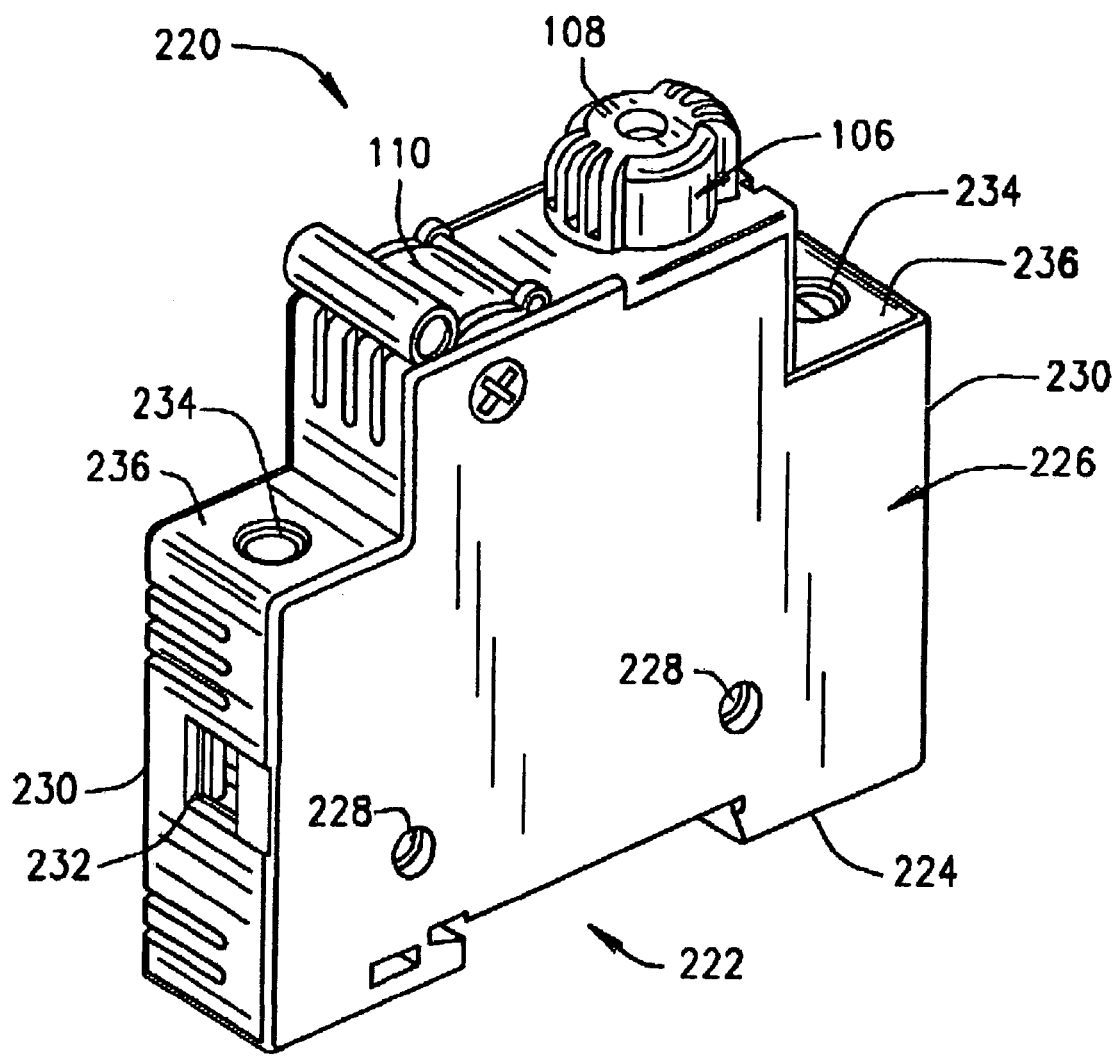
FIG. 5 is a perspective view of a third embodiment of a fusible switching disconnect device.

FIG. 5 is a perspective view of a third exemplary embodiment of a fusible switching disconnect module 220 similar to the module 102 described above but having, for example, a DIN rail mounting slot 222 formed in a lower edge 224 of a housing 226. The housing 226 may also include openings 228 which may be used to gang the module 220 to other disconnect modules. Side edges 230 of the housing 226 may include connection openings 232 for line side and load connections to box lugs or clamps within the housing 226. Access openings 234 may be provided in recessed upper surfaces 236 of the housing 226. A stripped wire, for example, may be extended through the connection openings 232 and a screwdriver may be inserted through the access openings 234 to connect line and load circuitry to the module 220.

Like the module 102, the module 220 may include the fuse 106, the fuse cover 108 and the switch actuator 110. Switching of the module is accomplished with switchable contacts as described above in relation to the module 102.

Figure 6:
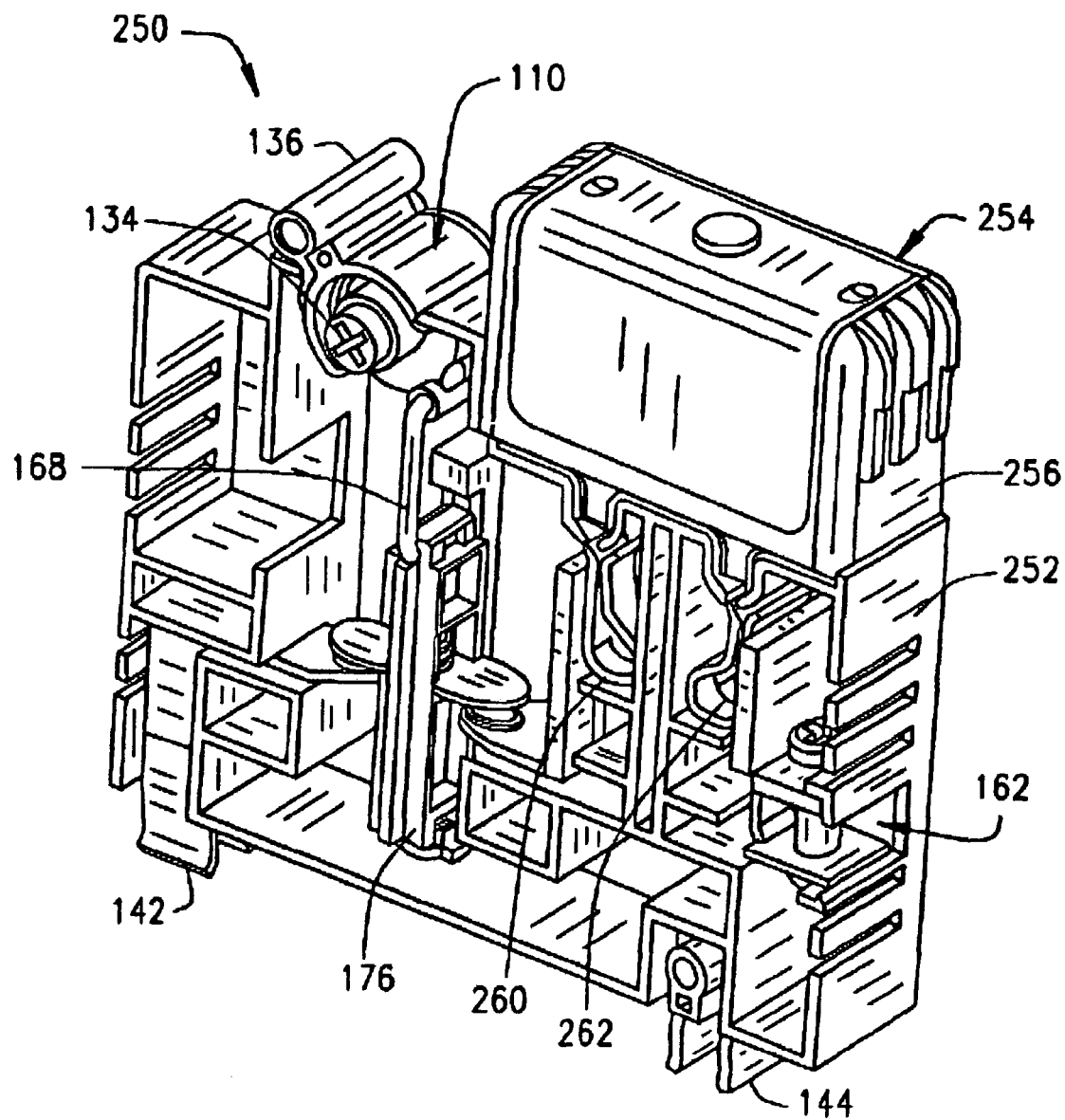
FIG. 6 is a perspective view of a fourth embodiment of a fusible switching disconnect device.

FIGS. 6 and 7 are perspective views of a fourth exemplary embodiment of a fusible switching disconnect module 250 which, like the modules 102 and 220 described above, includes a switch actuator 110 rotatably mounted to the housing on a shaft 134, a lever 136 extending from the actuator link 168 and a slider bar 176. The module 250 also includes, for example, a mounting clip 144 and a line side terminal element 142.

Unlike the modules 102 and 220, the module 250 may include a housing 252 configured or adapted to receive a rectangular fuse module 254 instead of a cartridge fuse 106. The fuse module 254 is a known assembly including a rectangular housing 256, and terminal blades 258 extending from the housing 256. A fuse element or fuse assembly may be located within the housing 256 and is electrically connected between the terminal blades 258. Such fuse modules 254 are known and in one embodiment are CubeFuse modules commercially available from Cooper/Bussmann of St. Louis, Mo.

A line side fuse clip 260 may be situated within the housing 252 and may receive one of the terminal blades 258 of the fuse module 254. A load side fuse clip 262 may also be situated within the housing 252 and may receive the other of the fuse terminal blades 258. The line side fuse clip 260 may be electrically connected to the stationary contact 180. The load side fuse clip 262 may be electrically connected to the load side terminal 162. The line side terminal 142 may include the stationary contact 178, and switching may be accomplished by rotating the switch actuator 110 to engage and disengage the switchable contacts 172 and 174 with the respective stationary contacts 178 and 180 as described above. While the line terminal 142 is illustrated as a bus bar clip, it is recognized that other line terminals may be utilized in other embodiments, and the load side terminal 162 may likewise be another type of terminal in lieu of the illustrated saddle screw terminal in another embodiment.

The fuse module 254 may be plugged into the fuse clips 260, 262 or extracted therefrom to install or remove the fuse module 254 from the housing 252. For switching purposes, however, the circuit is connected and disconnected at the contacts 172, 174, 178 and 180 rather than at the fuse clips 260 and 262. Arcing between the disconnected contacts may therefore contained in an arc chute or compartment 270 at the lower portion of the compartment and away from the fuse clips 260 and 262. By opening the disconnect module 250 with the switch actuator 110 before installing or removing the fuse module 254, any risk posed by electrical arcing or energized metal at the fuse and housing interface is eliminated. The disconnect module 250 is therefore believed to be safer to use than many known fused disconnect switches.

A plurality of modules 250 may be ganged or otherwise connected together to form a multi-pole device. The poles of the device could be actuated with a single lever 136 or independently operable with different levers.

Figure 8:
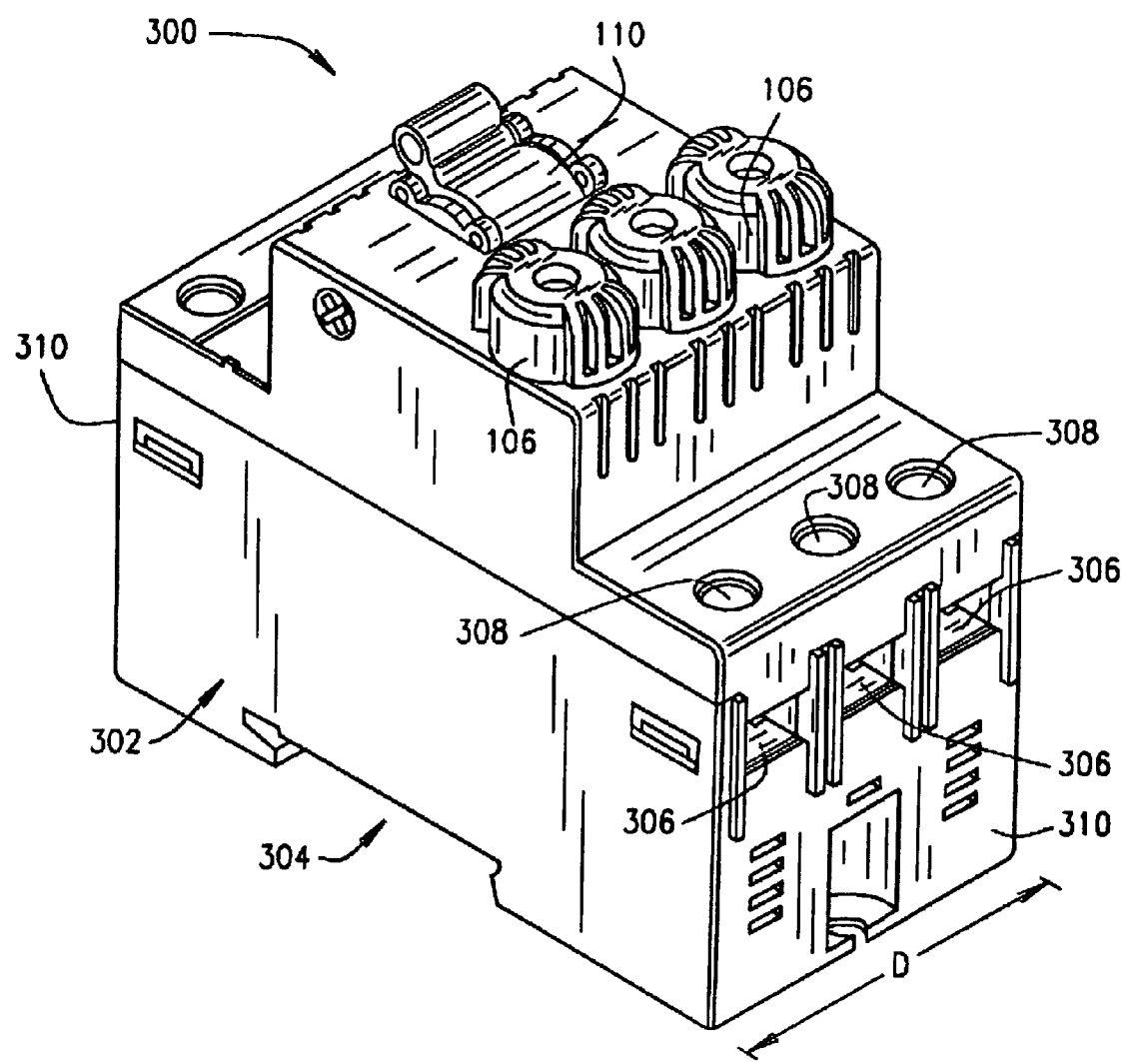
FIG. 8 is a perspective view of a fifth embodiment of a fusible switching disconnect device.

FIG. 8 is a perspective view of a fifth exemplary embodiment of a fusible switching disconnect device 300 which is, for example, a multi-pole device in an integrated housing 302. The housing 302 may be constructed to accommodate three fuses 106 in an exemplary embodiment, and is therefore well suited for a three phase power application. The housing 302 may include a DIN rail slot 304 in the illustrated embodiment, although it is understood that other mounting options, mechanisms, and mounting schemes may be utilized in alternative embodiments. Additionally, in one embodiment the housing 302 may have a width dimension D of about 45 mm in accordance with IEC industry standards for contactors, relays, manual motor protectors, and integral starters that are also commonly used in industrial control systems applications. The benefits of the invention, however, accrue equally to devices having different dimensions and devices for different applications.

The housing 302 may also include connection openings 306 and access openings 308 in each side edge 310 which may receive a wire connection and a tool, respectively, to establish line and load connections to the fuses 106. A single switch actuator 110 may be rotated to connect and disconnect the circuit through the fuses between line and load terminals of the disconnect device 300.

Figure 9:
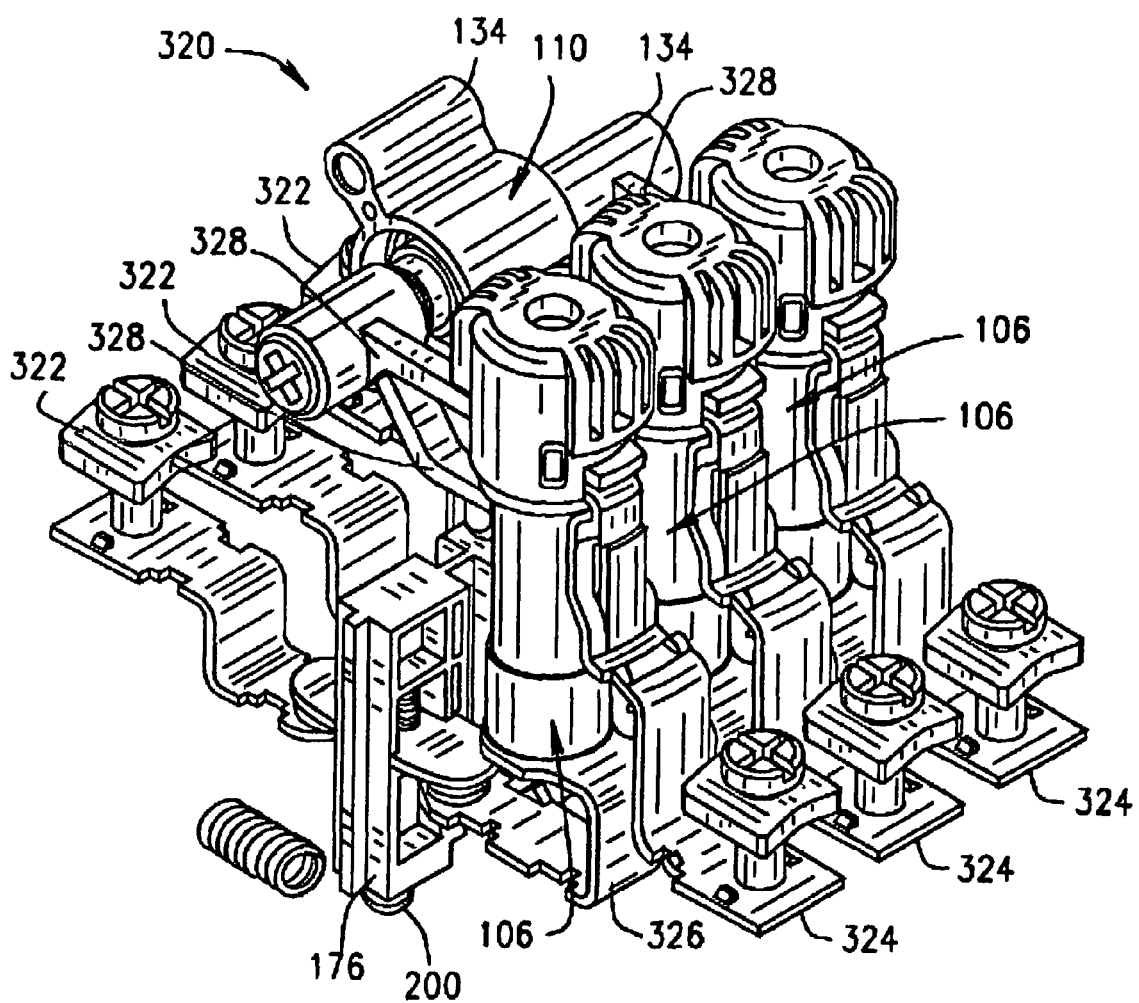
FIG. 9 is a perspective view of a portion of the fusible switching disconnect device shown in FIG. 8.

FIG. 9 is a perspective view of an exemplary switching assembly 320 for the device 300. The switching assembly may be accommodated in the housing 302 and in an exemplary embodiment may include a set of line terminals 322, a set of load terminals 324, a set of lower fuse terminals 326 associated with each respective fuse 106, and a set of slider bars 176 having switchable contacts mounted thereon for engaging and disengaging stationary contacts mounted to the ends of the line terminals 322 and the lower fuse terminals 324. An actuator link (not visible in FIG. 9) may be mounted to an actuator shaft 134, such that when the lever 136 is rotated, the slider bar 176 may be moved to disconnect the switchable contacts from the stationary contacts. Bias elements 200 may be provided beneath each of the slider bars 176 and assist operation of the switch actuator 110 as described above. As with the foregoing embodiments of modules, a variety of line side and load side terminal structures may be used in various embodiments of the switching assembly.

Retention bars 328 may also be provided on the shaft 134 which extend to the fuses 106 and engage the fuses in an interlocking manner to prevent the fuses 106 from being removed from the device 300 except when the switch actuator 110 is in the open position. In the open position, the retention bars 328 may be angled away from the fuses 106 and the fuses may be freely removed. In the closed position, as shown in FIG. 9, the retention arms or bars 328 lock the fuse in place. In an exemplary embodiment, distal ends of the bars or arms 328 may be received in slots or detents in the fuses 106, although the fuses 106 could be locked in another manner as desired.

Figure 10:
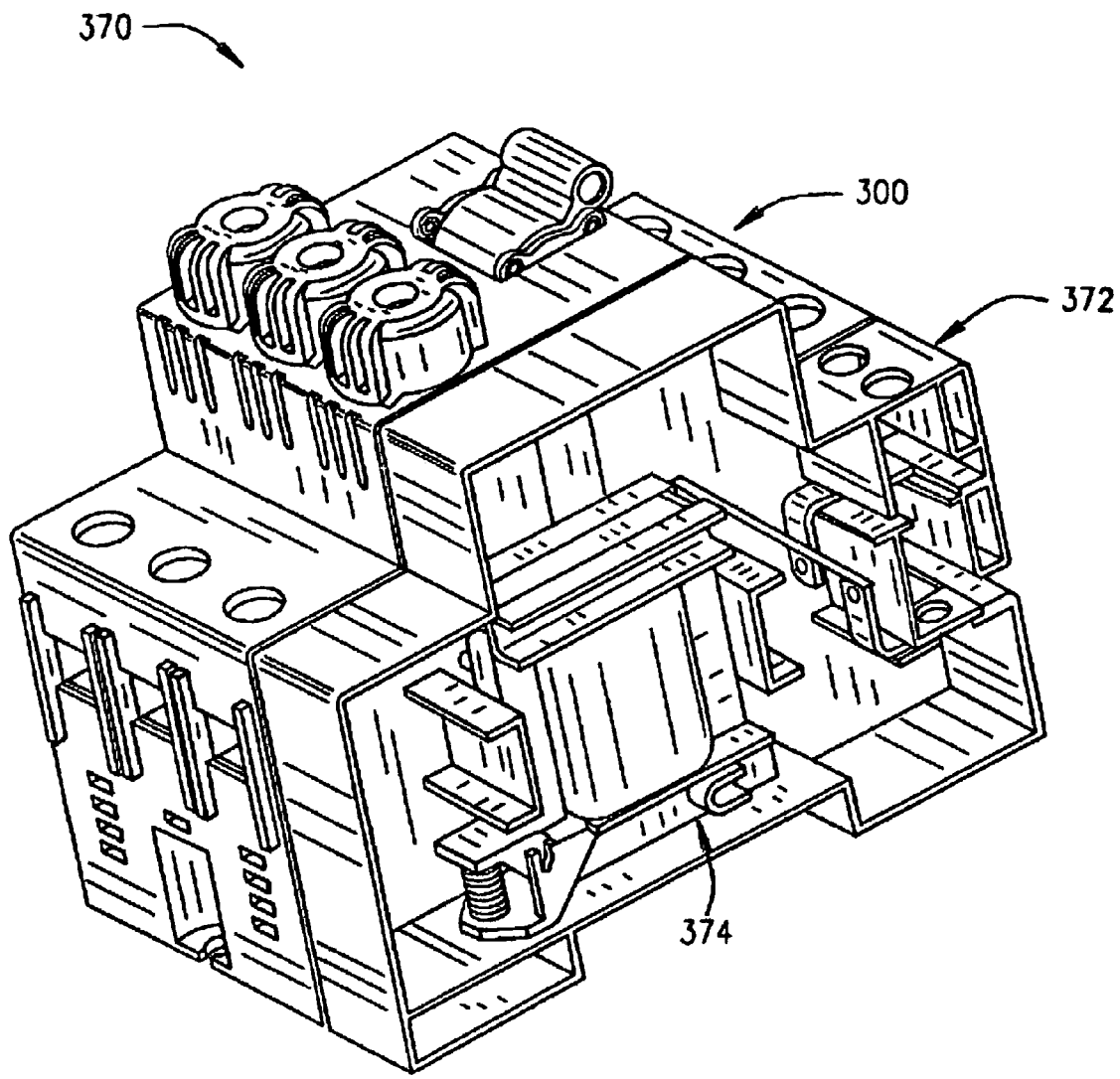
FIG. 10 is a perspective view of a sixth embodiment of a fusible switching disconnect device.

FIG. 10 is a perspective view of a sixth exemplary embodiment of a fusible switching disconnect device 370 including the disconnect module 300 described above and, for example, an under voltage module 372 mounted to one side of the module 300 and mechanically linked to the switch mechanism in the module 300. In an exemplary embodiment, the under voltage module 372 may include an electromagnetic coil 374 calibrated to a predetermined voltage range. When the voltage drops below the range, the electromagnetic coil causes the switch contacts in the module 300 to open. A similar module 372 could be employed in an alternative embodiment to open the switch contacts when the voltage experienced by the electromagnetic exceeds a predetermined voltage range, and may therefore serve as an overvoltage module. In such a manner, the switch contact in the module 300 could be opened with module 372 and the coil 374 as undervoltage or overvoltage conditions occur.

Figure 11:
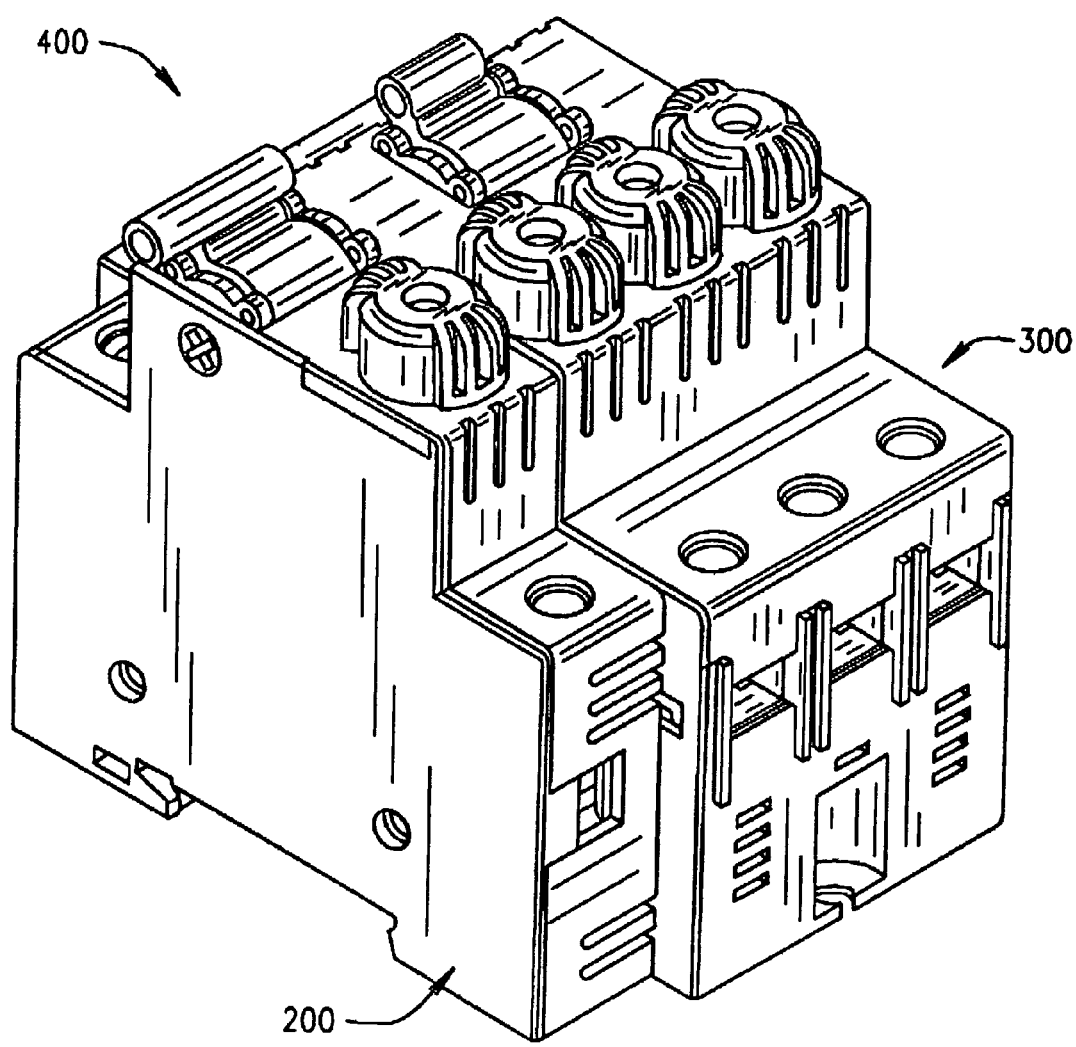
FIG. 11 is a perspective view of a seventh embodiment of a fusible switching disconnect device.

FIG. 11 is a perspective view of a seventh exemplary embodiment of a fusible switching disconnect device 400 which is essentially the disconnect device 300 and a disconnect device 220 coupled together. The disconnect device 300 provides three poles for an AC power circuit and the device 220 provides an additional pole for other purposes.

Figure 12:
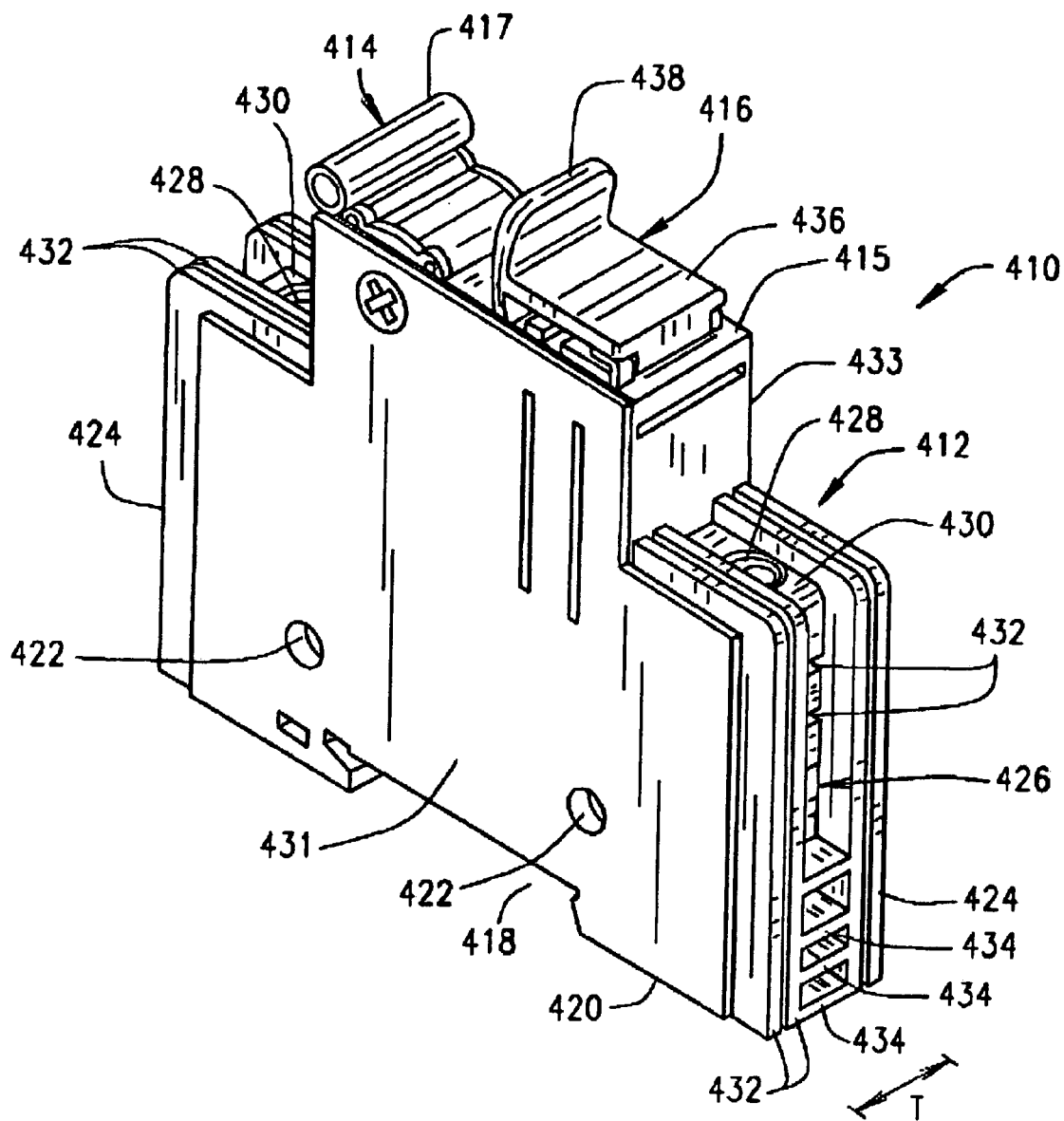
FIG. 12 is a perspective view of an eighth embodiment of a fusible switching disconnect device in a closed position.

FIG. 12 is a perspective view of an eighth embodiment of a fusible switching disconnect module 410 that, like the foregoing embodiments, includes a nonconductive housing 412, a switch actuator 414 extending through a raised upper surface 415 of the housing 412, and a cover 416 that provides access to a fuse receptacle (not shown in FIG. 12) within the housing 412 for installation and replacement of an overcurrent protection fuse (also not shown in FIG. 12). Like the foregoing embodiments, the housing 412 includes switchable and stationary contacts (not shown in FIG. 12) that complete or break an electrical connection through the fuse in the housing 412 via movement of an actuator lever 417.

A DIN rail mounting slot 418 may be formed in a lower edge 420 of the housing 412, and the DIN rail mounting slot 418 may be dimensioned, for example, for snap-fit engagement and disengagement with a 35 mm DIN rail by hand and without a need of tools. The housing 412 may also include openings 422 that may be used to gang the module 410 to other disconnect modules as explained below. Side edges 424 of the housing 412 may be open ended to provide access to wire lug terminals 426 to establish line and load-side electrical connections external circuitry. Terminal access openings 428 may be provided in recessed upper surfaces 430 of the housing 412. A stripped wire, for example, may be extended through the sides of the wire lug terminals 426 and a screwdriver may be inserted through the access openings 428 to tighten a terminal screw to clamp the wires to the terminals 426 and connect line and load circuitry to the module 410. While wire lug terminals 426 are included in one embodiment, it is recognized that a variety of alternative terminal configurations or types may be utilized in other embodiments to establish line and load side electrical connections to the module 410 via wires, cables, bus bars etc.

Like the foregoing embodiments, the housing 412 is sized and dimensioned complementary to and compatible with DIN and IEC standards, and the housing 412 defines an area or footprint on the lower edge 420 for use with standardized openings having a complementary shape and dimension. By way of example only, the housing 412 of the single pole module 410 may have a thickness T of about 17.5 mm for a breaking capacity of up to 32 A; 26 mm for a breaking capacity of up 50 A; 34 mm for a breaking capacity of up to 125 A; and 40 mm for a breaking capacity of up to 150 A per DIN Standard 43 880. Likewise, it is understood that the module 410 could be fabricated as a multiple pole device such as a three pole device having a dimension T of about 45 mm for a breaking capacity of up to 32 A; 55 mm for a breaking capacity of up to 50 A; and 75 mm for a breaking capacity of up to 125 A. While exemplary dimensions are provided, it is understood that other dimensions of greater or lesser values may likewise be employed in alternative embodiments of the invention.

Additionally, and as illustrated in FIG. 12, the side edges 424 of the housing 412 may include opposed pairs of vertically oriented flanges 432 spaced from one another and projecting away from the wire lug terminals 426 adjacent the housing upper surface 430 and the sides of the wire lug terminals 426. The flanges 432, sometimes referred to as wings, provide an increased surface area of the housing 412 in a horizontal plane extending between the wire lug terminals 426 on the opposing side edges 424 of the housing 412 than would otherwise occur if the flanges 432 were not present. That is, a peripheral outer surface area path length extending in a plane parallel to the lower surface 420 of the housing 412 includes the sum of the exterior surface dimensions of one of the pairs of flanges 432 extending from one of the terminals 426, the exterior dimensions of the respective front or rear panel 431, 433 of the housing, and the exterior surface dimensions of the opposing flanges 432 extending to the opposite terminal 426.

Additionally, the housing 412 may also include horizontally extending ribs or shelves 434 spaced from one another and interconnecting the innermost flanges 432 in a lower portion of the housing side edges 424. The ribs or shelves 434 increase a surface area path length between the terminals 426 in a vertical plane of the housing 412 to meet external requirements for spacing between the terminals 426. The flanges 432 and ribs 434 result in serpentine-shaped surface areas in horizontal and vertical planes of the housing 412 that permit greater voltage ratings of the device without increasing the footprint of the module 410 in comparison, for example, to the previously described embodiments of FIGS. 1-11. For example, the flanges 432 and the ribs 434, facilitate a voltage rating of 600 VAC while meeting applicable internal and external spacing requirements between the terminals 426 under applicable UL standards.

The cover 416, unlike the above-described embodiments, may include a substantially flat cover portion 436, and an upstanding finger grip portion 438 projecting upwardly and outwardly from one end of the flat cover portion 436 and facing the switch actuator 414. The cover may be fabricated from a nonconductive material or insulative material such as plastic according to known techniques, and the flat cover portion 436 may be hinged at an end thereof opposite the finger grip portion 438 so that the cover portion 436 is pivotal about the hinge. By virtue of the hinge, the finger grip portion 438 is movable away from the switch actuator along an arcuate path as further explained below. As illustrated in FIG. 12, the cover 416 is in a closed position concealing the fuse within the housing 412, and as explained below, the cover 416 is movable to an open position providing access to the fuse in the disconnect module 410.

Figure 13:
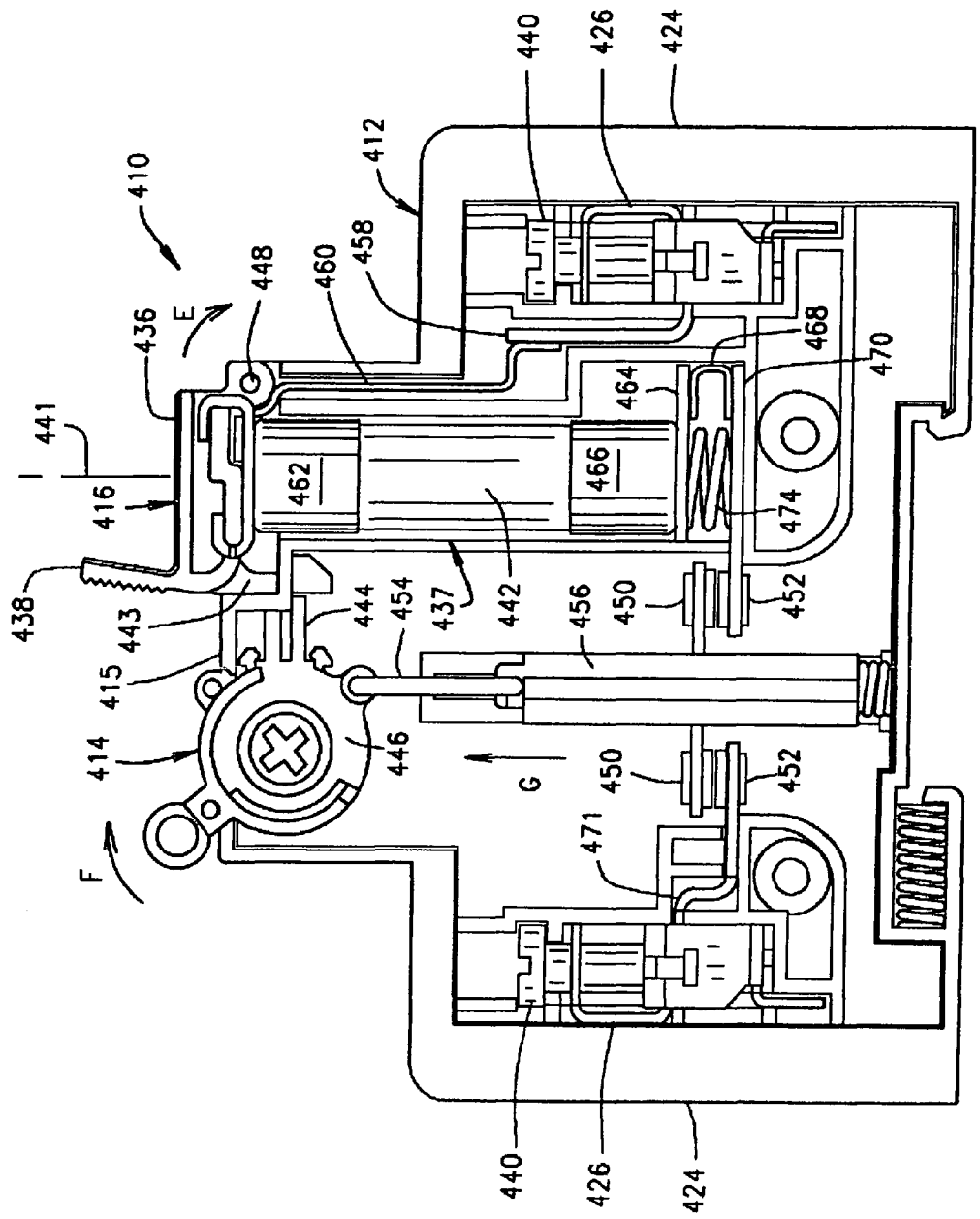
FIG. 13 is a side elevational view of a portion of the fusible switching disconnect device shown in FIG. 12.

FIG. 13 is a side elevational view of the module 410 with the front panel 431 (FIG. 12) removed so that internal components and features may be seen. The wire lug terminals 426 and terminal screws 440 are positioned adjacent the side edges 424 of the housing 412. A fuse 442 is loaded or inserted into the module 410 in a direction substantially perpendicular to the housing upper surface 415, and as illustrated in FIG. 13, a longitudinal axis 441 of the fuse 442 extends vertically, as opposed to horizontally, within the housing 412. The fuse 442 is contained within the housing 412 beneath the cover 416, and more specifically beneath the flat cover portion 436. The fuse 442 is situated longitudinally in a fuse receptacle 437 integrally formed in the housing 412. That is, the fuse receptacle 437 is not movable relative to the housing 412 for loading and unloading of the fuse 442. The fuse 442 is received in the receptacle 437 with one end of the fuse 442 positioned adjacent and beneath the cover 416 and the module top surface 415 and the other end of the fuse 442 spaced from the cover 416 and the module upper surface 415 by a distance equal to the length of the fuse 442. An actuator interlock 443 is formed with the cover 416 and extends downwardly into the housing 412 adjacent and alongside the fuse receptacle 437. The actuator interlock 443 of the cover 416 extends opposite and away from the cover finger grip portion 438.

A cover lockout tab 444 extends radially outwardly from a cylindrical body 446 of the switch actuator 414, and when the switch actuator 414 is in the closed position illustrated in FIG. 13 completing an electrical connection through the fuse 442, the cover lockout tab 444 is extended generally perpendicular to the actuator interlock 443 of the cover 416 and a distal end of the cover lockout tab 444 is positioned adjacent the actuator interlock 443 of the cover 416. The cover lockout tab 444 therefore directly opposes movement of the actuator interlock 443 and resists any attempt by a user to rotate the cover 416 about the cover hinge 448 in the direction of arrow E to open the cover 416. In such a manner, the fuse 442 cannot be accessed without first rotating the switch actuator 414 in the direction of arrow F to move the pair of switchable contacts 450 away from the stationary contacts 452 via the actuator link 454 and sliding bar 456 carrying the switchable contacts 450 in a similar manner to the foregoing embodiments. Inadvertent contact with energized portions of the fuse 442 is therefore prevented, as the cover 416 can only be opened to access the fuse 442 after the circuit through the fuse 442 is disconnected via the switchable contacts 450, thereby providing a degree of safety to human operators of the module 410. Additionally, and because the cover 416 conceals the fuse 442 when the switchable contacts 450 are closed, the outer surfaces of the housing 412 and the cover 416 are touch safe.

A conductive path through the housing 412 and fuse 442 is established as follows. A rigid terminal member 458 is extended from the load side terminal 426 closest to the fuse 442 on one side of the housing 412. A flexible contact member 460, such as a wire may be connected to the terminal member 458 at one end and attached to an inner surface of the cover 416 at the opposite end. When the cover 416 is closed, the contact member 460 is brought into mechanical and electrical engagement with an upper ferrule or end cap 462 of the fuse 442. A movable lower fuse terminal 464 is mechanically and electrically connected to the lower fuse ferrule or end cap 466, and a flexible contact member 468 interconnects the movable lower fuse terminal 464 to a stationary terminal 470 that carries one of the stationary contacts 452. The switchable contacts 450 interconnect the stationary contacts 452 when the switch actuator 414 is closed as shown in FIG. 13. A rigid terminal member 471 completes the circuit path to the line side terminal 426 on the opposing side of the housing 412. In use, current flows through the circuit path from the line side terminal 426 and the terminal member 471, through the switchable contacts 450 and 452 to the terminal member 470. From the terminal member 470, current flows through the contact member 468 to the lower fuse terminal 464 and through the fuse 442. After flowing through the fuse 442, current flows to the contact member 460 to the terminal member 458 and to the line side terminal 426.

The fuse 442 in different exemplary embodiments may be a commercially available 10X38 Midget fuse of Cooper/Bussmann of St. Louis, Mo.; an IEC 10X38 fuse; a class CC fuse; or a D/DO European style fuse. Additionally, and as desired, optional fuse rejection features may be formed in the lower fuse terminal 464 or elsewhere in the module, and cooperate with fuse rejection features of the fuses so that only certain types of fuses may be properly installed in the module 410. While certain examples of fuses are herein described, it is understood that other types and configurations of fuses may also be employed in alternative embodiments, including but not limited to various types of cylindrical or cartridge fuses and rectangular fuse modules.

Figure 14:
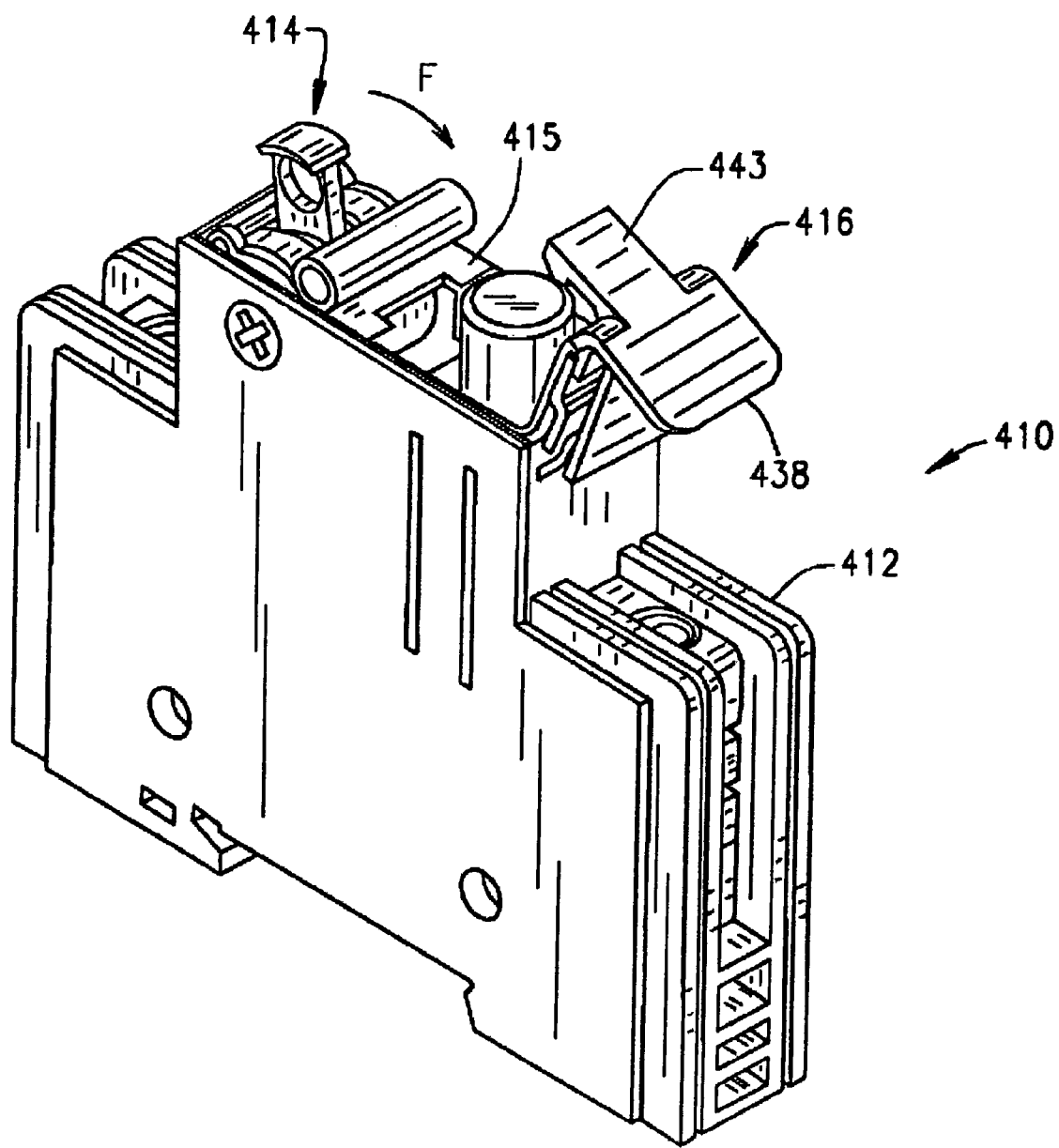
FIG. 14 is a perspective view of the fusible switching disconnect device shown in FIGS. 12 and 13 in an opened position.

A biasing element 474 may be provided between the movable lower fuse terminal 464 and the stationary terminal 470. The bias element 474 may be for example, a helical coil spring that is compressed to provide an upward biasing force in the direction of arrow G to ensure mechanical and electrical engagement of the movable lower fuse terminal 464 to the lower fuse ferrule 466 and mechanical and electrical engagement between the upper fuse ferrule 462 and the flexible contact member 460. When the cover 416 is opened in the direction of arrow E to the open position, the bias element 474 forces the fuse upward along its axis 441 in the direction of arrow G as shown in FIG. 14, exposing the fuse 442 through the raised upper surface 415 of the housing 412 for easy retrieval by an operator for replacement. That is, the fuse 442, by virtue of the bias element 474, is automatically lifted and ejected from the housing 412 when the cover 416 is rotated about the hinge 448 in the direction of arrow E after the switch actuator 414 is rotated in the direction of arrow F.

Figure 15:
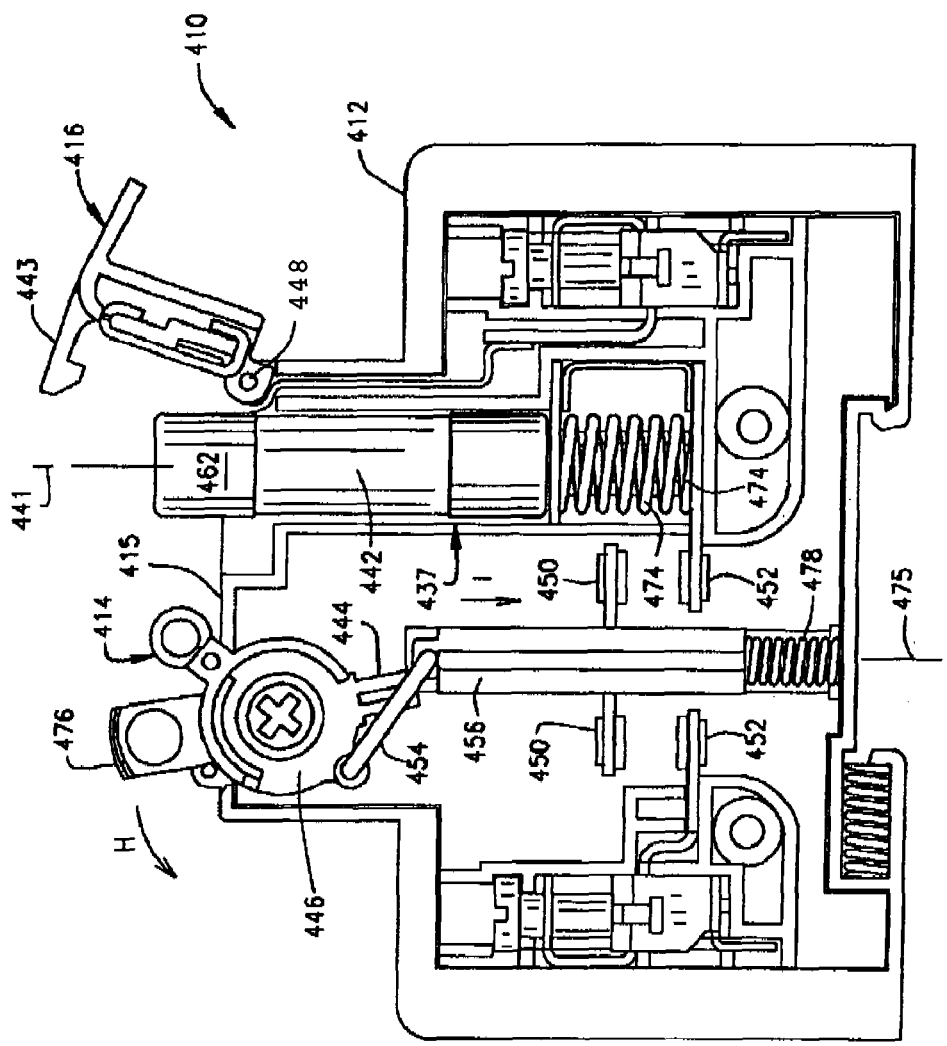
FIG. 15 is a side elevational view of a portion of the fusible switching disconnect device shown in FIG. 14.

FIG. 15 is a side elevational view of the module 410 with the cover 416 pivoted about the hinge 448 and the switch actuator 414 in the open position. The switchable contacts 450 are moved upwardly by rotation of the actuator 414 and the displacement of the actuator link 454 causes the sliding bar 456 to move along a linear axis 475 substantially parallel to the axis 441 of the fuse 442, physically separating the switchable contacts 450 from the stationary contacts 452 within the housing 412 and disconnecting the conductive path through the fuse 442. Additionally, and because of the pair of switchable contacts 450, electrical arcing is distributed among more than one location as described above.

The bias element 474 deflects when the cover 416 is opened after the actuator 414 is moved to the open position, and the bias element 474 lifts the fuse 442 from the housing 412 so that the upper fuse ferrule 462 is extended above the top surface 415 of the housing. In such a position, the fuse 442 may be easily grasped and pulled out of or extracted from the module 410 along the axis 441. Fuses may therefore be easily removed from the module 410 for replacement.

Also when the actuator 414 is moved to the open position, an actuator lockout tab 476 extends radially outwardly from the switch actuator body 446 and may accept for example, a padlock to prevent inadvertent closure of the actuator 414 in the direction of arrow H that would otherwise cause the slider bar 456 to move downward in the direction of arrow I along the axis 475 and engage the switchable contacts 450 to the stationary contacts 452, again completing the electrical connection to the fuse 442 and presenting a safety hazard to operators. When desired, the cover 416 may be rotated back about the hinge 448 to the closed position shown in FIGS. 12 and 13, and the switch actuator 414 may be rotated in the direction of arrow H to move the cover lockout tab 444 into engagement with the actuator interlock 443 of the cover 416 to maintain each of the cover 416 and the actuator 414 in static equilibrium in a closed and locked position. Closure of the cover 416 requires some force to overcome the resistance of the bias spring 474 in the fuse receptacle 437, and movement of the actuator to the closed position requires some force to overcome the resistance of a bias element 478 associated with the sliding bar 456, making inadvertent closure of the contacts and completion of the circuit through the module 410 much less likely.

Figure 16:
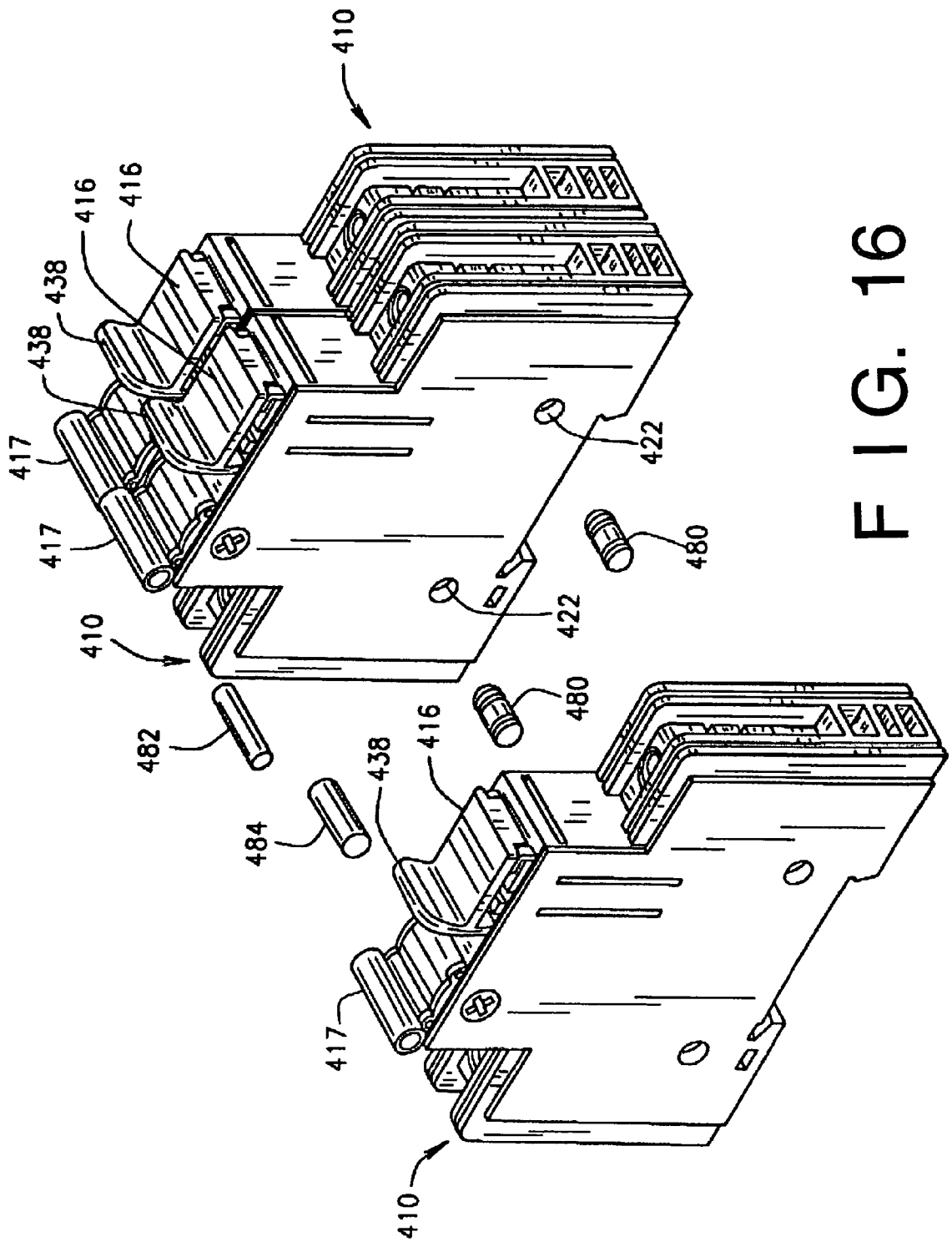
FIG. 16 is a perspective view of a ganged arrangement of fusible switching devices shown in FIGS. 12-15.

FIG. 16 is a perspective view of a ganged arrangement of fusible switching disconnect modules 410. Connector pieces 480 may be fabricated from plastic, for example, and may be used with the openings 422 in the housing panels to retain modules 410 in a side-by-side relation to one another with, for example, snap fit engagement. Pins 482 and/or shims 484, for example, may be utilized to join or tie the actuator levers 417 and cover finger grip portions 438 of each module 410 to one another so that all of the actuator levers 417 and/or of all of the covers 416 of the combined modules 410 are simultaneously moved with one another. Simultaneous movement of the covers 416 and levers 417 may be especially advantageous for breaking three phase current or, as another example, when switching power to related equipment, such as motor and a cooling fan for the motor so that one does not run without the other.

While single pole modules 410 ganged to one another to form multiple pole devices has been described, it is understood that a multiple pole device having the features of the module 410 could be constructed in a single housing with appropriate modification of the embodiment shown in FIGS. 8 and 9, for example.

Figure 17:
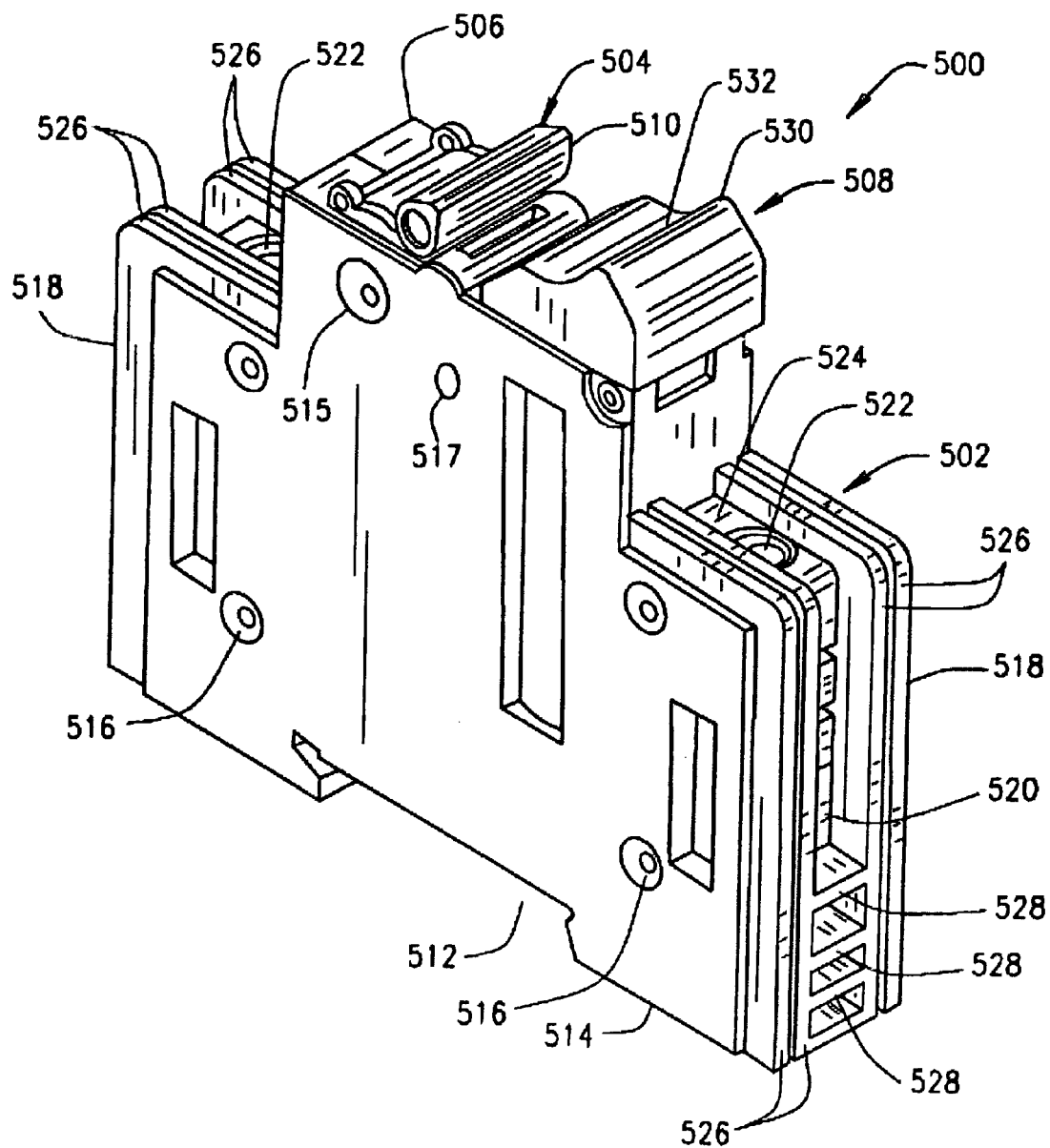
FIG. 17 is a perspective view of a ninth embodiment of a fusible switching disconnect device in a closed position.

FIG. 17 is a perspective view of a ninth embodiment of a fusible switching disconnect module 500 that, like the foregoing embodiments, includes a single pole housing 502, a switch actuator 504 extending through a raised upper surface 506 of the housing 502, and a cover 508 that provides access to a fuse receptacle (not shown in FIG. 17) within the housing 502 for installation and replacement of an overcurrent protection fuse (also not shown in FIG. 17). Like the foregoing embodiments, the housing 502 includes switchable and stationary contacts (not shown in FIG. 17) that connect or disconnect an electrical connection through the fuse in the housing 502 via movement of an actuator lever 510.

Similar to the module 410, the module 500 may include a DIN rail mounting slot 512 formed in a lower edge 514 of the housing 502 for mounting of the housing 502 without a need of tools. The housing 502 may also include an actuator opening 515 providing access to the body of the switch actuator 504 so that the actuator 504 may be rotated between the open and closed positions in an automated manner and facilitate remote control of the module 500. Openings 516 are also provided that may be used to gang the module 500 to other disconnect modules. A curved or arcuate tripping guide slot 517 is also formed in a front panel of the housing 502. A slidable tripping mechanism, described below, is selectively positionable within the slot 517 to trip the module 500 and disconnect the current path therethrough upon an occurrence of predetermined circuit conditions. The slot 517 also provides access to the tripping mechanism for manual tripping of the mechanism with a tool, or to facilitate remote tripping capability.

Side edges 518 of the housing 502 may be open ended to provide access to line and load side wire lug terminals 520 to establish line and load-side electrical connections to the module 500, although it is understood that other types of terminals may be used. Terminal access openings 522 may be provided in recessed upper surfaces 524 of the housing 502 to receive a stripped wire or other conductor extended through the sides of the wire lug terminals 520, and a screwdriver may be inserted through the access openings 522 to connect line and load circuitry to the module 500. Like the foregoing embodiments, the housing 502 is sized and dimensioned complementary to and compatible with DIN and IEC standards, and the housing 502 defines an area or footprint on the lower surface 514 of the housing for use with standardized openings having a complementary shape and dimension.

Like the module 410 described above, the side edges 518 of the housing 502 may include opposed pairs of vertically oriented flanges or wings 526 spaced from one another and projecting away from the wire lug terminals 520 adjacent the housing upper surface 524 and the sides of the wire lug terminals 520. The housing 502 may also include horizontally extending ribs or shelves 528 spaced from one another and interconnecting the innermost flanges 526 in a lower portion of the housing side edges 518. The flanges 526 and ribs 528 result in serpentine-shaped surface areas in horizontal and vertical planes of the housing 502 that permit greater voltage ratings of the device without increasing the footprint of the module 500 as explained above.

The cover 508, unlike the above-described embodiments, may include a contoured outer surface defining a peak 530 and a concave section 532 sloping downwardly from the peak 530 and facing the switch actuator 504. The peak 530 and the concave section 532 form a finger cradle area on the surface of the cover 508 and is suitable for example, to serve as a thumb rest for an operator to open or close the cover 508. The cover 508 may be hinged at an end thereof closest to the peak 530 so that the cover 508 is pivotal about the hinge and the cover 508 is movable away from the switch actuator 504 along an arcuate path. As illustrated in FIG. 17, the cover 508 is in a closed touch safe position concealing the fuse within the housing 502, and as explained below, the cover 508 is movable to an open position providing access to the fuse.

Figure 18:
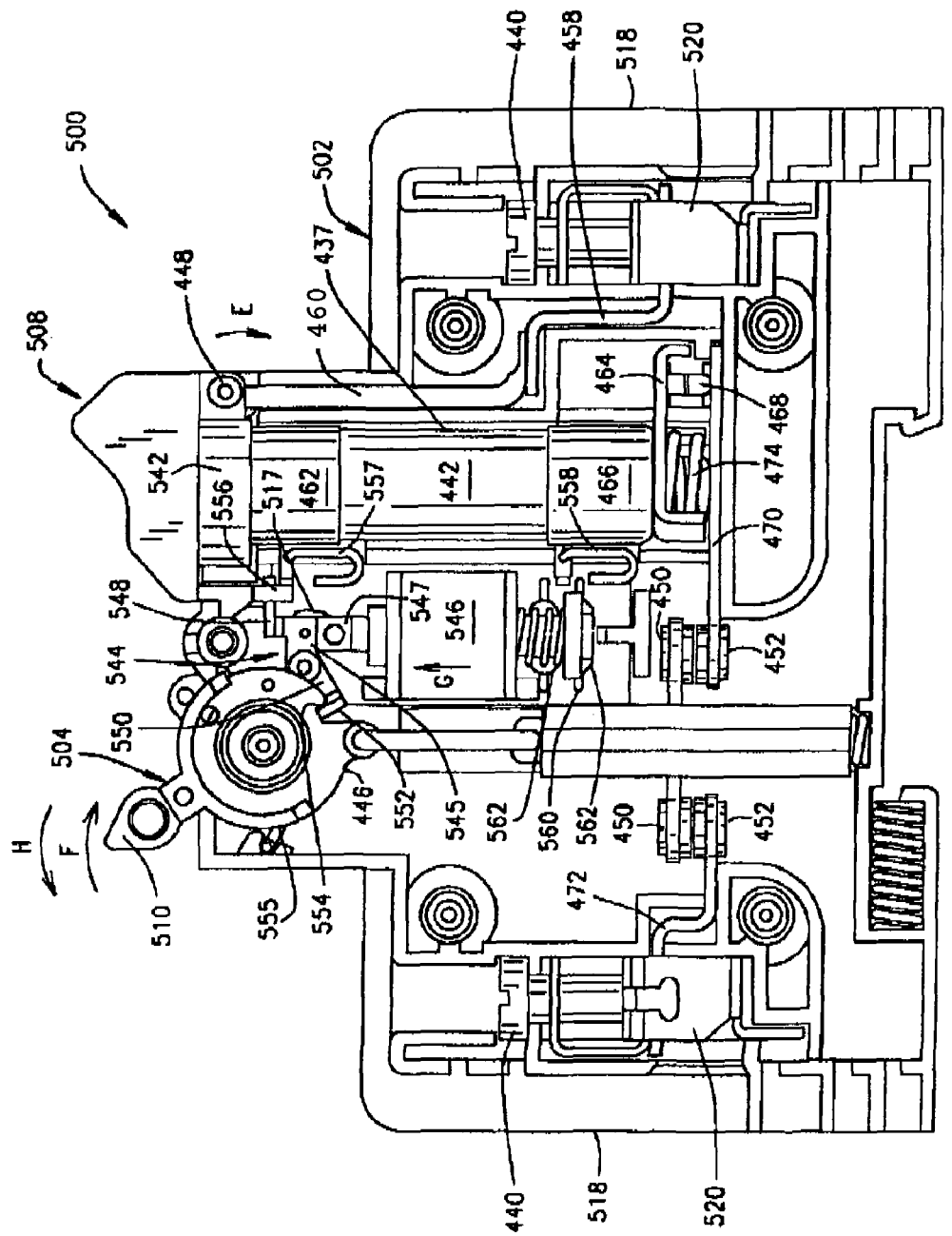
FIG. 18 is a side elevational view of a portion of the fusible switching disconnect device shown in FIG. 17.

FIG. 18 is a side elevational view of a portion of the fusible switching disconnect module 500 with a front panel thereof removed so that internal components and features may be seen. In some aspects the module 500 is similar to the module 410 described above in its internal components, and for brevity like features of the modules 500 and 410 are indicated with like reference characters in FIG. 18.

The wire lug terminals 520 and terminal screws 440 are positioned adjacent the side edges 518 of the housing 502. The fuse 442 is vertically loaded into the housing 502 beneath the cover 508, and the fuse 442 is situated in the non-movable fuse receptacle 437 formed in the housing 502. The cover 508 may be formed with a conductive contact member that may be, for example, cup-shaped to receive the upper fuse ferrule 462 when the cover 508 is closed.

A conductive circuit path is established from the line side terminal 520 and the terminal member 472, through the switch contacts 450 and 452 to the terminal member 470. From the terminal member 470, current flows through the contact member 468 to the lower fuse terminal 464 and through the fuse 442. After flowing through the fuse 442, current flows from the conductive contact member 542 of the cover 508 to the contact member 460 connected to the conductive contact member 542, and from the contact member 460 to the terminal member 458 and to the line side terminal 520.

A biasing element 474 may be provided between the movable lower fuse terminal 464 and the stationary terminal 470 as described above to ensure mechanical and electrical connection between the cover contact member 542 and the upper fuse ferrule 462 and between the lower fuse terminal 464 and the lower fuse ferrule 466. Also, the bias element 474 automatically ejects the fuse 442 from the housing 502 as described above when the cover 508 is rotated about the hinge 448 in the direction of arrow E after the switch actuator 504 is rotated in the direction of arrow F.

Unlike the module 410, the module 500 may further include a tripping mechanism 544 in the form of a slidably mounted trip bar 545 and a solenoid 546 connected in parallel across the fuse 442. The trip bar 545 is slidably mounted to the tripping guide slot 517 formed in the housing 502, and in an exemplary embodiment the trip bar 545 may include a solenoid arm 547, a cover interlock arm 548 extending substantially perpendicular to the solenoid arm 547, and a support arm 550 extending obliquely to each of the solenoid arm 547 and cover interlock arm 548. The support arm 550 may include a latch tab 552 on a distal end thereof. The body 446 of the switch actuator 504 may be formed with a ledge 554 that cooperates with the latch tab 552 to maintain the trip bar 545 and the switch actuator 504 in static equilibrium with the solenoid arm 547 resting on an upper surface of the solenoid 546.

A torsion spring 555 is connected to the housing 502 one end and the actuator body 446 on the other end, and the torsion spring 555 biases the switch actuator 504 in the direction of arrow F to the open position. That is, the torsion spring 555 is resistant to movement of the actuator 504 in the direction of arrow H and tends to force the actuator body 446 to rotate in the direction of arrow F to the open position. Thus, the actuator 504 is failsafe by virtue of the torsion spring 555, If the switch actuator 504 is not completely closed, the torsion spring 555 will force it to the open position and prevent inadvertent closure of the actuator switchable contacts 450, together with safety and reliability issues associated with incomplete closure of the switchable contacts 450 relative to the stationary contacts 452.

In normal operating conditions when the actuator 504 is in the closed position, the tendency of the torsion spring 555 to move the actuator to the open position is counteracted by the support arm 550 of the trip bar 545 as shown in FIG. 18. The latch tab 552 of the support arm 550 engages the ledge 554 of the actuator body 446 and holds the actuator 504 stably in static equilibrium in a closed and locked position. Once the latch tab 552 is released from the ledge 554 of the actuator body 446, however, the torsion spring 555 forces the actuator 504 to the open position.

An actuator interlock 556 is formed with the cover 508 and extends downwardly into the housing 502 adjacent the fuse receptacle 437. The cover interlock arm 548 of the trip bar 545 is received in the actuator interlock 556 of the cover 508 and prevents the cover 508 from being opened unless the switch actuator 504 is rotated in the direction of arrow F as explained below to move the trip bar 545 and release the cover interlock arm 548 of the trip bar 545 from the actuator interlock 556 of the cover 508. Deliberate rotation of the actuator 504 in the direction of arrow F causes the latch tab 552 of the support arm 550 of the trip bar 545 to be pivoted away from the actuator and causes the solenoid arm 547 to become inclined or angled relative to the solenoid 546. Inclination of the trip bar 545 results in an unstable position and the torsion spring 555 forces the actuator 504 to rotate and further pivot the trip bar 545 to the point of release.

Absent deliberate movement of the actuator to the open position in the direction of arrow F, the trip bar 545, via the interlock arm 548, directly opposes movement of the cover 508 and resists any attempt by a user to rotate the cover 508 about the cover hinge 448 in the direction of arrow E to open the cover 508 while the switch actuator 504 is closed and the switchable contacts 450 are engaged to the stationary contacts 452 to complete a circuit path through the fuse 442. Inadvertent contact with energized portions of the fuse 442 is therefore prevented, as the fuse can only be accessed when the circuit through the fuse is broken via the switchable contacts 450, thereby providing a degree of safety to human operators of the module 500.

Upper and lower solenoid contact members 557, 558 are provided and establish electrical contact with the respective upper and lower ferrules 462, 466 of the fuse 442 when the cover 508 is closed over the fuse 442. The contact members 557, 558 establish, in turn, electrical contact to a circuit board 560. Resistors 562 are connected to the circuit board 560 and define a high resistance parallel circuit path across the ferrules 462, 466 of the fuse 442, and the solenoid 546 is connected to this parallel circuit path on the circuit board 560. In an exemplary embodiment, the resistance is selected so that, in normal operation, substantially all of the current flow passes through the fuse 442 between the fuse ferrules 462, 466 instead of through the upper and lower solenoid contact members 557, 558 and the circuit board 560. The coil of the solenoid 546 is calibrated so that when the solenoid 546 experiences a predetermined voltage, the solenoid generates an upward force in the direction of arrow G that causes the trip bar 545 to be displaced in the tripping guide slot 517 along an arcuate path defined by the slot 517.

As those in the art may appreciate, the coil of the solenoid 546 may be calibrated to be responsive to a predetermined undervoltage condition or a predetermined overvoltage condition as desired. Additionally, the circuit board 560 may include circuitry to actively control operation of the solenoid 546 in response to circuit conditions. Contacts may further be provided on the circuit board 560 to facilitate remote control tripping of the solenoid 546. Thus, in response to abnormal circuit conditions that are predetermined by the calibration of the solenoid coil or control circuitry on the board 560, the solenoid 546 activates to displace the trip bar 545. Depending on the configuration of the solenoid 546 and/or the board 560, opening of the fuse 442 may or may not trigger an abnormal circuit condition causing the solenoid 546 to activate and displace the trip bar 545.

As the trip bar 545 traverses the arcuate path in the guide slot 517 when the solenoid 546 operates, the solenoid arm 547 is pivoted and becomes inclined or angled relative to the solenoid 546. Inclination of the solenoid arm 547 causes the trip bar 545 to become unstable and susceptible to force of the torsion spring 555 acting on the trip arm latch tab 552 via the ledge 554 in the actuator body 446. As the torsion spring 555 begins to rotate the actuator 504, the trip bar 545 is further pivoted due to engagement of the trip arm latch tab 552 and the actuator ledge 554 and becomes even more unstable and subject to the force of the torsion spring. The trip bar 545 is further moved and pivoted by the combined action of the guide slot 517 and the actuator 504 until the trip arm latch tab 552 is released from the actuator ledge 554, and the interlock arm 548 of the trip bar 545 is released from the actuator interlock 556. At this point, each of the actuator 504 and the cover 508 are freely rotatable.

Figure 19:
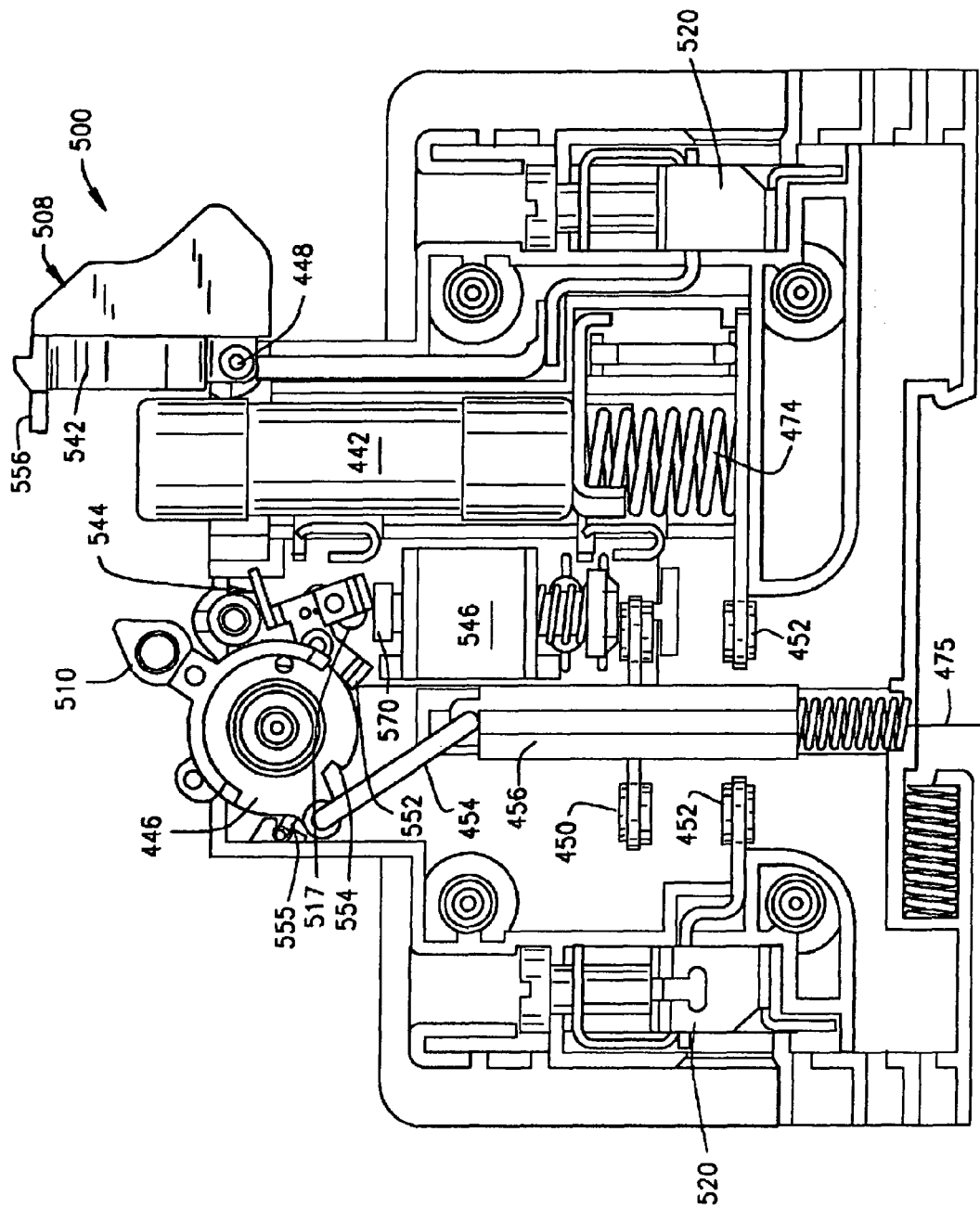
FIG. 19 is a side elevational view of the fusible switching disconnect device shown in FIG. 17 in an opened position.

FIG. 19 is a side elevational view of the fusible switching disconnect module 500 illustrating the solenoid 546 in a tripped position wherein a solenoid plunger 570 is displaced upwardly and engages the trip bar 545, causing the trip bar 545 to move along the curved guide slot 517 and become inclined and unstable relative to the plunger. As the trip bar 545 is displaced and pivoted to become unstable, the torsion spring 555 assists in causing the trip bar 545 to become more unstable as described above, until the ledge 554 of the actuator body 446 is released from the latch tab 552 of the trip bar 545, and the torsion spring 555 forces the actuator 504 to rotate completely to the open position shown in FIG. 19. As the actuator 504 rotates to the open position, the actuator link 454 pulls the sliding bar 456 upward along the linear axis 475 and separates the switchable contacts 450 from the stationary contacts 452 to open or disconnect the circuit path between the housing terminals 520. Additionally, the pivoting of the trip bar 545 releases the actuator interlock 556 of the cover 508, allowing the bias element 474 to force the fuse upwardly from the housing 502 and causing the cover 508 to pivot about the hinge 448 so that the fuse 442 is exposed for easy removal and replacement.

Figure 20:
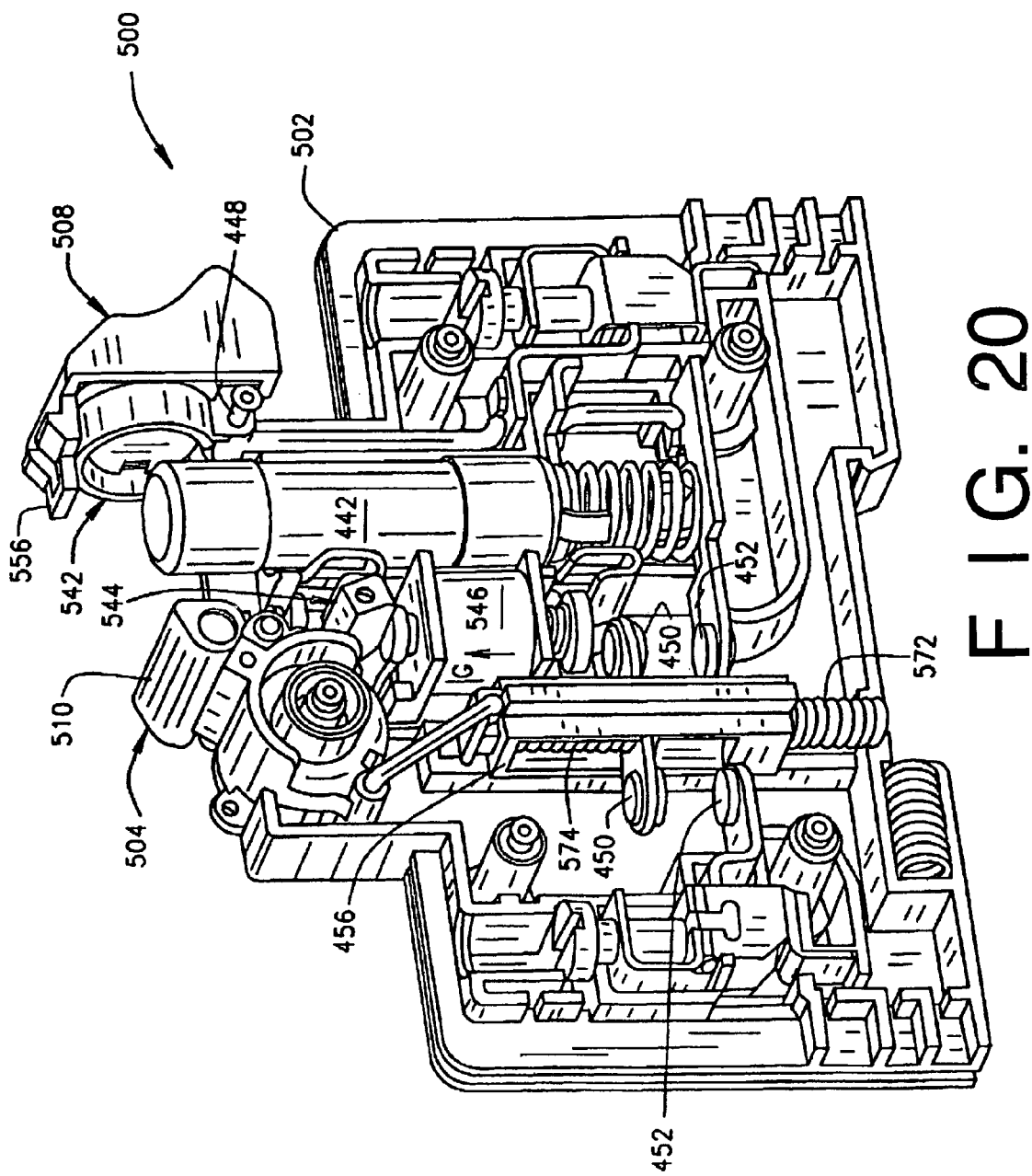
FIG. 20 is a perspective view of the fusible switching disconnect device shown in FIG. 19.

FIG. 20 is a perspective view of the fusible switching disconnect module 500 in the tripped position and the relative positions of the actuator 504, the trip bar 545 and the cover 508. As also shown in FIG. 20, the sliding bar 456 carrying the switchable contacts 450 may be assisted to the open position by a first bias element 572 external to the sliding bar 456 and a second bias element 574 internal to the sliding bar 456. The bias elements 572, 574 may be axially aligned with one another but oppositely loaded in one embodiment. The bias elements 572, 574 may be for example, helical coil spring elements, and the first bias element 572 may be loaded in compression, for example, while the second bias element 574 is loaded in tension. Therefore, the first bias element 572 exerts an upwardly directed pushing force on the sliding bar 456 while the second bias element 574 exerts an upwardly directed pulling force on the sliding bar 456. The combined forces of the bias elements 572, 574 force the sliding bar in an upward direction indicated by arrow G when the actuator is rotated to the open position as shown in FIG. 20. The double spring action of the bias elements 572, 574, together with the torsion spring 555 (FIGS. 18 and 19) acting on the actuator 504 ensures a rapid, automatic, and complete separation of the switchable contacts 450 from the fixed contacts 452 in a reliable manner. Additionally, the double spring action of the bias elements 572, 574 effectively prevents and/or compensates for contact bounce when the module 500 is operated.

Figure 21:
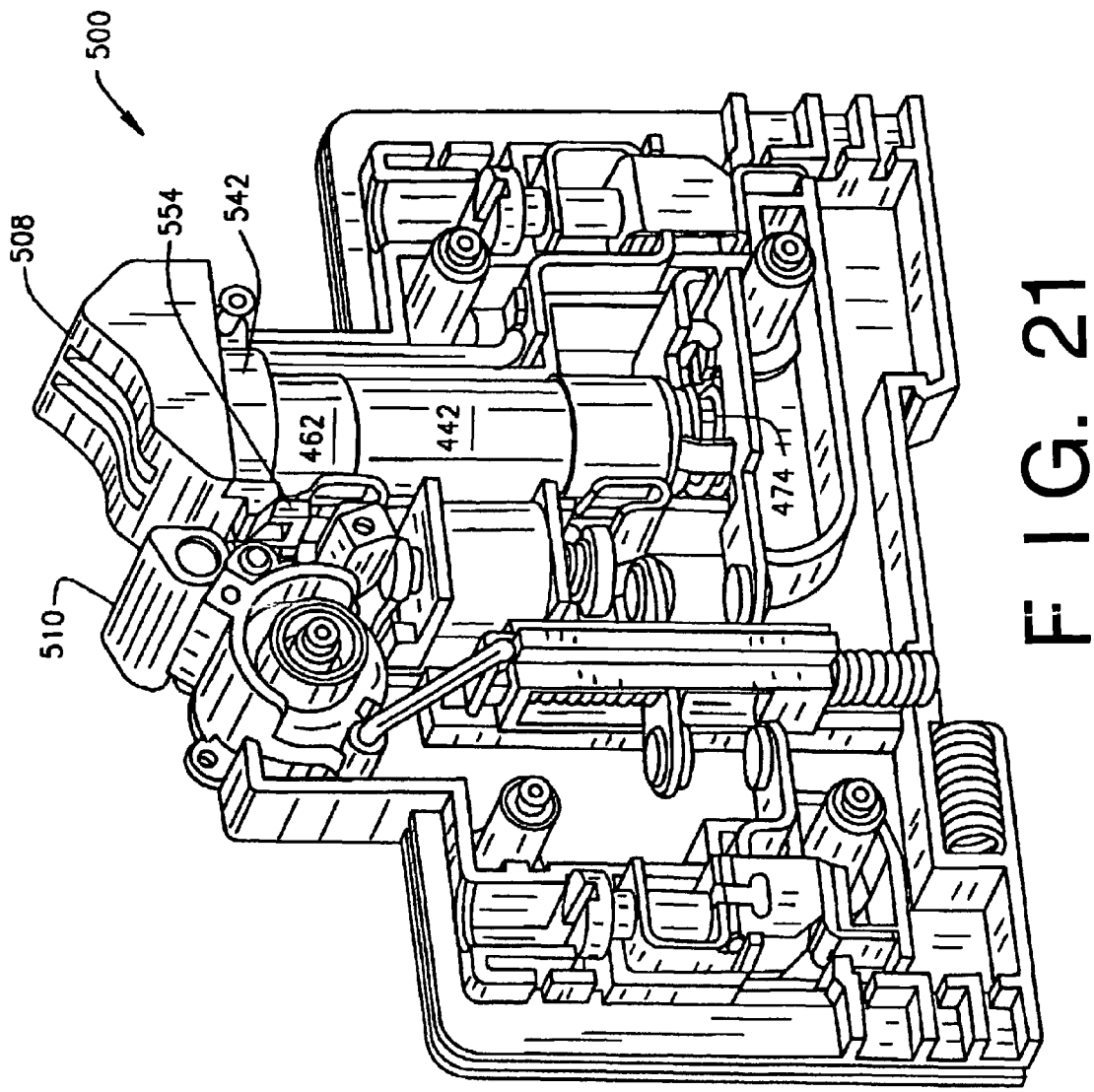
FIG. 21 is a perspective view of the fusible switching disconnect device shown in FIG. 20 in a closed position.
Figure 22:
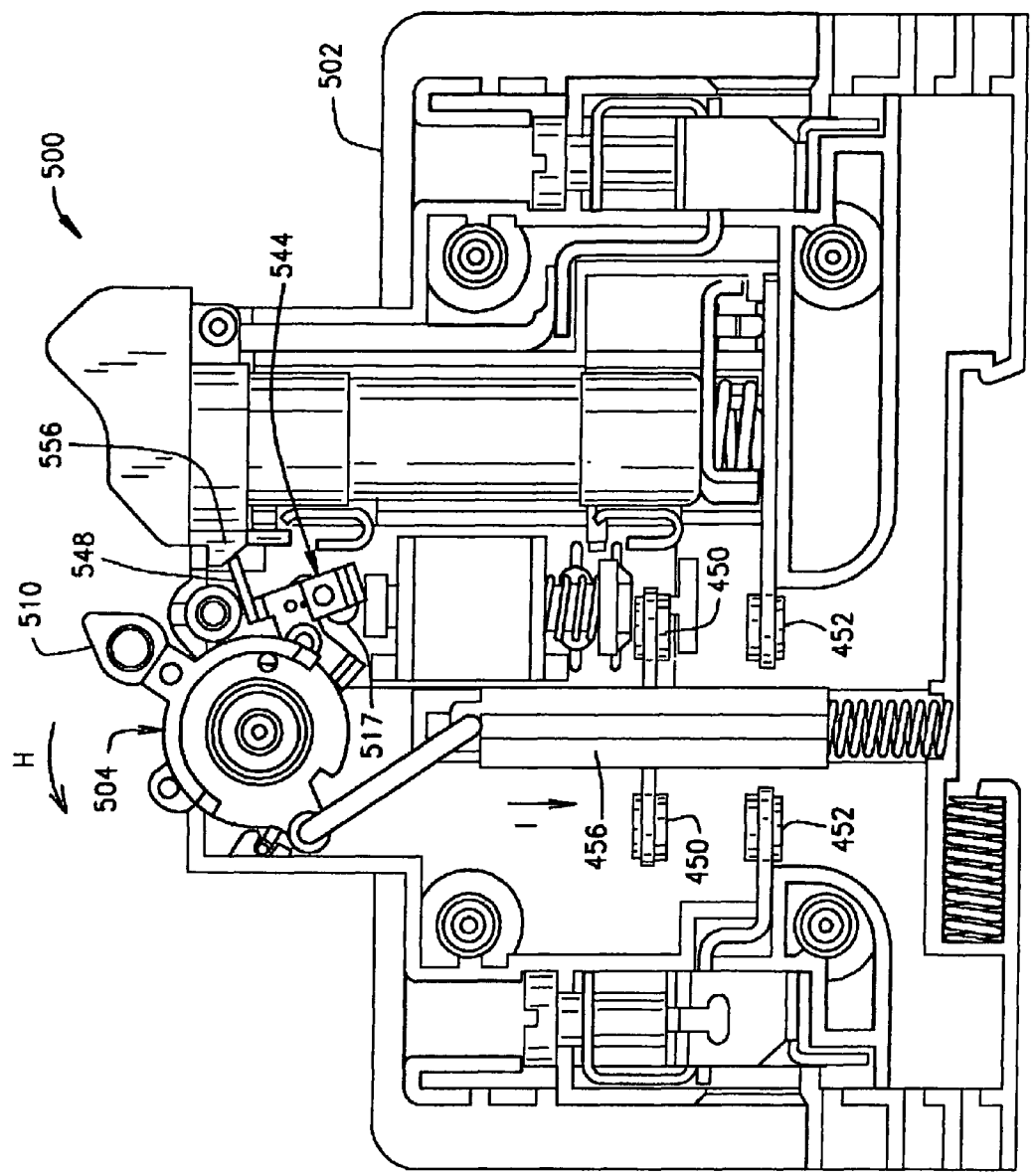
FIG. 22 is a side elevational view of the fusible switching device shown in FIG. 21.

As FIG. 20 also illustrates, the actuator interlock 556 of the cover 508 is substantially U-shaped in an exemplary embodiment. As seen in FIG. 21 the interlock 556 extends downwardly into the housing 502 when the cover 508 is in the closed position over the fuse 442, loading the bias element 474 in compression. FIG. 22 illustrates the cover interlock arm 548 of the trip bar 545 aligned with the actuator interlock 556 of the cover 508 when the cover 508 is in the closed position. In such a position, the actuator 504 may be rotated back in the direction of arrow H to move the sliding bar 456 downward in the direction of arrow I to engage the switchable contacts 450 to the stationary contacts 452 of the housing 502. As the actuator 504 is rotated in the direction of arrow H, the trip bar 545 is pivoted back to the position shown in FIG. 18, stably maintaining the actuator 504 in the closed position in an interlocked arrangement with the cover 508. The trip bar 545 may be spring loaded to further assist the tripping action of the module 500 and/or the return of the trip bar 545 to the stable position, or still further to bias the trip bar 545 to a predetermined position with respect to the tripping guide slot 517.

Figure 24:
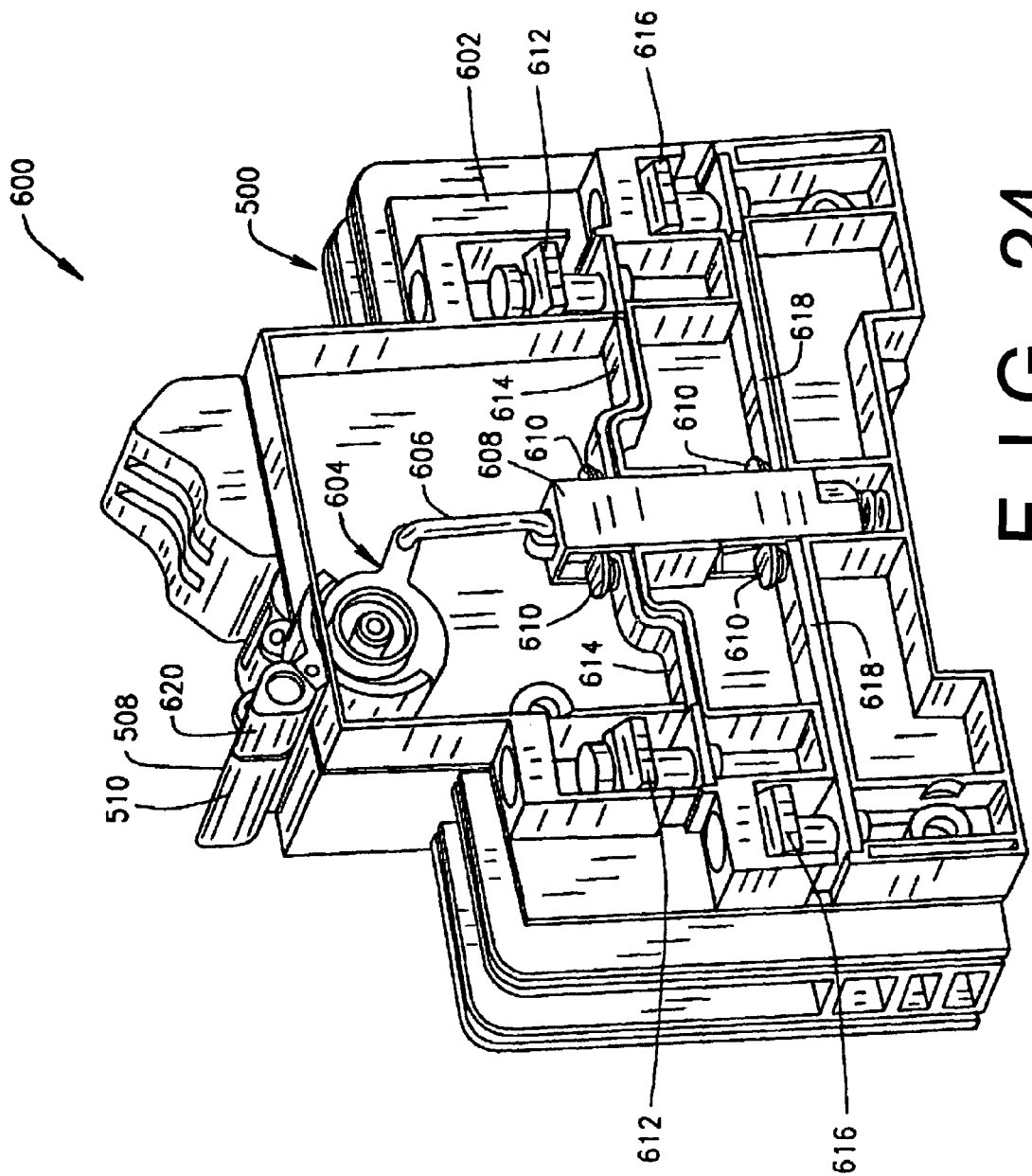
FIG. 24 is a perspective view of a portion of the fusible switching disconnect device shown in FIG. 23.

FIGS. 23 and 24 illustrate a tenth embodiment of a fusible switching disconnect device 600 including a disconnect module 500 and an auxiliary contact module 602 coupled or ganged to the housing 502 in a side-by-side relation to the module 500 via the openings 516 (FIG. 17) in the module 500.

The auxiliary contact module 602 may include a housing 603 generally complementary in shape to the housing 502 of the module 500, and may include an actuator 604 similar to the actuator 504 of the module 500. An actuator link 606 may interconnect the actuator 604 and a sliding bar 608. The sliding bar 608 may carry, for example, two pairs of switchable contacts 610 spaced from another. One of the pairs of switchable contacts 610 connects and disconnects a circuit path between a first set of auxiliary terminals 612 and rigid terminal members 614 extending from the respective terminals 612 and each carrying a respective stationary contact for engagement and disengagement with the first set of switchable contacts 610. The other pair of switchable contacts 610 connects and disconnects a circuit path between a second set of auxiliary terminals 616 and rigid terminal members 618 extending from the respective terminals 616 and each carrying a respective stationary contact for engagement and disengagement with the second set of switchable contacts 610.

By joining or tying the actuator lever 620 of the auxiliary contact module 602 to the actuator lever 510 of the disconnect module 500 with a pin or a shim, for example, the actuator 604 of the auxiliary contact module 602 may be moved or tripped simultaneously with the actuator 504 of the disconnect module 500. Thus, auxiliary connections may be connected and disconnected together with a primary connection established through the disconnect module 500. For example, when the primary connection established through the module 500 powers an electric motor, an auxiliary connection to a cooling fan may be made to the auxiliary contact module via one of the sets of terminals 612 and 616 so that the fan and motor will be powered on and off simultaneously by the device 600. As another example, one of the auxiliary connections through the terminals 612 and 616 of the auxiliary contact module 602 may be used for remote indication purposes to signal a remote device of the status of the device as being opened or closed to connect or disconnect circuits through the device 600.

While the auxiliary contact features have been described in the context of an add-on module 602, it is understood that the components of the module 602 could be integrated into the module 500 if desired. Single pole or multiple pole versions of such a device could likewise be provided.

Figure 25:
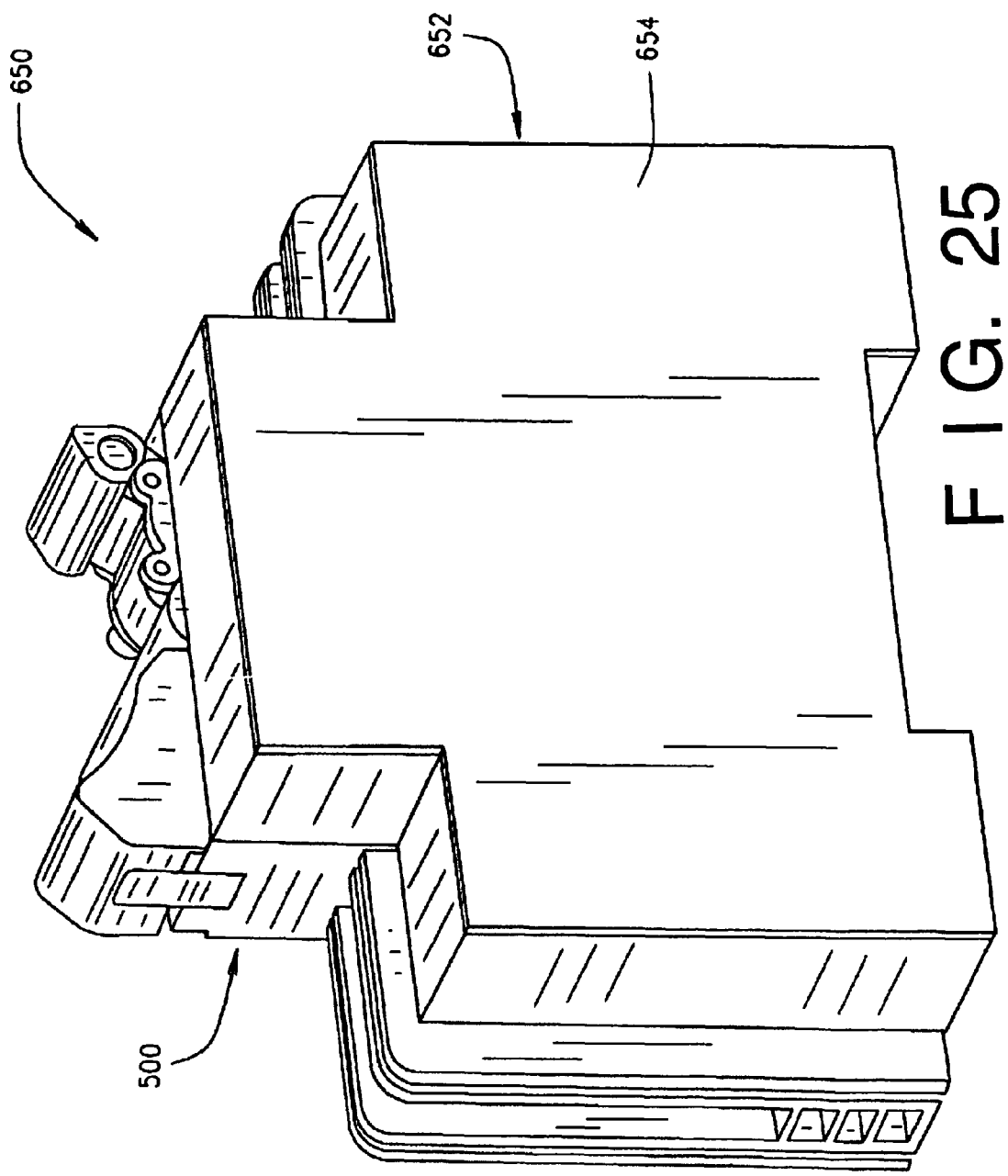
FIG. 25 is a perspective view of an eleventh embodiment of a fusible switching disconnect device.
Figure 26:
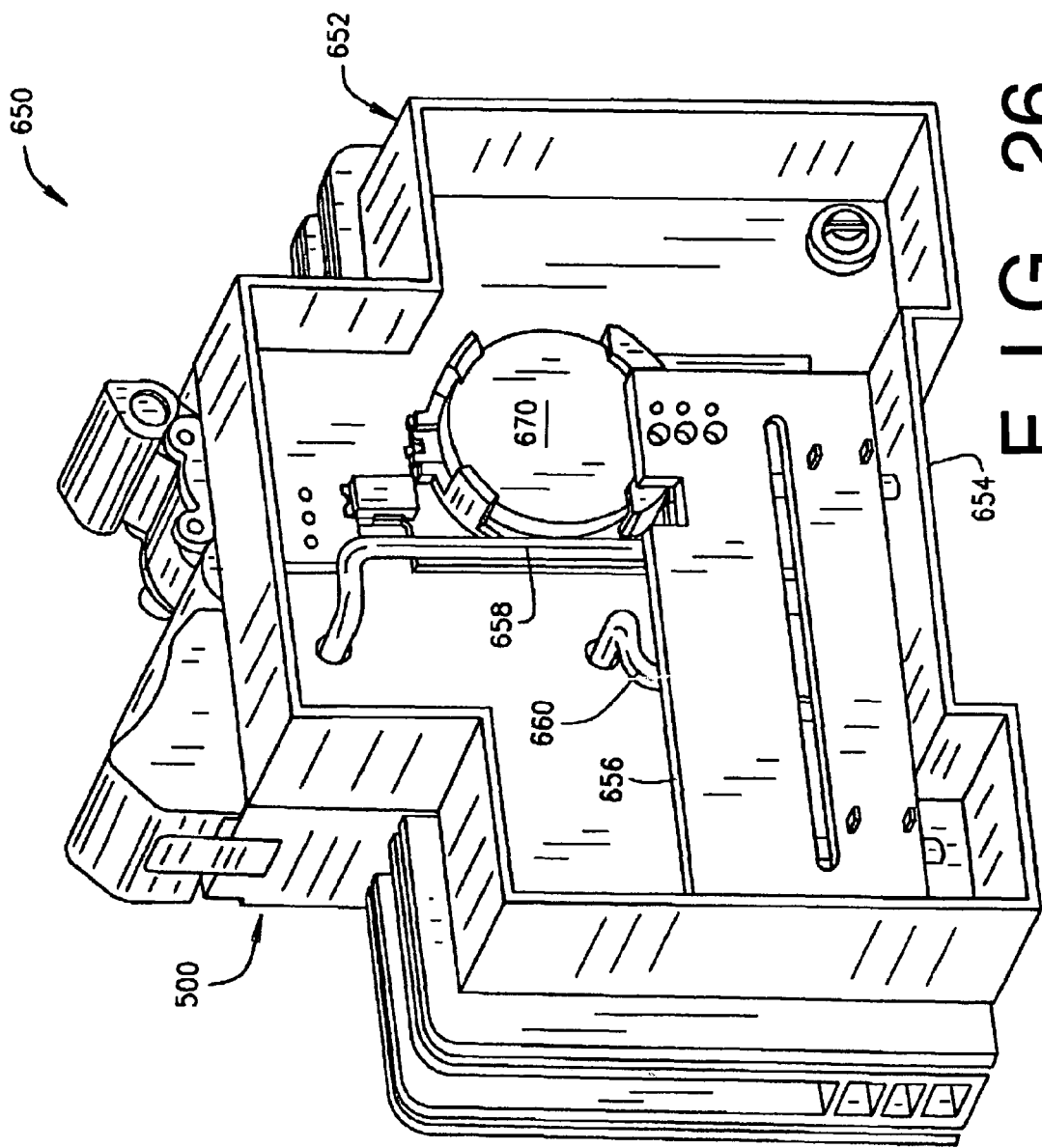
FIG. 26 is a perspective view of a portion of the fusible switching disconnect device shown in FIG. 25.
Figure 27:
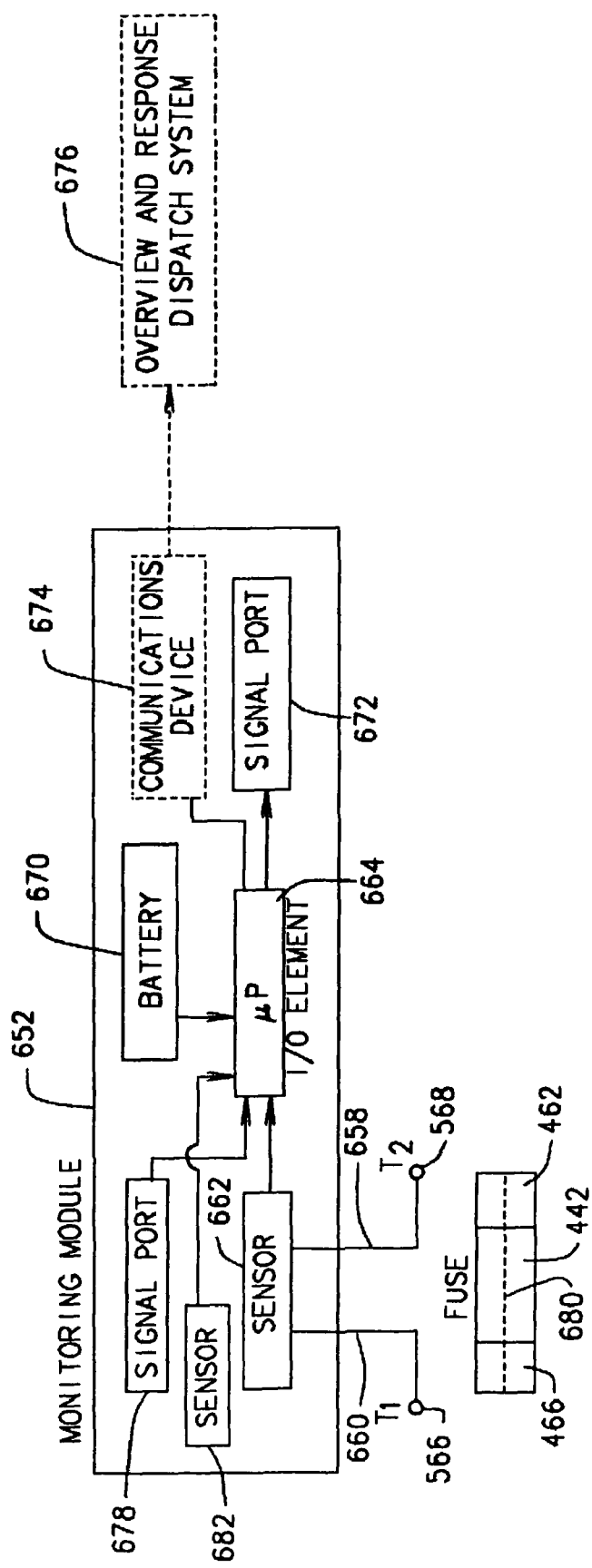
FIG. 27 is a schematic diagram of the fusible switching disconnect device shown in FIG. 26.

FIGS. 25-27 illustrate an eleventh embodiment of a fusible switching disconnect device 650 including a disconnect module 500 and a monitoring module 652 coupled or ganged to the housing 502 of the module 500 via the openings 516 (FIG. 17) in the module 500.

The monitoring module 652 may include a housing 654 generally complementary in shape to the housing 502 of the module 500. A sensor board is located in the housing 654, and flexible contact members 658, 660 are respectively connected to each of the ferrules 462, 466 (FIG. 18) of the fuse 442 (FIG. 1) in the disconnect module 500 via, for example, the upper and lower solenoid contact members 557, 558 (FIG. 18) that establish a parallel circuit path across the fuse ferrules 462, 466. The sensor board 656 includes a sensor 662 that monitors operating conditions of the contact members 557, 558 and outputs a signal to an input/output element 664 powered by an onboard power supply such as a battery 670. When predetermined operating conditions are detected with the sensor 662, the input/output element 664 outputs a signal to a output signal port 672 or alternatively to a communications device 674 that wirelessly communicates with a remotely located overview and response dispatch system 676 that alerts, notifies, and summons maintenance personnel or responsible technicians to respond to tripping and opened fuse conditions to restore or re-energize associated circuitry with minimal downtime.

Optionally, an input signal port 678 may be included in the monitoring module 652. The input signal port 678 may be interconnected with an output signal port 672 of another monitoring module, such that signals from multiple monitoring modules may be daisy chained together to a single communications device 674 for transmission to the remote system 676. Interface plugs (not shown) may be used to interconnect one monitoring module to another in an electrical system.

In one embodiment, the sensor 662 is a voltage sensing latch circuit having first and second portions optically isolated from one another. When the primary fuse element 680 of the fuse 442 opens to interrupt the current path through the fuse, the sensor 662 detects the voltage drop across the terminal elements $T_1$ and $T_2$ (the solenoid contact members 557 and 558) associated with the fuse 442. The voltage drop causes one of the circuit portions, for example, to latch high and provide an input signal to the input/output element 664. Acceptable sensing technology for the sensor 662 is available from, for example, SymCom, Inc. of Rapid City, S. Dak..

While in the exemplary embodiment, the sensor 662 is a voltage sensor, it is understood that other types of sensing could be used in alternative embodiments to monitor and sense an operating state of the fuse 442, including but not limited to current sensors and temperature sensors that could be used to determine whether the primary fuse element 680 has been interrupted in an overcurrent condition to isolate or disconnect a portion of the associated electrical system.

In a further embodiment, one or more additional sensors or transducers 682 may be provided, internal or external to the monitoring module 652, to collect data of interest with respect to the electrical system and the load connected to the fuse 442. For example, sensors or transducers 682 may be adapted to monitor and sense vibration and displacement conditions, mechanical stress and strain conditions, acoustical emissions and noise conditions, thermal imagery and thermalography states, electrical resistance, pressure conditions, and humidity conditions in the vicinity of the fuse 442 and connected loads. The sensors or transducers 682 may be coupled to the input/output device 664 as signal inputs. Video imaging and surveillance devices (not shown) may also be provided to supply video data and inputs to the input/output element 664.

In an exemplary embodiment, the input/output element 664 may be a microcontroller having a microprocessor or equivalent electronic package that receives the input signal from the sensor 662 when the fuse 442 has operated to interrupt the current path through the fuse 442. The input/output element 664, in response to the input signal from the sensor 662, generates a data packet in a predetermined message protocol and outputs the data packet to the signal port 672 or the communications device 674. The data packet may be formatted in any desirable protocol, but in an exemplary embodiment includes at least a fuse identification code, a fault code, and a location or address code in the data packet so that the operated fuse may be readily identified and its status confirmed, together with its location in the electrical system by the remote system 676. Of course, the data packet could contain other information and codes of interest, including but not limited to system test codes, data collection codes, security codes and the like that is desirable or advantageous in the communications protocol.

Additionally, signal inputs from the sensor or transducer 682 may be input the input/output element 664, and the input/output element 664 may generate a data packet in a predetermined message protocol and output the data packet to the signal port 672 or the communications device 674. The data packet may include, for example, codes relating to vibration and displacement conditions, mechanical stress and strain conditions, acoustical emissions and noise conditions, thermal imagery and thermalography states, electrical resistance, pressure conditions, and humidity conditions in the vicinity of the fuse 442 and connected loads. Video and imaging data, supplied by the imaging and surveillance devices 682 may also be provided in the data packet. Such data may be utilized for troubleshooting, diagnostic, and event history logging for detailed analysis to optimize the larger electrical system.

The transmitted data packet from the communications device 674, in addition to the data packet codes described above, also includes a unique transmitter identifier code so that the overview and response dispatch system 676 may identify the particular monitoring module 652 that is sending a data packet in a larger electrical system having a large number of monitoring modules 652 associated with a number of fuses. As such, the precise location of the affected disconnect module 500 in an electrical system may be identified by the overview and response dispatch system 676 and communicated to responding personnel, together with other information and instruction to quickly reset affected circuitry when one or more of the modules 500 operates to disconnect a portion of the electrical system.

In one embodiment, the communications device 674 is a low power radio frequency (RF) signal transmitter that digitally transmits the data packet in a wireless manner. Point-to-point wiring in the electrical system for fuse monitoring purposes is therefore avoided, although it is understood that point-to-point wiring could be utilized in some embodiments of the invention. Additionally, while a low power digital radio frequency transmitter has been specifically described, it is understood that other known communication schemes and equivalents could alternatively be used if desired.

Status indicators and the like such as light emitting diodes (LED's) may be provided in the monitoring module 652 to locally indicate an operated fuse 442 or a tripped disconnect condition. Thus, when maintenance personnel arrives at the location of the disconnect module 500 containing the fuse 442, the status indicators may provide local state identification of the fuses associated with the module 500.

Further details of such monitoring technology, communication with the remote system 676, and response and operation of the system 676 are disclosed in commonly owned U.S. patent application Ser. No. 11/223,385 filed Sep. 9, 2005 and entitled Circuit Protector Monitoring Assembly, Kit and Method.

While the monitoring features have been described in the context of an add-on module 652, it is understood that the components of the module 652 could be integrated into the module 500 if desired. Single pole or multiple pole versions of such a device could likewise be provided. Additionally, the monitoring module 652 and the auxiliary contact module could each be used with a single disconnect module 500 if desired, or alternative could be combined in an integrated device with single pole or multiple pole capability.

FIG. 28 is a side elevational view of a portion of a twelfth embodiment of a fusible switching disconnect module 700 that is constructed similarly to the disconnect module 500 described above but includes a bimetallic overload element 702 in lieu of the solenoid described previously. The overload element 702 is fabricated from strips of two different types of metallic or conductive materials having different coefficients of thermal expansion joined to one another, and a resistance alloy joined to the metallic elements. The resistance alloy may be electrically isolated from the metallic strips with insulative material, such as a double cotton coating in an exemplary embodiment.

In use, the resistance alloy strip is joined to the contact members 557 and 558 and defines a high resistance parallel connection across the ferrules 462 and 466 of the fuse 442. The resistance alloy is heated by current flowing through the resistance alloy and the resistance alloy, in turn heats the bimetal strip. When a predetermined current condition is approached, the differing rates of coefficients of thermal expansion in the bimetal strip causes the overload element 702 to bend and displace the trip bar 545 to the point of release where the spring loaded actuator 504 and sliding bar 456 move to the opened positions to disconnect the circuit through the fuse 442.

The module 700 may be used in combination with other modules 500 or 700, auxiliary contact modules 602, and monitoring modules 652. Single pole and multiple pole versions of the module 700 may also be provided.

Figure 29:
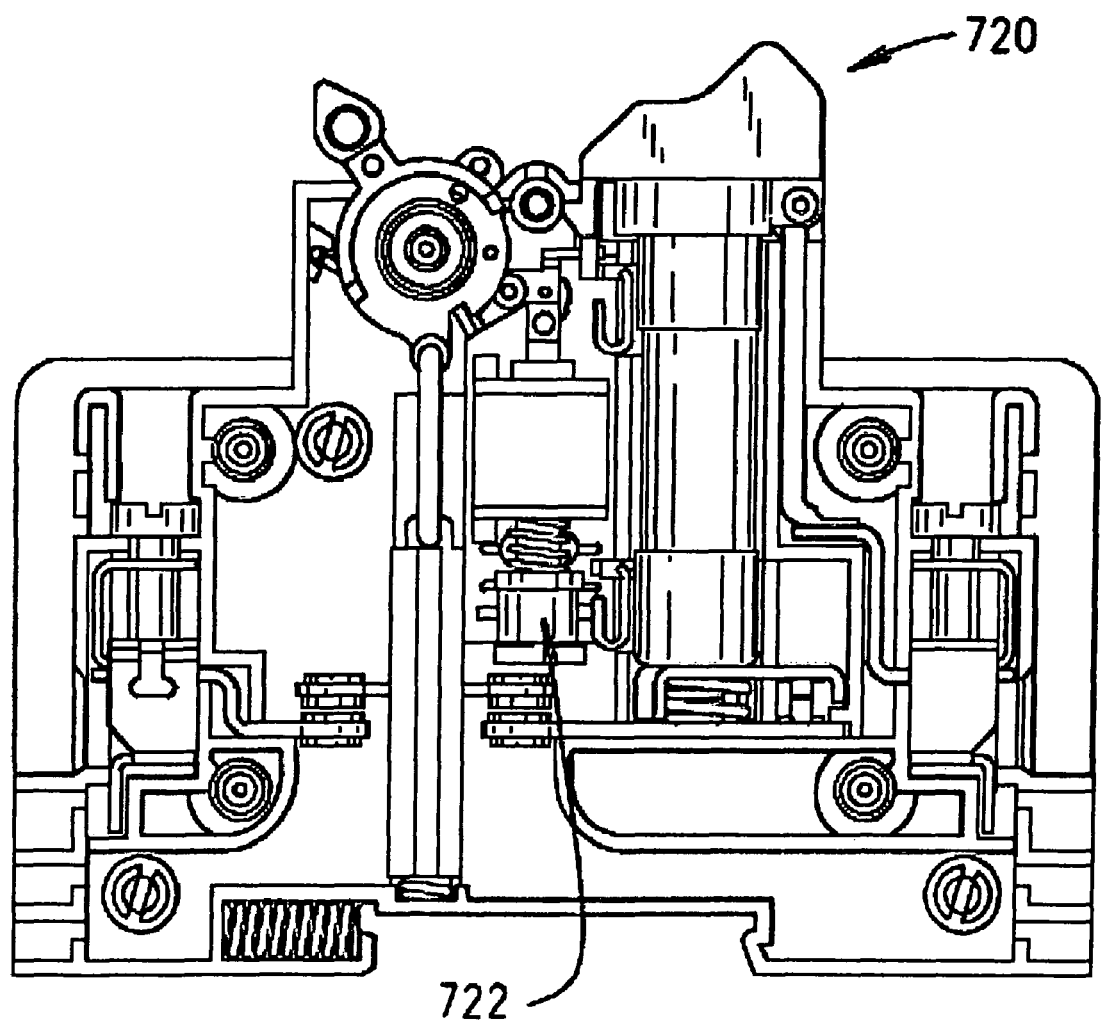
FIG. 29 is a side elevational view of a portion of a thirteenth embodiment of a fusible switching disconnect device.

FIG. 29 is a side elevational view of a portion of a thirteenth embodiment of a fusible switching disconnect module 720 that is constructed similarly to the disconnect module 500 described above but includes an electronic overload element 722 that monitors current flow through the fuse by virtue of the contact members 557 and 558. When the current reaches a predetermined level, the electronic overload element 722 energizes a circuit to power the solenoid and trip the module 720 as described above. The electronic overload element 722 may likewise be used to reset the module after a tripping event.

The module 720 may be used in combination with other modules 500 or 700, auxiliary contact modules 602, and monitoring modules 652. Single pole and multiple pole versions of the module 700 may also be provided.

Figure 30:
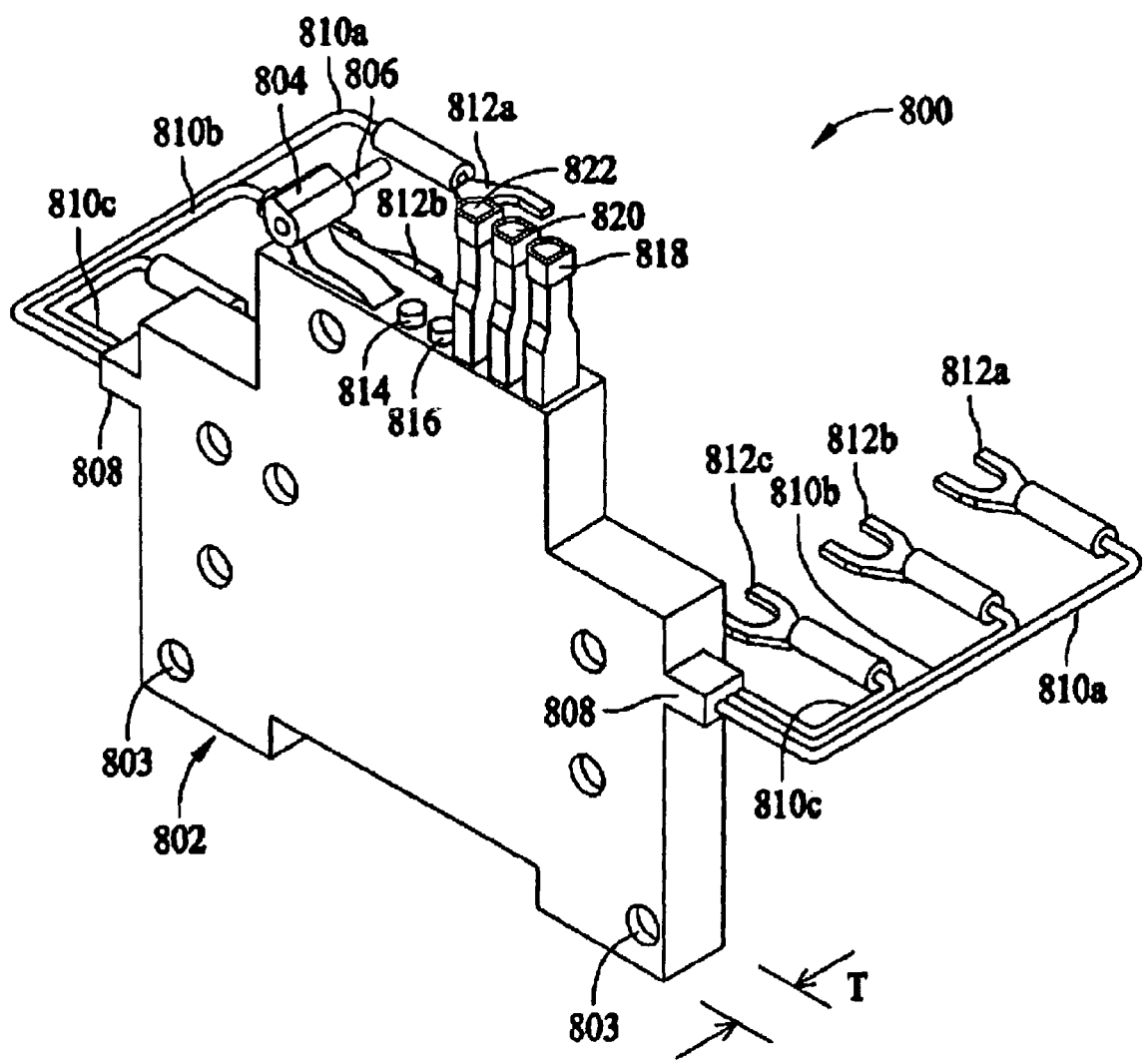
FIG. 30 is a perspective view of a fuse status indicator module for a fusible disconnect device.

FIG. 30 is a perspective view of a fuse status indicator module 800 that may be used in combination, for example, with any of the disconnect devices and modules described above. That is, the fuse status indicator module 800 may be used with the fusible disconnect devices 100 (FIG. 1), 300 (FIGS. 8 and 9), 370 (FIG. 10), 400 (FIG. 11), and 600 (FIGS. 23 and 24). The fuse status indicator module 800 may also be used in combination with one or more of the disconnect modules 102 (FIGS. 2-4), 220 (FIG. 5), 250 (FIGS. 6 and 7), 410 (FIGS. 12-16), 500 (FIGS. 17-22), 650 (FIGS. 25 and 26), 700 (FIG. 28), and 720 (FIG. 29). As such, the fuse status indicator module 800 may be utilized with single or multi-pole disconnect mechanisms, may have various mounting and connection options to protected circuitry, may be used with different types and configurations of fuses, may be used in combination with undervoltage modules, tripping mechanisms, auxiliary contact modules and elements, overload elements, and even other types of monitoring elements. The fuse status indicating module 800 may be considered a lower cost option than the monitoring module 652 (FIGS. 25 and 26) for providing remote detection of operating states of the fuses in the disconnect devices and modules.

The monitoring module 800 may include a housing 802 generally complementary in shape to the housings described above for the various disconnect devices and modules, and in an exemplary embodiment the housing 802 has a thickness dimension T of about one half the thickness dimensions of the modules described above, or about 8.75 mm in one example. Like some of the housings described above, the housing 802 includes mounting openings or apertures 803 that may receive connectors or shims, such as the connectors pins 480 and shims 484 (FIG. 16) to gang the housing 802 to a disconnect device or module having complementary mounting openings and apertures.

The housing 802 contains sensing and indication components and circuitry described below to detect opening of fuses in the associated disconnect device and disconnect modules. The module 800 also includes an actuator 804 that may be tied to the actuator of a disconnect device with a connector pin 806 in the manner described above. Signal input ports 808 are provided on either side of the housing 802, and wire leads or conductors 810*a*, 810*b*, and 810*c* internally connect to the sensing components and circuitry in the housing 802 and extend through the signal ports 808 for external connection to terminal elements of a disconnect device or disconnect modules the define the line and load connections to the fuses.

In the illustrated embodiment, each wire lead 810*a*, 810*b* and 810*c* terminates outside the signal ports 808 with fork terminal connectors 812*a*, 812*b* and 812*c*. The terminal connectors 812*a*, 812*b* and 812*c* may be extended into corresponding ports in the disconnect device and any associated disconnect modules, therefore establishing line and load connections to the terminal elements therein. When so connected, the wire leads 810*a* and terminal connectors 810*b* provide electrical connection to a first fuse to be monitored with the module 800, the wire leads 810*b* and terminal connectors 812*b* provide electrical connection to a second fuse to be monitored with the module 800, and the wire leads 810*c* and terminal connectors 812*c* provide electrical connection to a third fuse to be monitored by the module 800. While forked terminal connectors 812*a*, 812*b* and 812*c* are illustrated in FIG. 30, it is recognized that other terminal structure could be provided to connect the wires leads 810*a*, 810*b* and 810*c* to the line and load terminal structure of the disconnect device and modules.

The three pairs of wire leads 810*a*, 810*b* and 810*c* are particularly beneficial for a three phase disconnect device supplying AC electrical power to a motor or industrial machine, for example. While three wires 810*a*, 810*b* and 810*c* are illustrated, it is understood that in an alternative embodiment greater or fewer lead wires 810 may be provided to monitor greater or fewer numbers of fuses. Additionally, to the extent the module 800 is desired for use with a disconnect device having less than three poles, the unused terminal connectors 812 of the module 800 may be capped or otherwise covered.

Light emitting diodes (LEDs) 814 and 816 may be provided and connected to circuitry in the housing 802 and may be visible from an exterior of the housing 802. In an exemplary embodiment, the LED 814 may provide an indication of electrical power supplied to the module 800, and the LED 816 may provide indication of an opened fuse in the associate disconnect device or module. For example, in one embodiment, the LED 814 may be illuminated to indicate that power to the module 802 is being received, sometimes referred to as an "on" condition, and is not illuminated when power to the module 802 is absent, sometimes referred to as an off condition. In another embodiment, this indication of on or off conditions may be effectively reversed such that the LED 814 is lit when power is lost and the LED 814 is not lit when the power is on. In any event, by virtue of the power LED 814, a user may quickly ascertain whether the module 800 is receiving electrical power.

Likewise, the fuse indication LED 816, may not be illuminated when the fuses are in an unopened or operative, current carrying state for normal operation, and the LED 816 may be illuminated when at least one of the monitored fuses opens to interrupt or break the current path and the electrical connection through the fuse. In an alternative embodiment, this indication may be reversed such that the LED 816 is lit when the fuses are unopened and is not lit when the fuses are opened. In any event, by virtue of the LED 816, the user may quickly ascertain whether or not any of the fuses have opened and need replacement. Local fuse state indication in the vicinity of the module 800 is therefore provided by the LED 816.

For remote fuse state indication, output ports and terminal connectors 818, 820 and 822 are provided in the module 800. The connectors 818, 820 and 822 provide for connection to a controller, such as a programmable logic controller, that is in turn connected to remote devices and equipment. The connector 818, for example, may correspond to a ground connection. The connector 820 may correspond to a power connection to the module 800, such as a 24V DC connection to a power supply of the controller. The connector 822 may correspond to a signal connection, such as 0V or 24V DC signal to the controller. In one embodiment, the connectors 818, 820 and 822 are known 16 AWG 0.110 quick connect terminal connectors, although it is contemplated that other connectors and terminals could be utilized in an alternative embodiment if desired.

FIG. 31 is a side elevational view of a portion of the module 802 illustrating its internal components. The housing 802 surrounds and protects a circuit board assembly 830, and the lead wires 810 are passed through the signal ports 808. Strain relief features 832 are molded into the housing 802, for example, to protect the lead wires 810 and their connections to the circuit board assembly 830. Optical isolators 834 are provided to interface the wire leads 810 and 600V AC circuitry of the fuses from the 24V DC circuitry of the circuit board assembly 830. Each optical isolator 834*a*, 834*b* and 834*c* corresponds to one of the monitored fuses operatively connected between each of the lead wires 810*a*, 810*b* and 810*c*, respectively. The optical isolators 834 latch when a voltage differential appears across one of the fuses as explained further below.

The printed circuit board assembly 830 may also include the LEDs 814 and 816 and terminals 836, 838 and 840 for the connectors 818, 820 and 822 in FIG. 31. The terminals 836, 838 and 840 may be, for example, 0.100 spade terminals known in the art.

A bypass/reset switch 842 is also provided in the circuit board assembly 830. The switch 842 is actuated by a cam surface 844 of the actuator 804. The switch 842 and cam surface 844 are constructed so that when the actuator 804 is tied to actuator of the disconnect device or module, movement of the actuator 804 in the direction of arrow J causes the cam surface 844 to operate the switch 842 as the switch contacts in the disconnect device or module are opened. Operation of the switch 842 bypasses signal portions of the circuitry in the module 800 and also causes the fuse indicating LED 816 to be reset. Bypassing of the signal portions of the circuitry prevents an open fuse signal from occurring when the disconnect device or module is opened. That is, operation of the circuitry is unaffected by the position of the switch contacts in the disconnect device or whether the disconnect device is opened or closed to connect or disconnect the current path through the fuses.

Figure 32:
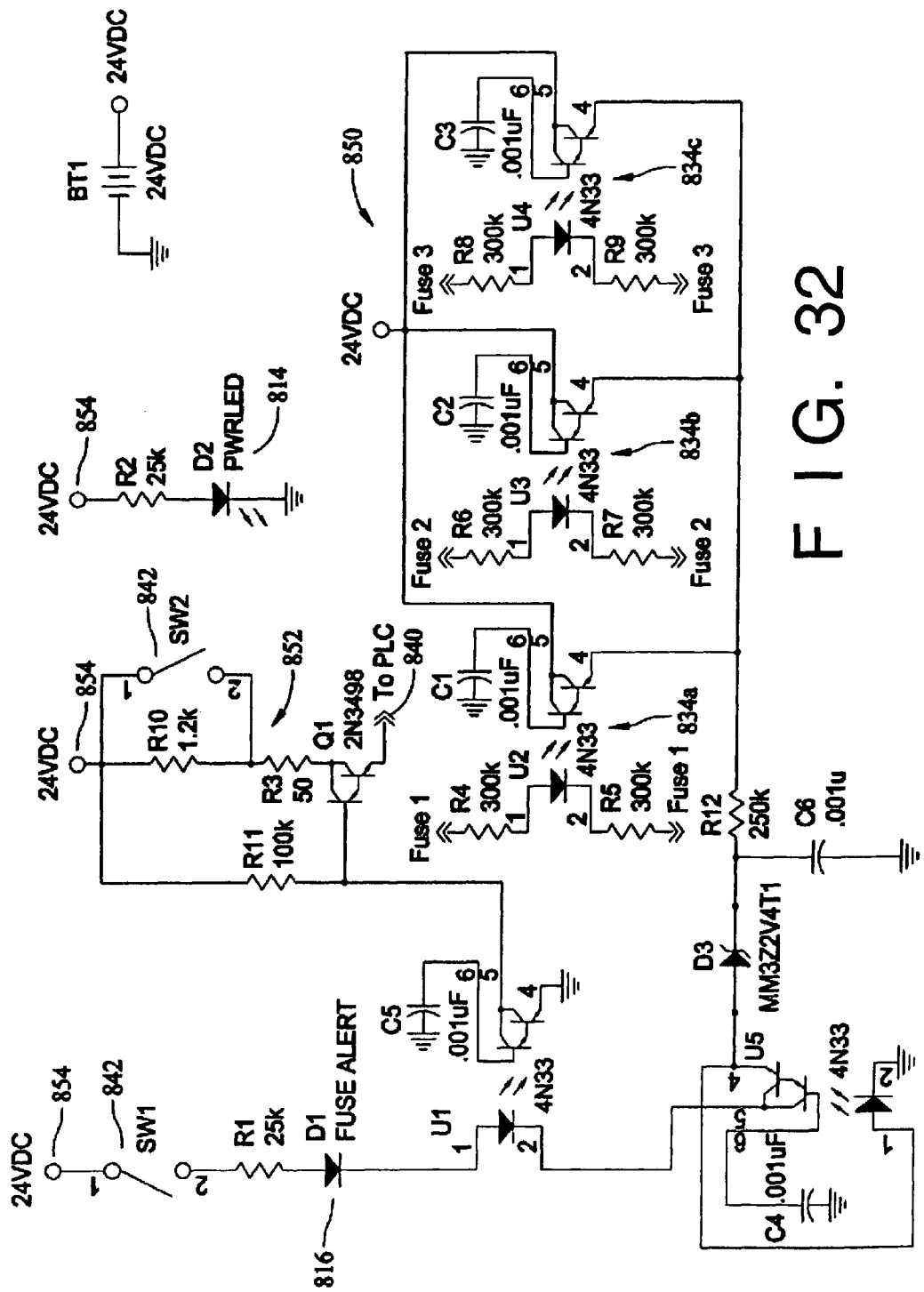
FIG. 32 is an exemplary fuse status indicating circuit schematic for the module shown in FIGS. 30 and 31.

FIG. 32 is an exemplary fuse status indicating circuit schematic for the module 800. The circuit includes a sensing or detecting portion 850 and a signal portion 852 each connected to a power supply 854. The sensing portion 850 includes the optical isolators 834*a*, 834*b*, 834*c* connected across each respective Fuse 1, Fuse 2, and Fuse 3 of the disconnect device, and the fuse indicating LED 816. In a normal operating condition, for example, and when none of the fuses Fuse 1, Fuse 2 or Fuse 3 has opened, the optical isolators 834*a*, 834*b*, 834*c* experience no voltage differential and the sensing portion 850 of the circuit is unlatched and the LED 816 is not illuminated. Additionally, in the normal operation condition and when none of the fuses Fuse 1, Fuse 2 or Fuse 3 has opened, the signal portion 852 of the circuit is set high and provides accordingly provides a high signal input to the controller via the terminal 822 (FIG. 30) and the terminal 840 (FIG. 31). By virtue of the switch 842, the signal portion 852 is unaffected by opening of the switch contacts in the disconnect device. That is, in an exemplary embodiment the signal portion 852 remains high whether the disconnect device is open or closed. Only when a primary fuse element in one of the fuses actually opens is the signal set low in the signal portion 852.

Open fuse events are detected by the optical isolators 834*a*, 834*b*, 834*c* in the sensing portion 850 of the circuit, which in turn causes the signal portion 852 to provide a low signal to the controller. More specifically, the optical isolators 834*a*, 834*b*, 834*c* sense a voltage drop across the line and load terminals of the fuse via the line and load terminals of the disconnect device or modules. Each of the fuses Fuse 1, Fuse 2, and Fuse 3 may correspond to a respective phase of AC electrical power feeding, for example, a motor or industrial machine. When any of the fuses Fuse 1, Fuse 2, and Fuse 3 opens, the voltage placed across the associated optical isolator 834*a*, 834*b* or 834*c* causes the sensing portion 850 of the circuit to latch and illuminate the fuse indicating LED 816 to indicate an open fuse event.

The latching of the circuit and lighting of the LED 816, in turn, causes the signal portion 852 to set low and input the low signal to the controller. When the controller receives the low signal at a remote location, an opened fuse event is detected. The controller may be programmed, for example, to open a contactor or other device to prevent the motor or machine, for example, from running on less than three phases of current. Additionally, the controller may be programmed to set an alarm condition for prompt action by an operator, provide notification to certain persons of an opened fuse, or execute other instructions provided in the controller programming as desired.

Once the signal portion 852 is set low it remains low until the reset switch 842 is activated using the module actuator 804 to reset the signal portion 852 to high. The low signal may be maintained even if the voltage is removed across the opened fuse, such as by opening one of the switch contacts in the associated disconnect device. By maintaining the low signal in such a manner, the opened fuse indication will continue even after the associated disconnect device is opened.

Activation of the switch 842 with the actuator 804 also resets the signal portion 852 and the LED 816 after an open fuse detection event.

While in the illustrative embodiment open fuse events are detected with optical isolators, it is understood that other detecting elements and components could be utilized with similar effect, and such detecting elements may monitor and respond to sensed or detected current, voltage, temperature and other operating conditions to detect open fuses. Numerous sensing and detecting elements are known that would be suitable for the indication module as described, including but not limited to current transformers, Rogowski coils, inductors, and the like as those in the art will appreciate.

Likewise, while visual indicators in the form of LEDs are provided in an exemplary embodiment so that open fuses may be efficiently located, it is contemplated that other types of visual indicators may alternatively be provided to identify open fuse events with a change in external appearance of the indication module. A variety of visual indicators are known in the art and may alternatively be utilized, including, for example, mechanical indicators having flags or pins that are extended in response to open fuses, electrical indicators having one or more light emitting elements, and indicators exhibiting color changes in response to open fuse events, including but not limited to combustible indicators and indicators having temperature responsive materials and chemically activated color changes.

FIG. 33 illustrates the fuse status indicating module 800 connected or ganged to a fusible disconnect device 860. The disconnect device 860 may include a number of disconnect modules 862 or may be provided in a single housing as desired. The modules 862 may be of the type described above including a fuse compartment and fuse terminals, a sliding bar and switch contacts. The modules 862 may further include the addition of access ports 864 for insertion of the terminals 812*a*, 812*b* and 812*c* (FIG. 3) connected to each wire lead 810*a*, 810*b*, and 810*c*. The terminals 812*a*, 812*b* and 812*c* electrically connect to the fuse terminals to place the optical isolators 834*a*, 834*b* and 834*c* across the fuses in each module 862.

Fuse covers 865 are provided on each of the modules 862 of the disconnect device 860, and the covers 865 are positionable to provide access to the fuse compartments for insertion and removal of the fuses. The disconnect device 860 includes an actuator 866 for opening of the switch contacts via the sliding bar as described above, and the actuator 804 of the indicating module 800 is linked to the actuator 866 of the disconnect device 860. The connectors 818, 820 and 822 are accessible on the module 800 for connection to the controller for power, ground and signal connections via connecting plugs and wires or cables.

Figure 34:
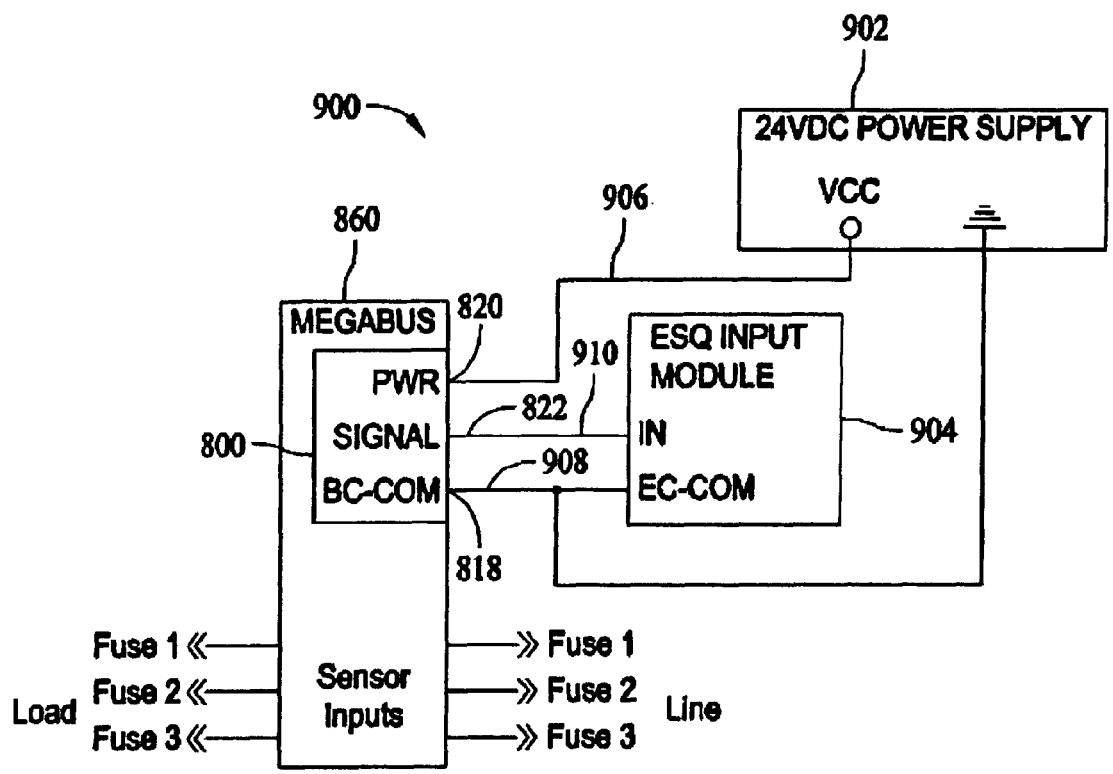
FIG. 34 schematically illustrates a fused electrical system including the fusible disconnect device and fuse state indication module shown in FIG. 33.

FIG. 34 schematically illustrates a fused electrical system 900 including the fusible disconnect device 860, fuse state indication module 800, a power supply 902 and a controller 904. The electrical system includes line and load connections and circuitry coupled to the fuses Fuse 1, Fuse 2 and Fuse 3 in the disconnect device 860. A power supply 902 such as a battery is coupled to the indication module 800 via the power connector 820 and cabling 906. Ground connections are established to the module 800 via the connector 818 and cabling 908. A signal connection between the indicating module 800 and the controller 904 is established via the signal connector 822 and cabling 910. Once so connected, the indicating module 800 may signal the controller 904 of open fuse events as they occur, and controller 904 may generate alarms, take appropriation and measures, etc. according to the programming of the controller.

Having now described the system and its operation functionally, it is believed that programming of the controller is within the purview of those in the art without further explanation.

Figure 35:
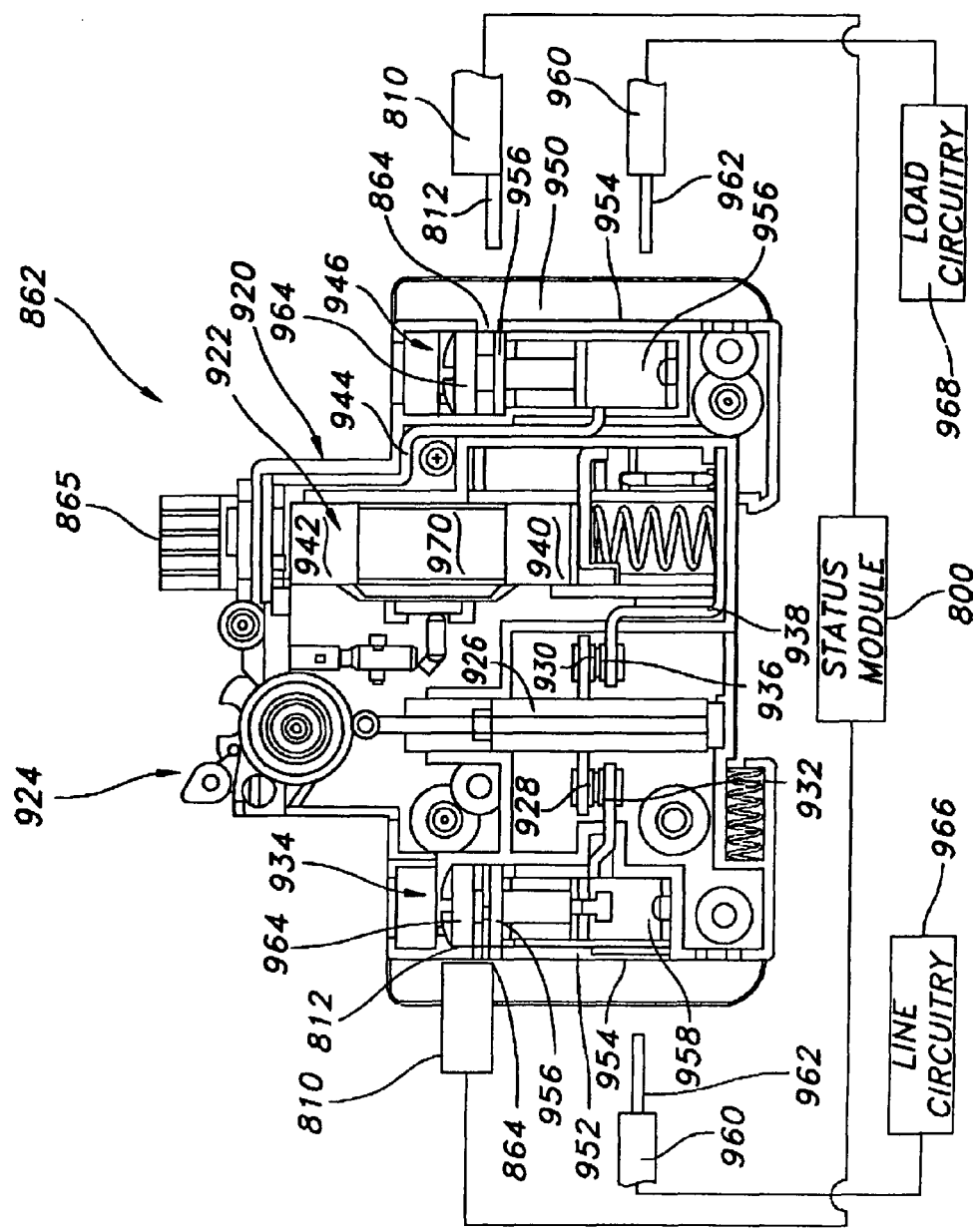
FIG. 35 is a side elevational view of one of the disconnect modules shown in FIG. 33 illustrating internal components and construction thereof.

FIG. 35 is a side elevational view of one of the disconnect modules 862 for the device 860 shown in FIG. 33 and illustrating exemplary internal components and construction thereof. The module 862, like the foregoing embodiments, may be used in lieu of, or in addition to any of the foregoing module embodiments. That is, the module 862 need not be solely used in the device 860 of FIG. 35, but may likewise be used in other devices, including but not limited to the other fusible disconnect devices described herein.

Like the foregoing embodiments of modules, the disconnect module 862 includes an insulative housing 920, a fuse 922 loaded into the housing 920, a fuse cover or cap 865, a rotatably mounted switch actuator 924, and a sliding bar 926 carrying first and second movable switch contacts 928 and 930. The switch contact 928 is positionable by the sliding bar 926 relative to a stationary contact 932 affixed to a line side terminal 934. The switch contact 930 is movable by the sliding bar 926 relative to a stationary contact 936 of a lower fuse terminal 938 that is electrically connected to a lower terminal end cap 940 of the fuse 922. Meanwhile, an upper terminal end cap 942 of the fuse engages an upper fuse terminal 944 of a load side terminal 946. The switch actuator 924 is movable to position the sliding bar 926 and to open or close the switch contacts 928 and 930 relative to the stationary contacts 932 and 936 substantially as described above in relation to the foregoing embodiments of modules. A conductive path through the fuse 922 may therefore be made or broken via the switch contacts 928 and 930.

Further, and as explained above, movement of the switch actuator 924 and/or the sliding bar 926 may be enhanced by one or more elements to ensure complete separation of the switch contacts 928 and 930 from the stationary contacts 932 and 936, minimize contact bounce, to prevent inadvertent closure of the switch contacts 928 and 930, and to bias the switch mechanism toward an opened or closed position. Lockout features for the switch actuator 924, fuse rejection features built into the fuse terminals 938 and 944, and fuse ejection features and bias elements, also described above, may also be utilized in the module 862.

The module 862 is illustrated as a single pole module in FIG. 35 that accommodates one fuse 922. It is to be understood, however, that multiple modules 862 may be coupled or ganged together to form, for example, the three pole disconnect device 860 shown in FIG. 33. It is also contemplated that the module 862 may be constructed as a multi-pole assembly having multiple line side and load side terminals, multiple fuse terminals, etc. contained in a single housing to accommodate and switch multiple fuses in a single housing. Any of the tripping elements and mechanisms previously described may also be utilized in the module 862.

The housing 920 may be fabricated from an insulative or nonconductive material, such as plastic, according to known methods and techniques, including but not limited to injection molding techniques. In an exemplary embodiment the housing 920 may be formed into a generally rectangular size and shape, explained in detail above, which is complementary to and compatible with DIN and IEC standards applicable to standardized electrical equipment. The housing 920 is generally sized and shaped in a complementary manner to the other modules described above.

Unlike the previous modules, the housing 920 of the module 862 includes opposing side panels 950 and 952 each having a first access port or opening 864 and a second access port or opening 954. The access ports 864 are sometimes referred to as auxiliary ports and the access ports 954 are sometimes referred to as line side and load side ports. The access ports 864 and 954 are spaced from and are distinct from one another on the respective side panels 950 and 952, and each port 864 and 954 provides access to the respective line side terminal 934 and the load side terminal 946 at different relative locations in the terminals 934 and 946.

Accordingly, each of the line side terminal 934 and the load side terminal 946 includes a first portion 956 and a second portion 958. The first portion 956 of the respective terminals 934 and 946 may be located proximate to the access ports 864 and the second portion 958 of the respective terminals 934 and 946 may be located proximate the access ports 954. The wire leads 810 having fork terminal connectors 812, for example, may be inserted through the respective access ports 864 and may be received in the first portion 956 of the line and load terminals 934 and 946, while insulated connecting wires 960 having ends 962 stripped of the insulation to expose the bare conductors in the wire may be inserted through the respective access ports 954 and may be received in the second portion 958 of the line and load terminals 934 and 946.

A terminal screw 964 may be provided in each of the line and load terminals 934 and 946, and the screw 964 may be advanced to simultaneously clamp or release both the fork terminal connectors 812 and the stripped ends 962 of the wires 810 and 960 at each of the line and load terminals 934 and 946. As shown in FIG. 35, the terminal connectors 812 of the wires 810 may be clamped between the respective screw head and a terminal plate in the first portion 956 of each terminal 934 and 946, while the stripped ends 962 of the wires 960 may be clamped in a respective box lug in the second portion 958 of each of the terminals 934 and 946. Each of the first and second portions 956 and 958 of the respective terminals 934 and 946 are uniquely suited for concurrent connection to the wires 810 and 960 so that different wires 810 and 960 having different terminal structure may each be accommodated by a single line-side terminal and a single load side terminal. That is, one of the wires 810 and one of the wires 960 may be attached to one and the same terminal one each side of the module 862, but at different locations and in different portions of the terminals.

While in the exemplary embodiment the terminals 934 and 946 are configured for connection to a stripped wire and a wire provided with a forked terminal, in another embodiment the wires 810 and 960 may be provided with other connectors or terminal structure and the terminals 934 and 946 may be appropriately modified to receive the terminal structure of the wires 810 and 960. Additionally, it is contemplated that terminal structure other than that specifically illustrated in FIG. 35 may be utilized in one or both of the line side and load side terminals 934 and 946 while still providing connections to forked terminals and stripped wires. For example, resilient, insulation displacement contact terminals, spring clamp terminals, poke-in wire contacts, and other terminals and termination methods known in the art may be utilized as the second portion 958 of one or both terminals to engage or clamp an end of an insulated wire without a terminal screw.

Also, in an alternative embodiment utilizing other termination structure and methods that do not involve a terminal screw, for example, the wires 810 and 960 may be engaged and fastened to each of the line and load terminals in sequence rather than simultaneously, while still providing concurrent or co-existing connection to the wires after they are engaged.

In one embodiment, the wires 960 that extend through the access ports 954 and connect to the second portion 958 of the line and load terminals 934 and 946 establish electrical connection to line side circuitry 966 and load side circuitry 968. Thus, when the switch contacts 928 and 930 are closed and the fuse 922 is present with the fuse cover 865 closed, an electrical connection through the fuse 922 is completed. When specified electrical current conditions are experienced, the fuse 922 will operate to open the conductive path through the module 862 and isolate the load side circuitry 968 from potentially damaging current flow. Likewise, the switch actuator 924 may be manipulated, manually or remotely, to disconnect the load circuitry 968 from the line circuitry 966 via the switch contacts 928, 930 at any time to disconnect the load side circuitry 968 from the line side circuitry 966.

The wires 810, as previously described, may connect the line side and load side terminals 934 and 946 to the fuse status indicator module 800. As such, the wires 810 establish a parallel connection across the fuse 922 so that voltage changes, for example, may be sensed, monitored and detected to indicate an open fuse condition or another electrical problem. In another embodiment, the wires 810 may be connected to another auxiliary device or auxiliary module.

The wires 810 and 960 may be different grades or gauges of wire, and by providing separate access ports 864 and 954 to connect the wires 810 and 960 to the module 862, the wires 810 and 960 may be conveniently connected without having to crowd more than one wire, and possibly wires of different sizes or gauges, into a single access port. Difficulties associated with having to fasten different wires to a terminal that was originally designed for attachment to a single wire of a certain gauge at a single location, that would otherwise occur, are also avoided by the separate access ports 864 and 954 and the construction of the line and load terminals 934 and 936 having designated portions for connection to different wires.

The module 862 may also be provided with a fuse amperage indication scheme using color-coded elements to visually indicate the amperage rating of the fuse 922 while the fuse is enclosed in the housing 920 with the fuse cover 865 closed. Such a color coding scheme permits a user to ascertain the rating of the fuse 922 via visual inspection of the exterior of the module 862 without having to open the fuse cover 865 and inspect the fuse 922 to determine its rating.

In one embodiment of a color-coding scheme for the module 862, the fuse 922 may be provided with a label 970 on an insulative body of the fuse 922 between the terminal end caps 940 and 942. The label 970, for example, may be a separately provided sticker or tag that is attached to the body of the fuse 922, or may be another type of indicia or identifier provided directly on the body of the fuse 922 via a stamping, molding, or printing process. The label 970 may be provided in whole or in part with a predetermined color that corresponds to a fuse class and amperage rating of the fuse 922. Likewise, a portion of the module 862 may be provided on its exterior surface with the same color as the color on the fuse label 970. In one embodiment, the fuse cover 865 is provided with a color that matches the fuse label 970. although the color of the fuse label could be provided elsewhere on the exterior of the module 862 if desired with equal effect.

An exemplary color scheme for exemplary fuse classes and ratings is set forth below in Table 1.

TABLE 1

| Fuse Class and Rating | Color |
|---|---|
| 1/2A-15 A Class G | Blue |
| 20A Class G | Orange |
| 25A & 30A Class G | Green |
| 35A-60A Class G | Yellow |

While exemplary colors, fuse classes and ratings are disclosed, it is appreciated that other colors, fuse classes and ratings, may be utilized with like effect. Also, greater or lesser numbers of colors may be utilized in different embodiments.

Using a color-coded or color coordinated indication scheme as described, a blue fuse cover would indicate that a blue fuse is to be used with the module or is contained in the module, a yellow cover would indicate that a yellow fuse is to be used with the module or is contained in the module, etc. Matching of proper fuses for the modules is therefore intuitive and straightforward.

Additionally, fuse rejection features may be built into the module 862 that would accept fuses of the proper rating and reject fuses having the proper ratings. For example, considering the color scheme of table 1, a blue rated module may be configured to reject orange, green and yellow fuses that have higher current ratings than the blue fuse. As another example, a yellow rated module may be configured so that it only accept a yellow fuse and reject all others. The color-coding of the modules and the fuses, together with appropriate rejection features substantially avoids problems associated with fuses of mismatched ratings from being inadvertently placed in modules that were not designed for such ratings.

Figure 36:
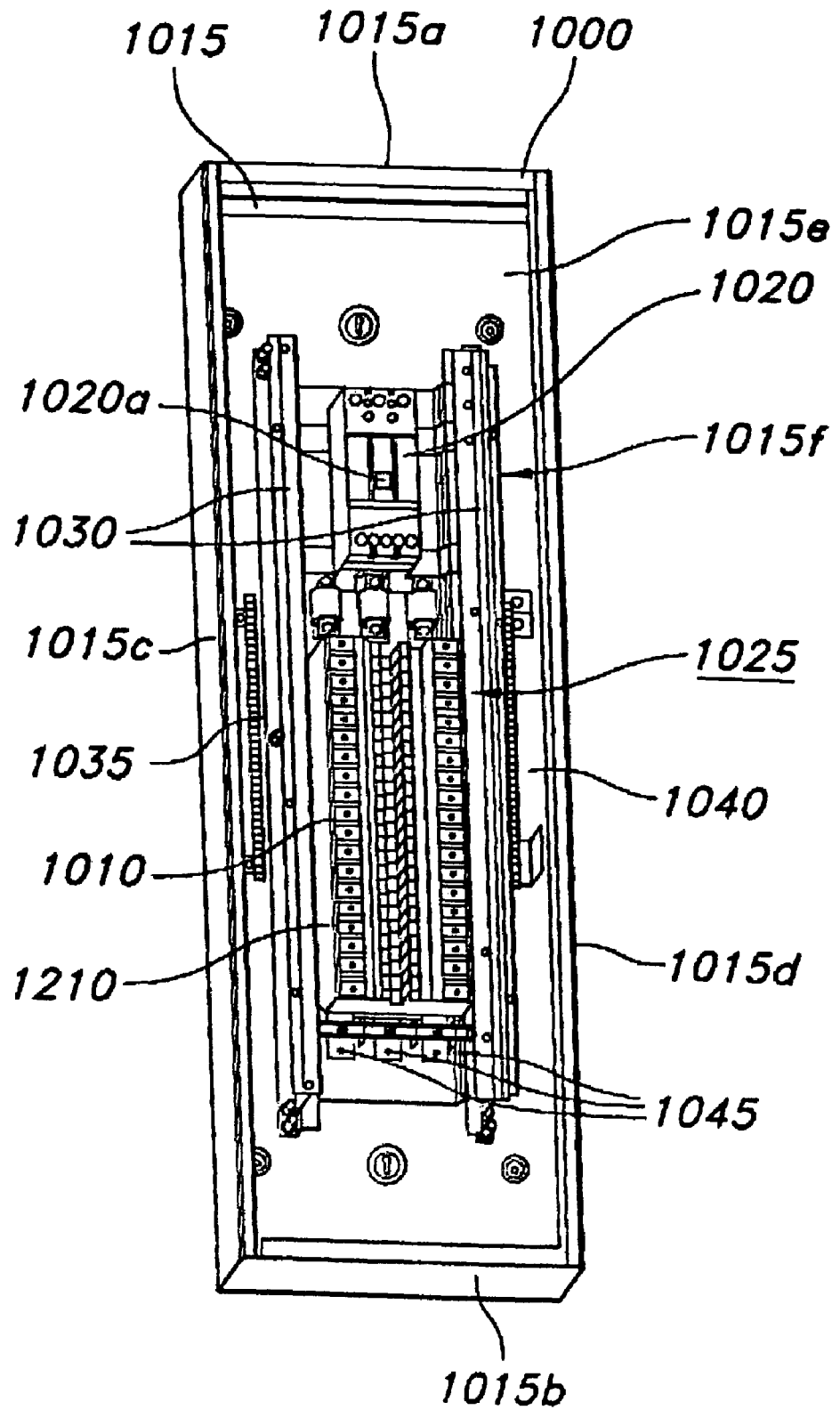
FIG. 36 is a perspective view of an exemplary mounting enclosure, main service disconnect, and chassis of an exemplary fusible panelboard.

FIG. 36 is a perspective view of an exemplary mounting enclosure 1000, main service disconnect 1020, and chassis 1025 of an exemplary fusible panelboard (not shown), FIG. 37 is a perspective view of an exemplary panelboard cover 1005 configured to mate with the mounting enclosure 1000 of FIG. 36. The mounting enclosure 1000 is configured to receive multiple fusible switching disconnect devices 1010, For example, the fusible switching disconnect devices 1010 can include one or more of the fusible disconnect devices 100 (FIG. 1), 300 (FIGS. 8 and 9) 370 (FIG. 10), 400 (FIG. 11), and 600 (FIGS. 23 and 24) described above.

The mounting enclosure 1000 includes a substantially rectangular, metallic frame 1015 having a top edge 1015*a*, a bottom edge 1015*b*, left and right side edges 1015*c* and 1015*d*, and a back panel 1015*e*. The edges 1015*a*-1015*d* and panel 1015*e* of the frame 1015 define a space 1015*f* in which the main service disconnect 1020, chassis 1025, and fusible switching disconnect devices 1010 are mounted. The mounting enclosure 1000 can include any metal or non-metal material, such as aluminum sheet metal, which is suitable for indoor or outdoor use, In certain exemplary embodiments, the mounting enclosure 1000 can comply with an industry standard for electrical equipment, including, without limitation, a National Electrical Manufacturers Association (NEMA) standard for NEMA type 1, NEMA type 3R or other NEMA type enclosures.

The mounting enclosure 1000 is configured to be flush-mounted or surface-mounted against a wall (not shown). In the flush mounting, the mounting enclosure 1000 is recessed within a hole in the wall. In the surface mounting, the mounting enclosure 1000 is attached to (and projects out from) the wall.

The cover 1005 has a shape corresponding to the shape of the mounting enclosure 1000. In particular, the cover 1005 includes a top panel 1005*a* and outer edges 1005*b*-1005*e* configured to slidably engage outer surfaces of the edges 1015*a*-1015*d* of the mounting enclosure 1000. The cover 1005 also includes a door 1005*f*, which an operator may open to access the fusible switching disconnect devices 1010. The fusible panelboard including the mounting enclosure 1000 and cover 1005 is "dead front," meaning that the fusible panelboard is configured such that the operator cannot make contact with any live electrical parts.

The main service disconnect 1020 controls the live power that energizes branch circuits (not shown) associated with the fusible switching disconnect devices 1010. For example, the main service disconnect 1020 can include a circuit breaker, a fuse, and/or a fusible switching disconnect device, such as any of the fusible switching disconnect devices described above in connection with FIGS. 1, 8-11, and 23-24. By way of example only, and without limiting the scope of the invention whatsoever, in certain exemplary embodiments, the main service disconnect 1020 can include a mechanical or compression 100-800 Amp lug, a Class T fuse with an Eaton or Siemens brand molded case switch 250A series (I, a Class T fuse with a 200 Amp or 400 Amp Boltswitch brand pullout, an IEC/UL power fuse, or a 225 Amp sub feed lug. As is well known in the art, the main service disconnect 1020 includes a switch actuator 1020a by which an operator can turn the live power on and off.

The chassis 1025 includes a pair of support rails 1030, a ground bar 1035, a neutral bar 1040, and multiple hot bus bars 1045. In operation, the live power flows through the main service disconnect 1020 to each of the hot bus bars 1045. The hot bus bars 1045 provide power to the branch circuits via the fusible. switching disconnect devices 1010. Each fusible switching disconnect device 1010 is mounted to a mounting support 1210 (shown more clearly in FIG. 38) coupled to one of the support rails 1030, and a branch connector (shown in FIGS. 38 and 41) coupled to one or more hot bus bars 1045, In certain alternative exemplary embodiments, each fusible disconnect device 1010 may be mounted directly to the support rail 1030 and/or the hot bus bar(s) 1045.

Varying the number of hot bus bars 1045 to which a fusible switching disconnect device 1010 is electrically coupled (via the branch connector) can vary the voltage of the electricity provided by the fusible switching disconnect device 1010 to its corresponding branch circuit. For example, a fusible switching disconnect device 1010 electrically coupled to two hot bus bars 1045 may carry 240 volt electricity, and a fusible switching disconnect device 1010 electrically coupled to only one hot bus bar 1045 may carry 120 volt electricity.

As recognized by a person of ordinary skill in the art having the benefit of the present disclosure, the chassis 1025 can have many different, suitable electrical configurations. For example, the chassis 1025 can be configured to receive 12, 18, 24, 30, 36, 42, or any other suitable number of fusible switching disconnect devices 1010. The chassis 1025 also can be configured to provide single phase 3 wire, single phase 2 wire, or three phase 4 wire power via the fusible switching disconnect devices 1010. Certain exemplary embodiments of a distributed phase configuration are described below with reference to FIG. 41. In certain exemplary embodiments, the chassis 1025 can be configured to receive both fusible switching disconnect devices 1010 and other devices, such as traditional circuit breaker devices (not shown).

As described above in connection with FIGS. 1-34, the fusible switching disconnect devices 1010 of the exemplary mounting enclosure 1000 include both a fuse and a circuit breaker-like disconnect in a single, relatively compact device. The compactness of the fusible switching disconnect devices 1010 allows the fusible panelboard to provide a higher level of overcurrent interruption in a smaller space than with traditional panelboards. Whereas traditional fusible panelboards generally have a width of at least 28 inches, fusible panelboards with the exemplary mounting enclosure 1000 and switching disconnect devices 1010 illustrated in FIG. 36 have a lesser width, on the order of about 20 inches. The depths and heights of the traditional and exemplary panelboards are substantially equal.

Tests are expected to show that the interruption rating per volume of a fusible panelboard with the exemplary mounting enclosure 1000 and switching disconnect devices 1010 illustrated in FIG. 36 is approximately 33 Amps per cubic inch. This value is significantly higher than in traditional panelboards, which generally have interruption rating per volume values of between 2 and 8 Amps per cubic inch. Table 2 below summarizes the expected interruption rating per volume values for multiple different panelboards, including traditional panelboards and fusible panelboards with the exemplary mounting enclosure 1000 and switching disconnect devices 1010 illustrated in FIG. 36.

TABLE 2

| Panelboard Type | Volume 42 branch circuits (in3) | Max Voltage (V) | Withstand Rating fully rated (A) | Max Voltage/ Volume (V/in3) | Interrupting Rating/ Volume (A/in3) |
|---|---|---|---|---|---|
| Fusible panelboard with the exemplary mounting enclosure 1000 and switching disconnect devices 1010 illustrated in FIG. 36 | 7360.0 | 600 | 200,000 | 0.081 | 33 |
| Traditional Panelboards | | | | | |
| Eaton Type PRL2A 225A | 5750.0 | 480 | 14,000 | 0.0835 | 2 |
| Siemens P1 225A | 5060.0 | 480 | 14,000 | 0.0949 | 3 |
| Squaer D NF MB panelboards 100/250A | 7820.0 | 480 | 65,000 | 0.0614 | 8 |
| GE Type AE Pro-stock 225A | 5692.5 | 480 | 14,000 | 0.0843 | 2 |

Figure 38:
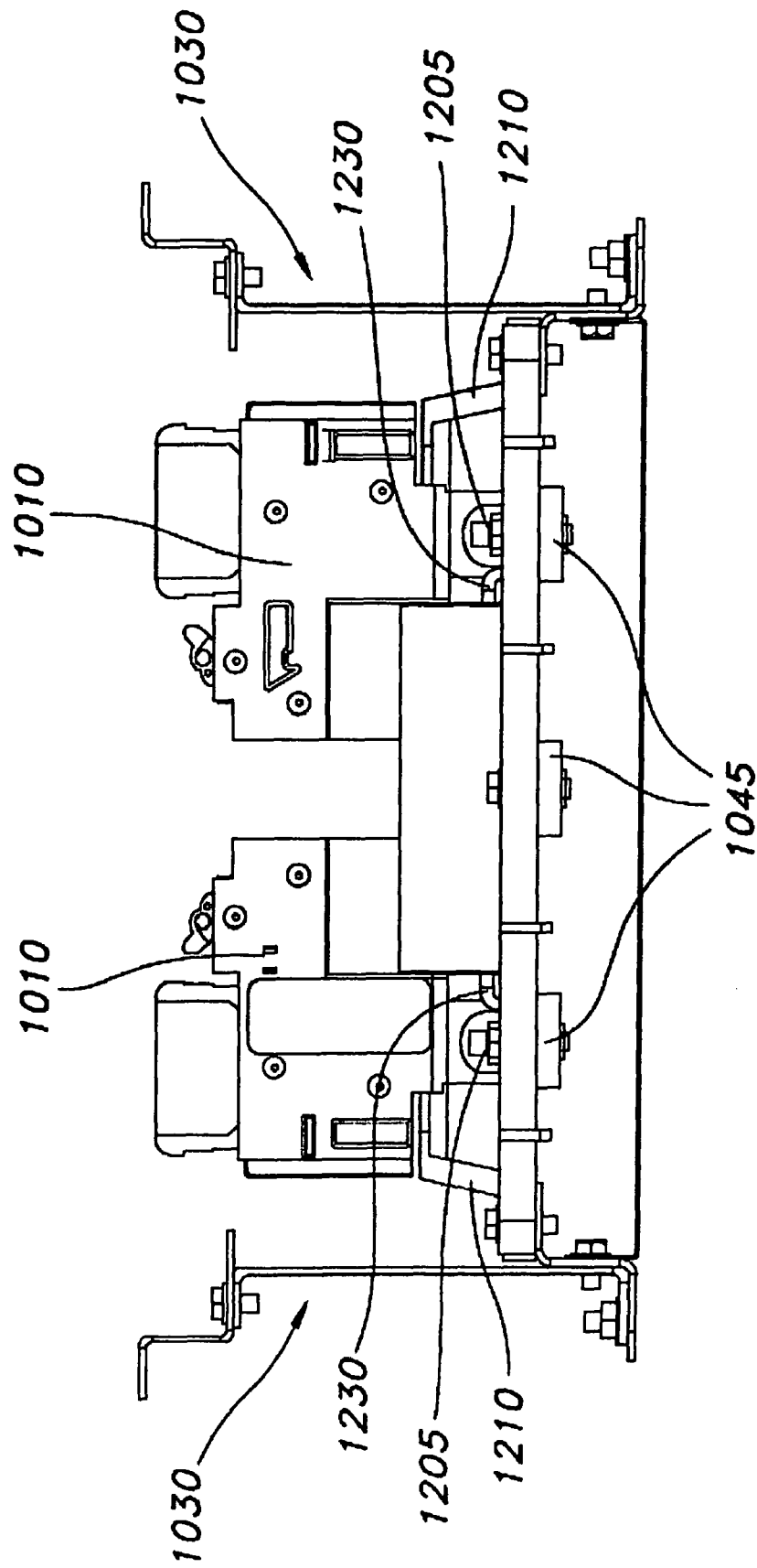
FIG. 38 is a perspective view of exemplary fusible disconnect devices connected to exemplary busbars and support rails.

FIG. 38 is a perspective view of exemplary fusible disconnect devices 1010 connected 'to exemplary busbars 1045 and support rails 1030. Each fusible disconnect device 1010 is mounted to a mounting support 1210 coupled to one of the support rails 1030, and a branch connector 1230 coupled to one or more hot bus bars 1045 via an electrical connection point 1205. In certain alternative exemplary embodiments, each fusible disconnect device 1010 may be mounted directly to the support rail 1030 and/or the hot bus bar(s) 1045.

Figure 40:
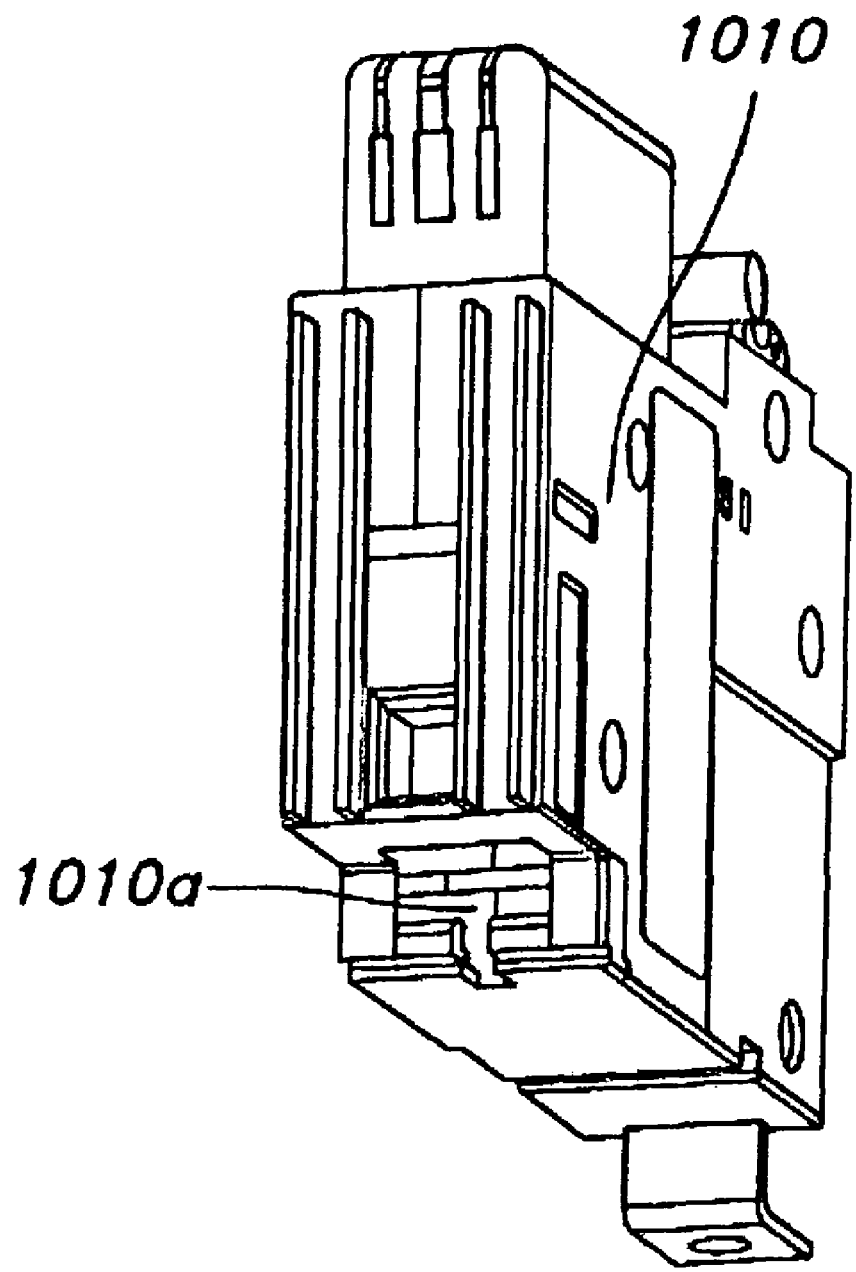
FIG. 40 is a perspective view of an exemplary fusible disconnect device configured for mounting to the mounting support of FIG. 39.

FIG. 39 is a perspective view of the exemplary mounting support 1210. FIG. 40 is a perspective view of an exemplary fusible disconnect device 1010 configured for mounting to the mounting support 1210 of FIG. 39. The mounting support 12.10 includes multiple "T"-shaped protrusions 1210a, each of which is configured to engage a corresponding "T"-shaped notch 1010a of a fusible disconnect device 1010. The protrusions 1210a can prevent installation within the fusible panelboard (not shown) of a device (not shown) that does not have a corresponding notch. Thus, the protrusions 1210a may prevent installation of inappropriate or undesired devices, such as traditional circuit breaker devices with unsuitable interruption ratings.

A person of ordinary skill in the art having the benefit of the present disclosure will recognize that alternative suitable means exist for preventing such installation. For example, the mounting support 1210 may include a notch configured to receiving a corresponding protrusion of the fusible disconnect device 1010. The notches and protrusions of the mounting support 1210 and fusible disconnect device 1010 can have any of a plethora of different suitable shapes. In certain exemplary embodiments, one or more of the protrusions can be removable.

In certain alternative exemplary embodiments, the mounting support 1210 may not include the protrusions 1210*a* and/or each fusible disconnect device 1010 may not include the notch 1010*a*. Thus, it should be understood that these features are merely optional in nature.

Figure 41:
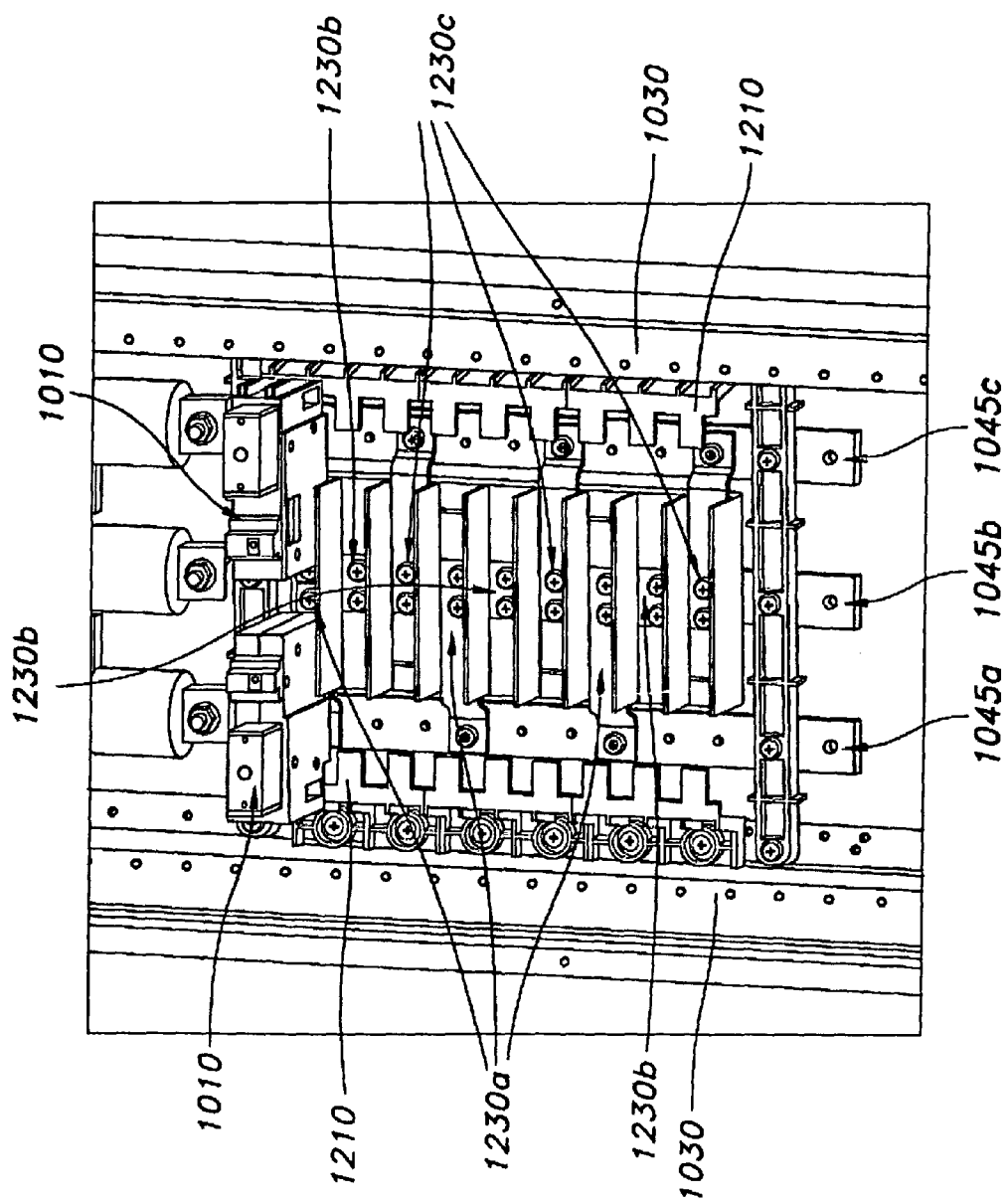
FIG. 41 is a perspective view of exemplary busbars, support rails, and fusible disconnect devices connected in a distributed phase configuration.

FIG. 41 is a perspective view of exemplary busbars 1045, support rails 1030, and fusible disconnect devices 1010 connected in a distributed phase configuration. Each busbar 1045 is connected to a different phase of electrical current. Specifically, busbar 1045*a* is connected to a first phase of electrical current ("Phase A"); busbar 1045*b* is connected to a second phase of electrical current ('Phase B"); and 'busbar 1045*c* is connected to a third phase of electrical current ("Phase C").

Fusible disconnect devices 1010 can connect to the different phases of electrical current via branch connectors 1230*a*, 1230*b*, and 1230*c* coupled to the busbars 1045. Each of the branch connectors 1230*a* is associated with Phase A; each of the branch connectors 1230*b* is associated with Phase B; and each of the branch connectors 1230*c* is associated with Phase C. Each fusible disconnect device 1010 is mounted to a mounting support 1210 coupled to one of the support rails 1030, and a branch connector 1230 coupled to one or more of the hot bus bars 1045.

As recognized by a person of ordinary skill in the art having the benefit of the present disclosure, the configuration illustrated in FIG. 38 is merely exemplary, and other suitable configurations may be used in alternative embodiments.

FIG. 42 is a perspective view of an exemplary mounting enclosure 1000, main service disconnect 1020, fusible disconnect devices 1010, and dead front panel 1405 of an exemplary fusible panelboard. The mounting enclosure 1000 is substantially identical to the mounting enclosure 1000 depicted in FIG. 36. The dead front panel 1405 is coupled to the mounting enclosure 1000 and configured to be disposed between the mounting enclosure 1000 and the cover 1005 of FIG. 37. For example, an operator may see the dead front panel 1405 upon opening the door 100S*f* of the cover 1005.

The dead front panel 1405 includes a spare fuse holder 1410 configured to receive one or more spare fusible disconnect devices 1415. For example, the fusible disconnect devices 1415 can be substantially identical to the fusible disconnect devices 1010. The fusible disconnect devices 1415 are not electrically coupled to the bus bars (not shown) of the fusible panelboard or any branch circuits coupled thereto. Rather, the fusible disconnect devices 1415 are configured to rest within the spare fuse holder 1410 until removed by an operator. For example, an operator can remove a fusible disconnect device 1415 from the spare fuse holder 1410 in order to replace a fusible disconnect device 1010 with the fusible disconnect device 1415.

In conclusion, the foregoing exemplary embodiments enable a panelboard for fusible switching disconnect devices. Many other modifications, features, and embodiments will become evident to a person of ordinary skill in the art having the benefit of the present disclosure. It should be appreciated, therefore, that many aspects of the invention were described above by way of example only and are not intended as required or essential elements of the invention unless explicitly stated otherwise. It should also be understood that the invention is not restricted to the illustrated embodiments and that various modifications can be made within the spirit and scope of the following claims.

We claim:

1. A panelboard, comprising:

a chassis configured to receive at least one fusible switch disconnect module, each of the at least one fusible switch disconnect module comprising:

a disconnect housing adapted to receive at least one rectangular fuse module, the at least one rectangular fuse module including a rectangular housing and a pair of conductive terminal blades extending from the rectangular housing, the at least one rectangular fuse module configured to be installed to and removed from the disconnect housing with a plug-in electrical connection, a line side terminal and a load side terminal communicating with and establishing the plug-in electrical connection to the pair of conductive terminal blades of the at least one rectangular fuse module when the at least one rectangular fuse module is installed into the disconnect housing, said plug-in electrical connection being established and maintained without fastening of the pair of conductive terminal blades of the at least one rectangular fuse module to the line side terminal and the load side terminal, and switchable contacts provided between one of the line side terminal and the load side terminal of the disconnect housing and one of the pair of conductive terminal blades of the at least one rectangular fuse module, the switchable contacts comprising at least one stationary contact and at least one movable contact being selectively positionable along a linear axis with respect to the stationary contact between an open position and a closed position to connect or disconnect an electrical connection through the at least one rectangular fuse module.

2. The panelboard of claim 1, further comprising a mounting enclosure configured to receive the chassis.

3. The panelboard of claim 2, wherein the mounting enclosure is one of an outdoor rated enclosure and an indoor rated enclosure.

4. The panelboard of claim 2, wherein the mounting enclosure has a width of at most 20 inches.

5. The panelboard of claim 1, wherein the panelboard has an interrupting rating per volume of about 33 amps per cubic inch.

6. The panelboard of claim 1, wherein the at least one stationary contact comprises a pair of stationary contacts, one of the stationary contacts being provided on the line side terminal.

7. The panelboard of claim 1, further comprising at least one fuse terminal adapted to engage one of the pair of conductive terminal blades of the at least one rectangular fuse module, wherein the at least one stationary contact comprises a pair of stationary contacts, one of the pair of stationary contacts being provided on the at least one fuse terminal.

8. The panelboard of claim 1, wherein the switchable contacts comprise at least two stationary contacts spaced from one another and at least two movable contacts spaced from one another, thereby breaking electrical arcing in two locations spaced from one another when the switchable contacts are opened.

9. The panelboard of claim 1, wherein an arc chute compartment is provided in the disconnect housing to contain and dissipate arc energy at a location in the disconnect housing remote from a user.

10. The panelboard of claim 1, wherein the chassis is further configured to receive at least one circuit breaker.

11. A panelboard, comprising:
a mounting enclosure having a width of at most 20 inches; and
a chassis coupled to the mounting enclosure and configured to receive at least one fusible switch disconnect module, the at least one fusible switch disconnect module comprising:
a disconnect housing adapted to receive at least one rectangular fuse module therein, the at least one rectangular fuse module including a rectangular housing and a pair of plug-in terminal blades extending from the rectangular housing, the at least one rectangular fuse module configured to be installed to and removed from the disconnect housing without utilizing screw fasteners,
a line side terminal and a load side terminal communicating with the pair of plug-in terminal blades of the at least one rectangular fuse module when the at least one rectangular fuse module is installed, and
switchable contacts provided between one of the line side terminal and the load side terminal of the disconnect housing and the fuse, the switchable contacts comprising at least one stationary contact and at least one movable contact being selectively positionable along a linear axis with respect to the stationary contact between an open position and a closed position to connect or disconnect an electrical connection through the at least one rectangular fuse module.

12. The panelboard of claim 11, wherein the mounting enclosure is one of an outdoor rated enclosure and an indoor rated enclosure.

13. The panelboard of claim 11, wherein the panelboard has an interrupting rating per volume of about 33 amps per cubic inch.

14. The panelboard of claim 11, wherein the at least one stationary contact comprises a pair of stationary contacts, one of the stationary contacts being provided on the line side terminal.

15. The panelboard of claim 11, further comprising at least one fuse terminal adapted to engage one of the pair of terminal blades of the at least one rectangular fuse module, wherein the at least one stationary contact comprises a pair of stationary contacts, one of the pair of stationary contacts being provided on the at least one fuse terminal.

16. The panelboard of claim 11, wherein the at least one stationary contact comprise at least two stationary contacts spaced from one another and the at least one movable contact comprise at least two movable contacts spaced from one another, thereby breaking electrical arcing in two locations spaced from one another when the switchable contacts are opened.

17. The panelboard of claim 11, wherein an arc chute compartment is provided in the disconnect housing to contain and dissipate arc energy at a location in the disconnect housing remote from a user.

18. The panelboard of claim 11, wherein the chassis is further configured to receive at least one circuit breaker.

19. A panelboard, comprising:
a mounting enclosure having a width of at most 20 inches; and
a chassis coupled to the mounting enclosure and configured to receive at least one fusible switch disconnect module, each of the at least one fusible switch disconnect module comprising:
a disconnect housing adapted to receive at least one rectangular fuse module therein, the at least one fuse module configured for plug-in connection,
a line side terminal and a load side terminal communicating with the at least one rectangular fuse module when the at least one rectangular fuse module is installed, and
switchable contacts provided between one of the line side terminal and the load side terminal of the disconnect housing and the at least one rectangular fuse module, the switchable contacts comprising at least one stationary contact and at least one movable contact being selectively positionable along a linear axis with respect to the stationary contact between an open position and a closed position to connect or disconnect an electrical connection through the at least one rectangular fuse module,
wherein the panelboard has an interrupting rating per volume of about 33 amps per cubic inch.

20. The panelboard of claim 19, wherein the mounting enclosure is one of an outdoor rated enclosure and an indoor rated enclosure.

21. The panelboard of claim 19, wherein the at least one stationary contact comprises a pair of stationary contacts, one of the pair of stationary contacts being provided on the line side terminal.

22. The panelboard of claim 19, further comprising at least one fuse terminal adapted to engage a conductive element of the at least one rectangular fuse module, wherein the at least one stationary contact comprises a pair of stationary contacts, one of the stationary contacts being provided on the at least one fuse terminal.

23. The panelboard of claim 19, wherein the switchable contacts comprise at least two stationary contacts spaced from one another and at least two movable contacts spaced from one another, thereby breaking electrical arcing in two locations spaced from one another when the switchable contacts are opened.

24. The panelboard of claim 19, wherein an arc chute compartment is provided in the disconnect housing to contain and dissipate arc energy at a location in the disconnect housing remote from a user.

25. The panelboard of claim 19, wherein the chassis is further configured to receive at least one circuit breaker.

* * * * *